US012026170B2

(12) United States Patent
Shaw et al.

(10) Patent No.: US 12,026,170 B2
(45) Date of Patent: Jul. 2, 2024

(54) USER INTERFACE FOR SEARCHING

(71) Applicant: Apple Inc., Cupertino, CA (US)

(72) Inventors: Jeremiah Daniel Shaw, San Jose, CA (US); Lawrence Y. Yang, Bellevue, WA (US)

(73) Assignee: Apple Inc., Cupertino, CA (US)

( * ) Notice: Subject to any disclaimer, the term of this patent is extended or adjusted under 35 U.S.C. 154(b) by 512 days.

(21) Appl. No.: 17/129,543

(22) Filed: Dec. 21, 2020

(65) Prior Publication Data

US 2021/0109924 A1  Apr. 15, 2021

Related U.S. Application Data

(63) Continuation of application No. 15/909,947, filed on Mar. 1, 2018, now abandoned, which is a continuation of application No. 14/502,989, filed on Sep. 30, 2014, now Pat. No. 9,946,771.

(60) Provisional application No. 62/005,912, filed on May 30, 2014.

(51) Int. Cl.
*G06F 16/248* (2019.01)
*G06F 3/0484* (2022.01)
*G06F 16/245* (2019.01)
*G06F 16/2457* (2019.01)
*G06F 16/9535* (2019.01)
*G06F 16/957* (2019.01)

(52) U.S. Cl.
CPC .......... *G06F 16/248* (2019.01); *G06F 3/0484* (2013.01); *G06F 16/245* (2019.01); *G06F 16/24578* (2019.01); *G06F 16/9535* (2019.01); *G06F 16/9574* (2019.01)

(58) Field of Classification Search
CPC .. G06F 16/248; G06F 16/9574; G06F 16/245; G06F 16/9535; G06F 16/24578; G06F 3/0484
See application file for complete search history.

(56) References Cited

U.S. PATENT DOCUMENTS

| 4,653,021 A | 3/1987 | Takagi |
| 4,817,036 A | 3/1989 | Millett et al. |
| 5,241,624 A | 8/1993 | Torres |
| 5,261,087 A | 11/1993 | Mukaino et al. |
| 5,499,330 A | 3/1996 | Lucas et al. |
| 5,515,488 A | 5/1996 | Hoppe et al. |
| 5,740,815 A | 4/1998 | Alpins |

(Continued)

FOREIGN PATENT DOCUMENTS

WO    2000/65429 A1    11/2000

OTHER PUBLICATIONS

Advisory Action received for U.S. Appl. No. 13/303,204, mailed on Feb. 27, 2018, 3 pages.

(Continued)

*Primary Examiner* — Hosain T Alam
*Assistant Examiner* — Robert F May
(74) *Attorney, Agent, or Firm* — DLA Piper LLP (US)

(57) ABSTRACT

The present disclosure relates to search techniques. In one example process, the device concurrently displays remote search results and local search results. In another example process, the device provides previews of search results that include actionable user interface objects. In another example process, the device concurrently displays options for initiating a search using various search engines.

54 Claims, 52 Drawing Sheets

(56) References Cited

U.S. PATENT DOCUMENTS

| | | | |
|---|---|---|---|
| 5,781,188 A | 7/1998 | Amiot et al. |
| 5,798,766 A | 8/1998 | Hayashi et al. |
| 5,835,904 A | 11/1998 | Vicik et al. |
| 5,873,076 A | 2/1999 | Barr et al. |
| 5,903,264 A | 5/1999 | Demoney et al. |
| 5,905,992 A | 5/1999 | Lucas et al. |
| 5,920,859 A | 7/1999 | Li et al. |
| 5,926,824 A | 7/1999 | Hashimoto et al. |
| 5,977,974 A | 11/1999 | Hatori et al. |
| 5,980,096 A | 11/1999 | Thalhammer-Reyero et al. |
| 5,982,369 A | 11/1999 | Sciammarella et al. |
| 5,995,961 A | 11/1999 | Levy et al. |
| 6,003,034 A | 12/1999 | Tuli et al. |
| 6,009,442 A | 12/1999 | Chen et al. |
| 6,012,072 A | 1/2000 | Lucas et al. |
| 6,021,405 A | 2/2000 | Celis et al. |
| 6,038,522 A | 3/2000 | Manson et al. |
| 6,070,158 A | 5/2000 | Kirsch et al. |
| 6,101,498 A | 8/2000 | Scaer et al. |
| 6,122,648 A | 9/2000 | Roderick |
| 6,149,519 A | 11/2000 | Osaki et al. |
| 6,151,702 A | 11/2000 | Overturf et al. |
| 6,185,567 B1 | 2/2001 | Ratnaraj et al. |
| 6,230,172 B1 | 5/2001 | Purnaveja et al. |
| 6,275,818 B1 | 8/2001 | Subramanian et al. |
| 6,275,822 B1 | 8/2001 | Consens et al. |
| 6,304,870 B1 | 10/2001 | Kushmerick et al. |
| 6,310,622 B1 | 10/2001 | Asente |
| 6,311,178 B1 | 10/2001 | Bi et al. |
| 6,323,846 B1 | 11/2001 | Westerman et al. |
| 6,335,742 B1 | 1/2002 | Takemoto |
| 6,338,059 B1 * | 1/2002 | Fields ................. G06F 16/9538 707/706 |
| 6,353,831 B1 | 3/2002 | Gustman |
| 6,363,377 B1 | 3/2002 | Kravets et al. |
| 6,392,651 B1 | 5/2002 | Stradley |
| 6,434,545 B1 | 8/2002 | Macleod et al. |
| 6,434,598 B1 | 8/2002 | Gish |
| 6,438,539 B1 | 8/2002 | Korolev et al. |
| 6,456,304 B1 | 9/2002 | Angiulo et al. |
| 6,456,938 B1 | 9/2002 | Barnard |
| 6,457,006 B1 | 9/2002 | Gruenwald |
| 6,457,007 B1 | 9/2002 | Kikuchi et al. |
| 6,457,017 B2 | 9/2002 | Watkins et al. |
| 6,463,431 B1 | 10/2002 | Schmitt |
| 6,466,237 B1 | 10/2002 | Miyao et al. |
| 6,489,954 B1 | 12/2002 | Powlette |
| 6,491,585 B1 | 12/2002 | Miyamoto et al. |
| 6,526,403 B1 | 2/2003 | Lin et al. |
| 6,542,896 B1 | 4/2003 | Gruenwald |
| 6,556,225 B1 | 4/2003 | Macphail |
| 6,570,557 B1 | 5/2003 | Westerman et al. |
| 6,581,068 B1 | 6/2003 | Bensoussan et al. |
| 6,587,106 B1 | 7/2003 | Suzuki et al. |
| 6,594,662 B1 | 7/2003 | Sieffert et al. |
| 6,636,849 B1 | 10/2003 | Tang et al. |
| 6,636,853 B1 | 10/2003 | Stephens, Jr. |
| 6,651,054 B1 | 11/2003 | De et al. |
| 6,677,932 B1 | 1/2004 | Westerman |
| 6,678,694 B1 | 1/2004 | Zimmermann et al. |
| 6,711,569 B1 * | 3/2004 | Bushee ................. G06F 16/951 707/999.005 |
| 6,732,088 B1 | 5/2004 | Glance |
| 6,744,447 B2 | 6/2004 | Estrada et al. |
| 6,792,615 B1 | 9/2004 | Rowe et al. |
| 6,819,344 B2 | 11/2004 | Robbins |
| 6,826,709 B1 | 11/2004 | Clermidy et al. |
| 6,847,959 B1 | 1/2005 | Arrouye et al. |
| 6,900,807 B1 | 5/2005 | Liongosari et al. |
| 6,915,254 B1 | 7/2005 | Heinze et al. |
| 6,961,900 B1 | 11/2005 | Sprague et al. |
| 6,973,628 B2 | 12/2005 | Asami et al. |
| 6,976,165 B1 | 12/2005 | Carpentier et al. |
| 6,983,227 B1 | 1/2006 | Thalhammer-Reyero |
| 6,985,948 B2 | 1/2006 | Taguchi et al. |
| 7,007,034 B1 | 2/2006 | Hartman et al. |
| 7,010,744 B1 | 3/2006 | Torgerson |
| 7,019,741 B2 | 3/2006 | Kelly et al. |
| 7,020,670 B1 | 3/2006 | Andreoli et al. |
| 7,055,109 B2 | 5/2006 | Boden et al. |
| 7,130,841 B1 | 10/2006 | Donaldson et al. |
| 7,165,064 B2 | 1/2007 | Saeki |
| 7,199,809 B1 | 4/2007 | Lacy et al. |
| 7,209,876 B2 | 4/2007 | Miller et al. |
| 7,234,114 B2 | 6/2007 | Kurtz et al. |
| 7,240,296 B1 | 7/2007 | Matthews et al. |
| 7,266,768 B2 | 9/2007 | Ferlitsch et al. |
| 7,272,604 B1 | 9/2007 | Hedloy |
| 7,293,228 B1 | 11/2007 | Lessing et al. |
| 7,302,649 B2 | 11/2007 | Ohnishi et al. |
| 7,313,808 B1 | 12/2007 | Gupta et al. |
| 7,447,713 B1 | 11/2008 | Berkheimer |
| 7,487,148 B2 | 2/2009 | James |
| 7,606,819 B2 | 10/2009 | Audet et al. |
| 7,614,008 B2 | 11/2009 | Ording |
| 7,657,849 B2 | 2/2010 | Chaudhri et al. |
| 7,663,607 B2 | 2/2010 | Hotelling et al. |
| 7,680,817 B2 | 3/2010 | Audet et al. |
| 7,710,423 B2 | 5/2010 | Drucker et al. |
| 7,761,471 B1 | 7/2010 | Lee et al. |
| 7,792,328 B2 | 9/2010 | Albertson et al. |
| 7,818,378 B2 | 10/2010 | Buchheit et al. |
| 7,844,074 B2 | 11/2010 | Moskowitz et al. |
| 7,844,914 B2 | 11/2010 | Andre et al. |
| 8,010,508 B2 | 8/2011 | Audet |
| 8,078,966 B2 | 12/2011 | Audet |
| 8,086,604 B2 | 12/2011 | Arrouye et al. |
| 8,136,030 B2 | 3/2012 | Audet |
| 8,151,185 B2 | 4/2012 | Audet |
| 8,239,784 B2 | 8/2012 | Hotelling et al. |
| 8,279,180 B2 | 10/2012 | Hotelling et al. |
| 8,479,122 B2 | 7/2013 | Hotelling et al. |
| 8,645,826 B2 | 2/2014 | Audet et al. |
| 8,793,265 B2 * | 7/2014 | Song ..................... G06F 16/951 707/758 |
| 8,812,737 B2 * | 8/2014 | Bilinski ............... G06F 16/9566 709/217 |
| 8,893,046 B2 | 11/2014 | Audet et al. |
| 8,904,281 B2 | 12/2014 | Audet |
| 8,954,847 B2 | 2/2015 | Audet |
| 9,098,174 B1 * | 8/2015 | Charytoniuk ........... G06F 16/95 |
| 9,235,654 B1 * | 1/2016 | Gupta ............... G06F 16/90324 |
| 9,251,643 B2 | 2/2016 | Audet |
| 9,454,529 B2 | 9/2016 | Audet |
| 10,140,360 B2 * | 11/2018 | Dahn ................... G06F 16/332 |
| 10,146,751 B1 * | 12/2018 | Zhang .................. G06F 16/313 |
| 10,180,985 B2 * | 1/2019 | King .................... G06F 16/9562 |
| 2001/0034766 A1 | 10/2001 | Morimoto |
| 2002/0015024 A1 | 2/2002 | Westerman et al. |
| 2002/0033848 A1 | 3/2002 | Sciammarella et al. |
| 2002/0049704 A1 | 4/2002 | Vanderveldt et al. |
| 2002/0059215 A1 | 5/2002 | Kotani et al. |
| 2002/0096831 A1 | 7/2002 | Nakayama et al. |
| 2002/0107872 A1 | 8/2002 | Hudis et al. |
| 2002/0138492 A1 | 9/2002 | Kil et al. |
| 2003/0001901 A1 | 1/2003 | Crinon et al. |
| 2003/0037051 A1 | 2/2003 | Gruenwald |
| 2003/0190950 A1 | 10/2003 | Matsumoto |
| 2003/0208472 A1 * | 11/2003 | Pham ..................... G06F 16/955 707/E17.112 |
| 2004/0128277 A1 | 7/2004 | Mander et al. |
| 2004/0260577 A1 | 12/2004 | Dahlin et al. |
| 2004/0263519 A1 | 12/2004 | Andrews et al. |
| 2005/0190059 A1 | 9/2005 | Wehrenberg |
| 2005/0222981 A1 | 10/2005 | Lawrence et al. |
| 2006/0017692 A1 | 1/2006 | Wehrenberg et al. |
| 2006/0026536 A1 | 2/2006 | Hotelling et al. |
| 2006/0033724 A1 | 2/2006 | Chaudhri et al. |
| 2006/0074883 A1 | 4/2006 | Teevan et al. |
| 2006/0080238 A1 | 4/2006 | Nielsen et al. |
| 2006/0197753 A1 | 9/2006 | Hotelling |
| 2007/0174237 A1 | 7/2007 | Wilbrink et al. |
| 2007/0174286 A1 * | 7/2007 | Seitz ................... G06F 16/951 |
| 2007/0192289 A1 | 8/2007 | Lin et al. |

(56) References Cited

U.S. PATENT DOCUMENTS

| | | |
|---|---|---|
| 2007/0204232 A1 | 8/2007 | Ray et al. |
| 2008/0016142 A1 | 1/2008 | Schneider |
| 2008/0033926 A1 | 2/2008 | Matthews et al. |
| 2008/0058106 A1 | 3/2008 | Audet et al. |
| 2008/0071822 A1 | 3/2008 | Audet et al. |
| 2008/0072169 A1 | 3/2008 | Audet et al. |
| 2008/0320391 A1 | 12/2008 | Lemay et al. |
| 2009/0055354 A1 | 2/2009 | Arad et al. |
| 2009/0063448 A1 | 3/2009 | Depue et al. |
| 2009/0119254 A1 | 5/2009 | Cross et al. |
| 2009/0313220 A1 | 12/2009 | Best et al. |
| 2010/0205199 A1* | 8/2010 | Lin .................. G06F 16/345 707/765 |
| 2010/0306191 A1 | 12/2010 | Lebeau et al. |
| 2011/0066610 A1 | 3/2011 | Choi et al. |
| 2011/0093467 A1 | 4/2011 | Sharp et al. |
| 2012/0030264 A1* | 2/2012 | Horn .................. G06F 16/285 707/821 |
| 2012/0136887 A1* | 5/2012 | Cha .................. G06F 16/3322 707/767 |
| 2012/0166477 A1 | 6/2012 | Arrouye et al. |
| 2012/0173565 A1* | 7/2012 | Jacobs .................. G06F 16/951 707/769 |
| 2012/0192089 A1* | 7/2012 | Kim .................. G06F 16/9566 715/760 |
| 2012/0204108 A1 | 8/2012 | Audet |
| 2012/0284247 A1 | 11/2012 | Jiang et al. |
| 2012/0323897 A1 | 12/2012 | Daher et al. |
| 2013/0166543 A1 | 6/2013 | Macdonald et al. |
| 2013/0241952 A1* | 9/2013 | Richman .................. G06F 40/10 345/619 |
| 2013/0275422 A1 | 10/2013 | Silber et al. |
| 2013/0325892 A1 | 12/2013 | Edwards et al. |
| 2014/0040224 A1 | 2/2014 | Grant et al. |
| 2014/0047359 A1* | 2/2014 | Teigene .................. G06F 16/951 715/760 |
| 2014/0089521 A1* | 3/2014 | Horowitz .................. H04L 45/22 709/239 |
| 2014/0359598 A1 | 12/2014 | Riley et al. |
| 2015/0006570 A1* | 1/2015 | Masuko .................. G06F 16/38 707/769 |
| 2015/0039176 A1* | 2/2015 | Fish .................. G07C 5/008 701/31.6 |
| 2015/0161212 A1 | 6/2015 | Gaiman et al. |
| 2015/0339387 A1* | 11/2015 | Dotsenko .................. G06F 16/9566 715/739 |
| 2015/0347532 A1 | 12/2015 | Yang et al. |
| 2018/0189362 A1 | 7/2018 | Shaw et al. |

OTHER PUBLICATIONS

Applicant Initiated Interview Summary received for U.S. Appl. No. 15/909,947, mailed on Nov. 20, 2019, 5 pages.
Applicant-Initiated Interview Summary received for U.S. Appl. No. 15/909,947, mailed on Apr. 14, 2020, 5 pages.
Born Gunter, "Microsoft® Windows® Script Host 2.0 Developer's Guide", Aug. 16, 2000, 26 pages.
Cassel Paul, "Microsoft® Windows® Professional Unleashed", Feb. 14, 2000, 31 pages.
Deutsch et al., "Software Quality Engineering—A Total Technical and Management Approach", Prentice-Hall, 1988, 170 pages.
Final Office Action received for U.S. Appl. No. 10/265,443, mailed on Mar. 6, 2009, 12 pages.
Final Office Action received for U.S. Appl. No. 11/000,413, mailed on Jul. 8, 2009, 16 pages.
Final Office Action received for U.S. Appl. No. 11/000,413, mailed on Jul. 11, 2008, 13 pages.
Final Office Action received for U.S. Appl. No. 11/000,413, mailed on Jul. 23, 2007, 11 pages.
Final Office Action received for U.S. Appl. No. 11/000,413, mailed on Nov. 29, 2010, 17 pages.
Final Office Action received for U.S. Appl. No. 11/944,155, mailed on Mar. 30, 2011, 13 pages.
Final Office Action received for U.S. Appl. No. 11/944,163, mailed on Apr. 7, 2011, 5 pages.
Final Office Action received for U.S. Appl. No. 11/944,176, mailed on Apr. 1, 2011, 11 pages.
Final Office Action received for U.S. Appl. No. 12/017,008, mailed on Jul. 24, 2012, 16 pages.
Final Office Action received for U.S. Appl. No. 12/034,628, mailed on Oct. 24, 2011, 14 pages.
Final Office Action received for U.S. Appl. No. 12/493,191, mailed on May 22, 2013, 14 pages.
Final Office Action received for U.S. Appl. No. 13/213,013, mailed on Jul. 8, 2013, 15 pages.
Final Office Action received for U.S. Appl. No. 13/303,204, mailed on Jan. 31, 2014, 9 pages.
Final Office Action received for U.S. Appl. No. 13/303,204, mailed on Jun. 6, 2016, 15 pages.
Final Office Action received for U.S. Appl. No. 13/303,204, mailed on Mar. 1, 2013, 9 pages.
Final Office Action received for U.S. Appl. No. 13/303,204, mailed on Nov. 3, 2017, 23 pages.
Final Office Action received for U.S. Appl. No. 13/304,364, mailed on Oct. 30, 2014, 15 pages.
Final Office Action received for U.S. Appl. No. 13/304,364, mailed on Sep. 21, 2015, 21 pages.
Final Office Action received for U.S. Appl. No. 13/337,958, mailed on Nov. 19, 2014, 12 pages.
Final Office Action Received for U.S. Appl. No. 14/502,989, mailed on Jun. 8, 2017, 27 pages.
Final Office Action received for U.S. Appl. No. 15/909,947, mailed on Jul. 25, 2019, 23 pages.
International Preliminary Report on Patentability received for PCT Patent Application No. PCT/CA2007/000490, issued on Sep. 30, 2008, 6 pages.
International Preliminary Report on Patentability received for PCT Patent Application No. PCT/US2015/030394, mailed on Dec. 15, 2016, 12 pages.
International Search Report and Written Opinion received for PCT Patent Application No. PCT/CA2007/000490, mailed on Jul. 18, 2007, 7 pages.
International Search Report and Written Opinion received for PCT Patent Application No. PCT/US2015/030394, mailed on Aug. 20, 2015, 14 pages.
Jackman Michael, "Set Up Windows Me Just for You", TechRepublic, Dec. 12, 2000, 12 pages.
krypted.com, "Enabling Spotlight for Network Volumes", Available at: http://krypted.com/mac-security/enabling-spotlight-for-network-volumes/, Mar. 25, 2012, 3 pages.
Liao et al., "A Competence Knowledge Base System as Part of the Organizational Memory", German Research Center for Artificial Intelligence (DFKI) GmbH, 2000, pp. 125-137.
Non-Final Office Action received for U.S. Appl. No. 13/304,364, mailed on Apr. 13, 2015, 21 pages.
Non-Final Office Action received for U.S. Appl. No. 13/361,515, mailed on Oct. 3, 2014, 6 pages.
Non-Final Office Action Received for U.S. Appl. No. 14/502,989, mailed on Nov. 16, 2016, 23 pages.
Non-Final Office Action received for U.S. Appl. No. 10/265,443, mailed on Feb. 9, 2007, 9 pages.
Non-Final Office Action received for U.S. Appl. No. 10/265,443, mailed on Sep. 15, 2008, 9 pages.
Non-Final Office Action received for U.S. Appl. No. 11/000,413, mailed on Dec. 26, 2008, 16 pages.
Non-Final Office Action received for U.S. Appl. No. 11/000,413, mailed on Feb. 7, 2007, 8 pages.
Non-Final Office Action received for U.S. Appl. No. 11/000,413, mailed on Feb. 14, 2011, 14 pages.
Non-Final Office Action received for U.S. Appl. No. 11/000,413, mailed on Jan. 25, 2008, 11 pages.
Non-Final Office Action received for U.S. Appl. No. 11/000,413, mailed on May 12, 2010, 13 pages.

(56) References Cited

OTHER PUBLICATIONS

Non-Final Office Action received for U.S. Appl. No. 11/936,129, mailed on Oct. 18, 2010, 10 pages.
Non-Final Office Action received for U.S. Appl. No. 11/944,155, mailed on Oct. 27, 2010, 15 pages.
Non-Final Office Action received for U.S. Appl. No. 11/944,163, mailed on Oct. 29, 2010, 21 pages.
Non-Final Office Action received for U.S. Appl. No. 11/944,176, mailed on Sep. 16, 2010, 11 pages.
Non-Final Office Action received for U.S. Appl. No. 11/970,860, mailed on Jun. 29, 2011, 22 pages.
Non-Final Office Action received for U.S. Appl. No. 12/017,008, mailed on Feb. 23, 2012, 15 pages.
Non-Final Office Action received for U.S. Appl. No. 12/017,008, mailed on Jun. 6, 2013, 17 pages.
Non-Final Office Action received for U.S. Appl. No. 12/034,628, mailed on Sep. 21, 2011, 16 pages.
Non-Final Office Action received for U.S. Appl. No. 12/034,628, mailed on May 24, 2011, 16 pages.
Non-Final Office Action received for U.S. Appl. No. 13/213,013, mailed on Sep. 28, 2012, 11 pages.
Non-Final Office Action received for U.S. Appl. No. 13/213,013, mailed on Jan. 2, 2013, 14 pages.
Non-Final Office Action received for U.S. Appl. No. 13/303,204, mailed on Aug. 2, 2012, 7 pages.
Non-Final Office Action received for U.S. Appl. No. 13/303,204, mailed on Dec. 30, 2016, 16 pages.
Non-Final Office Action received for U.S. Appl. No. 13/303,204, mailed on Sep. 6, 2013, 9 pages.
Non-Final Office Action received for U.S. Appl. No. 13/304,364, mailed on Feb. 25, 2014, 12 pages.
Non-Final Office Action received for U.S. Appl. No. 13/311,959, mailed on Mar. 31, 2014, 8 pages.
Non-Final Office Action received for U.S. Appl. No. 13/337,958, mailed on Jun. 30, 2015, 13 pages.
Non-Final Office Action received for U.S. Appl. No. 13/337,958, mailed on Mar. 20, 2014, 11 pages.
Non-Final Office Action received for U.S. Appl. No. 15/909,947, mailed on Aug. 20, 2020, 29 pages.
Non-Final Office Action received for U.S. Appl. No. 15/909,947, mailed on Jan. 9, 2020, 22 pages.
Non-Final Office Action received for U.S. Appl. No. 15/909,947, mailed on Jul. 25, 2018, 30 pages.
Non-Final Office Action received for U.S. Appl. No. 95/000,685, mailed on Mar. 5, 2013, 86 pages.
Non-Final Office Action received for U.S. Appl. No. 95/000,685, mailed on Oct. 15, 2012, 52 pages.
Non-Final Office Action received for U.S. Appl. No. 13/303,204, mailed on Aug. 20, 2015, 8 pages.
Non-Final Office Action received for U.S. Appl. No. 13/303,204, mailed on Feb. 28, 2019, 22 pages.
Notice of Allowance received for U.S. Appl. No. 11/693,669, mailed on Sep. 24, 2009, 8 pages.
Notice of Allowance received for U.S. Appl. No. 12/017,008, mailed on Aug. 1, 2014, 9 pages.
Notice of Allowance received for U.S. Appl. No. 12/034,628, mailed on Jan. 19, 2012, 8 pages.
Notice of Allowance received for U.S. Appl. No. 12/493,191, mailed on Jul. 16, 2014, 15 pages.
Notice of Allowance received for U.S. Appl. No. 13/213,013, mailed on Sep. 23, 2013, 10 pages.
Notice of Allowance received for U.S. Appl. No. 13/337,958, mailed on Sep. 28, 2015, 14 pages.
Notice of Allowance received for U.S. Appl. No. 10/265,443, mailed on Jun. 19, 2009, 10 pages.
Notice of Allowance received for U.S. Appl. No. 11/000,413, mailed on Sep. 2, 2011, 8 pages.
Notice of Allowance received for U.S. Appl. No. 11/774,591, mailed on Apr. 29, 2011, 9 pages.
Notice of Allowance received for U.S. Appl. No. 11/944,163, mailed on Jul. 27, 2011, 9 pages.
Notice of Allowance received for U.S. Appl. No. 11/944, 163, mailed on Nov. 9, 2011, 4 pages.
Notice of Allowance received for U.S. Appl. No. 11/970,860, mailed on Dec. 6, 2011, 8 pages.
Notice of Allowance received for U.S. Appl. No. 13/304,364, mailed on May 18, 2016, 9 pages.
Notice of Allowance received for U.S. Appl. No. 13/311,959, mailed on Oct. 2, 2014, 8 pages.
Notice of Allowance received for U.S. Appl. No. 14/502,989, mailed on Jan. 11, 2018, 15 pages.
Office Action received for European Patent Application No. 15724898.0, mailed on Dec. 6, 2018, 11 pages.
Office Action received for European Patent Application No. 15724898.0, mailed on Jul. 15, 2019, 7 pages.
Pogue David, "Mac OS X: The Missing Manual, Tiger Edition", Online available at: https://books.google.co.in/books?id=5YgPR5DMr1sC&printsec=frontcover&dq=The+Missing+Manual,+Tiger+Edition&hl=en&sa=X&ved=0ahUKEwj465DJtYLnAhWExDgGHdW2B0Q6AEIKDAA#v=onepage&q=The%20Missing%20Manual%2C%20Tiger%20Edition&f=false, 2006, pp. 87-109.
Result of Consultation received for European Patent Application No. 15724898.0, mailed on Aug. 27, 2020, 5 pages.
Sullivan Danny, "Google Launches Instant Previews", Search Engine Land, Available at: http://searchengineland.com/google-launches-instant-previews-55130, Nov. 9, 2010, 11 pages.
Summons to Attend Oral Proceedings received for European Patent Application No. 15724898.0, mailed on Jun. 3, 2020, 9 pages.
Summons to Attend Oral Proceedings received for European Patent Application No. 15724898.0, mailed on Mar. 10, 2020, 9 pages.
Wikipedia, "Modbook", Available at: https://en.wikipedia.org/w/index.php?title=Modbook&oldid=548181616, Apr. 1, 2013, 2 pages.
Applicant Initiated Interview Summary received for U.S. Appl. No. 11/944,176, mailed on Jul. 8, 2011, 3 pages.
Applicant Initiated Interview Summary received for U.S. Appl. No. 13/311,959, mailed on Jun. 24, 2014, 3 pages.
Extended European Search Report received for European Patent Application No. 21170158.6, mailed on Jul. 9, 2021, 7 pages.
Decision to Refuse received for European Patent Application No. 15724898.0, mailed on Feb. 15, 2021, 12 pages.
Office Action received for European Patent Application No. 21170158.6, mailed on Dec. 21, 2022, 7 pages.

\* cited by examiner

600

602 Receive a search input.

604 Obtain one or more local search results based on the search input.

606 Determine whether the search input meets remote-search criteria.

608 In response to receiving the search input:

610 In accordance with a determination that the search input does not meet the remote-search criteria, display, on the display, local search result information that corresponds to the one or more local search results.

612 In accordance with a determination that the search input meets the remote-search criteria: obtain one or more remote search results based on the search input; and concurrently display, on the display, remote search result information that corresponds to the one or more remote search results and local search result information that corresponds to the one or more local search results.

614 Wherein concurrently displaying the remote search result information and the local search result information comprises: displaying a first remote search result of the one or more remote search results at a first location on the display; displaying a plurality of local search results of the one or more local search results at a second location on the display, the second location being below the first location; and displaying a second remote search result of the one or more remote search results at a third location on the display, the third location being below the second location.

FIG. 6A

USER INTERFACE FOR SEARCHING

RELATED APPLICATIONS

This application is a continuation of U.S. patent application Ser. No. 15/909,947, filed Mar. 1, 2018, titled "USER INTERFACE FOR SEARCHING, which claims priority to U.S. patent application Ser. No. 14/502,989, filed Sep. 30, 2014, titled "USER INTERFACE FOR SEARCHING", which claims priority to U.S. Provisional Application Ser. No. 62/005,912, filed May 30, 2014, which are incorporated herein in their entirety. This application relates to the following co-pending provisional applications: U.S. patent application titled "MULTI-DOMAIN QUERY COMPLETION", filed May 30, 2014, (Reference No. P22924USP1); U.S. patent application titled "USE OF USER FEEDBACK IN A CITATION SEARCH INDEX", filed May 30, 2014, (Reference No. P23537USP1); and U.S. patent application titled "FEDERATED SEARCH", filed May 30, 2014, (Reference No. P23848USP1); which are hereby incorporated by reference in their entirety.

TECHNICAL FIELD

This relates generally to computer user interfaces, and more specifically to techniques for displaying a user interface for searching.

BACKGROUND

The use of electronic devices for searching content has increased significantly in recent years. Exemplary devices include cellular telephones, touchpads, desktop computers, and laptop computers. Such devices are widely used by users to search for information that is stored locally to the device and for information that is stored remotely to the device. With such devices, a user may have difficulty locating, previewing, and accessing desired information. This creates a significant cognitive burden on the user. In addition, some methods for searching for information take longer than necessary, thereby wasting energy. This latter consideration is particularly important in battery-operated devices.

SUMMARY

Some techniques for searching content using electronic devices, however, are generally cumbersome and inefficient. For example, searching for information frequently requires navigating a complex and time-consuming user interface. For another example, some search techniques do not include a convenient method for previewing the search results. For another example, some techniques do not efficiently provide options to search various search engines. In addition, some techniques take longer than necessary, thereby wasting energy. This latter consideration is particularly important in battery-operated devices.

Accordingly, there is a need for electronic devices with faster, more efficient methods and interfaces for searching. Such methods and interfaces optionally complement or replace conventional methods for searching. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for searching are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. Executable instructions for performing these functions may be included in a computer readable storage medium or other computer program product configured for execution by one or more processors.

In accordance with some embodiments, a method is performed at an electronic device with a display. The method includes receiving a search input. The method includes obtaining one or more local search results based on the search input. The method includes determining whether the search input meets remote-search criteria. The method includes, in response to receiving the search input, in accordance with a determination that the search input does not meet the remote-search criteria, displaying, on the display, local search result information that corresponds to the one or more local search results; and in accordance with a determination that the search input meets the remote-search criteria, obtaining one or more remote search results based on the search input, and concurrently displaying, on the display, remote search result information that corresponds to the one or more remote search results and local search result information that corresponds to the one or more local search results.

In accordance with some embodiments, a method is performed at an electronic device with a display. The method includes receiving a search input. The method includes displaying one or more search results obtained based on the received search input. The method includes receiving a request to preview a respective search result of the one or more search results. The method also includes, in response to receiving the request to preview the respective search result, displaying a preview of content of the respective search result, wherein the preview of content of the respective search result includes one or more actionable user interface objects that, when activated, cause the device to perform an operation associated with the respective search result.

In accordance with some embodiments, a method is performed at an electronic device with a display. The method includes receiving a search input. The method includes determining whether the search input includes a search-engine-specifier term. The method also includes, in accordance with a determination that the search input includes a search-engine-specifier term that corresponds to a respective search engine, concurrently displaying one or more selectable options for initiating a search of at least a first portion of the search input using the respective search engine and one or more selectable options for initiating a search of at least a second portion of the search input using a default search engine.

Thus, devices are provided with faster, more efficient methods and interfaces for searching, thereby increasing the effectiveness, efficiency, and user satisfaction with such devices. Such methods and interfaces may complement or replace conventional methods for searching.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 6A-6B are flow diagrams illustrating a method for displaying search result information in accordance with some embodiments.

DESCRIPTION OF EMBODIMENTS

Figure 1A:
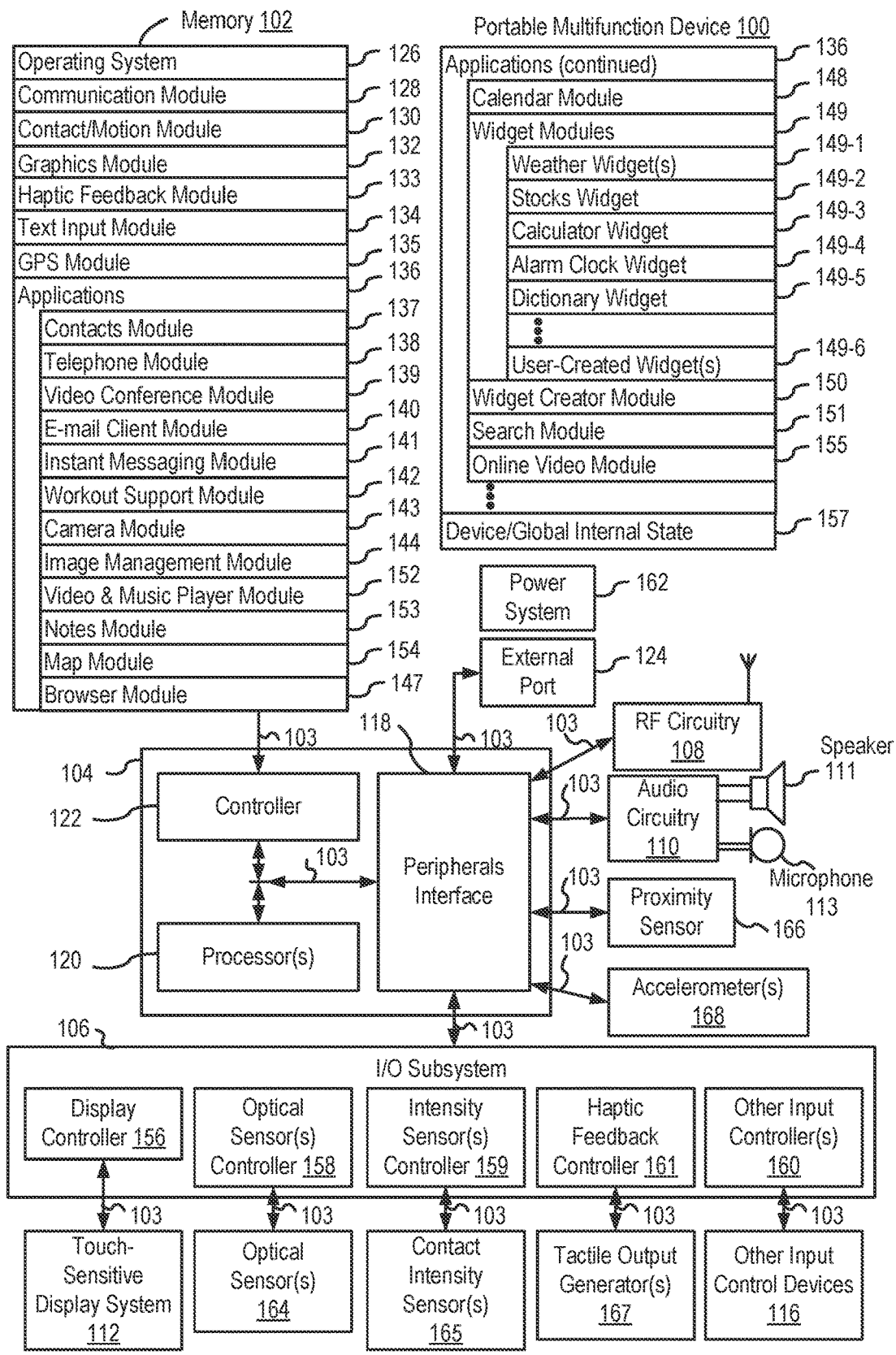
FIG. 1A is a block diagram illustrating a portable multifunction device with a display in accordance with some embodiments.

Below, FIGS. 1A-1B, 2, 3, and 4A-4B provide a description of exemplary devices for searching. FIGS. 5A-5M, 7A-7N, 9A-9M, and 11 illustrate exemplary user interfaces for searching. The user interfaces in the figures are also used to illustrate the processes described below, including the processes in FIGS. 6A-6B, 8, and 10A-10B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
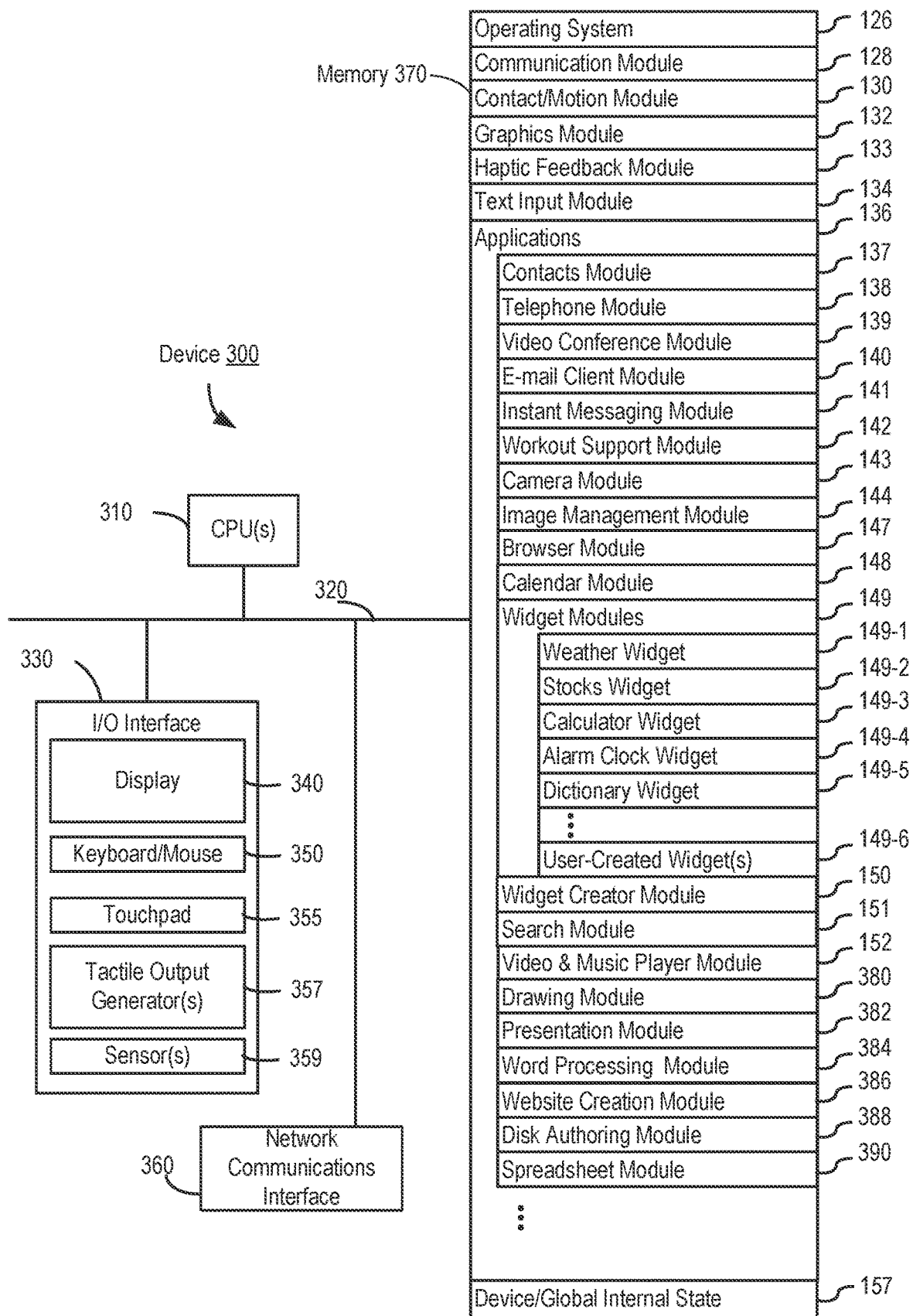
FIG. 3 is a block diagram of an exemplary multifunction device with a display in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:
- Contacts module 137 (sometimes called an address book or contact list);
- Telephone module 138;
- Video conferencing module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
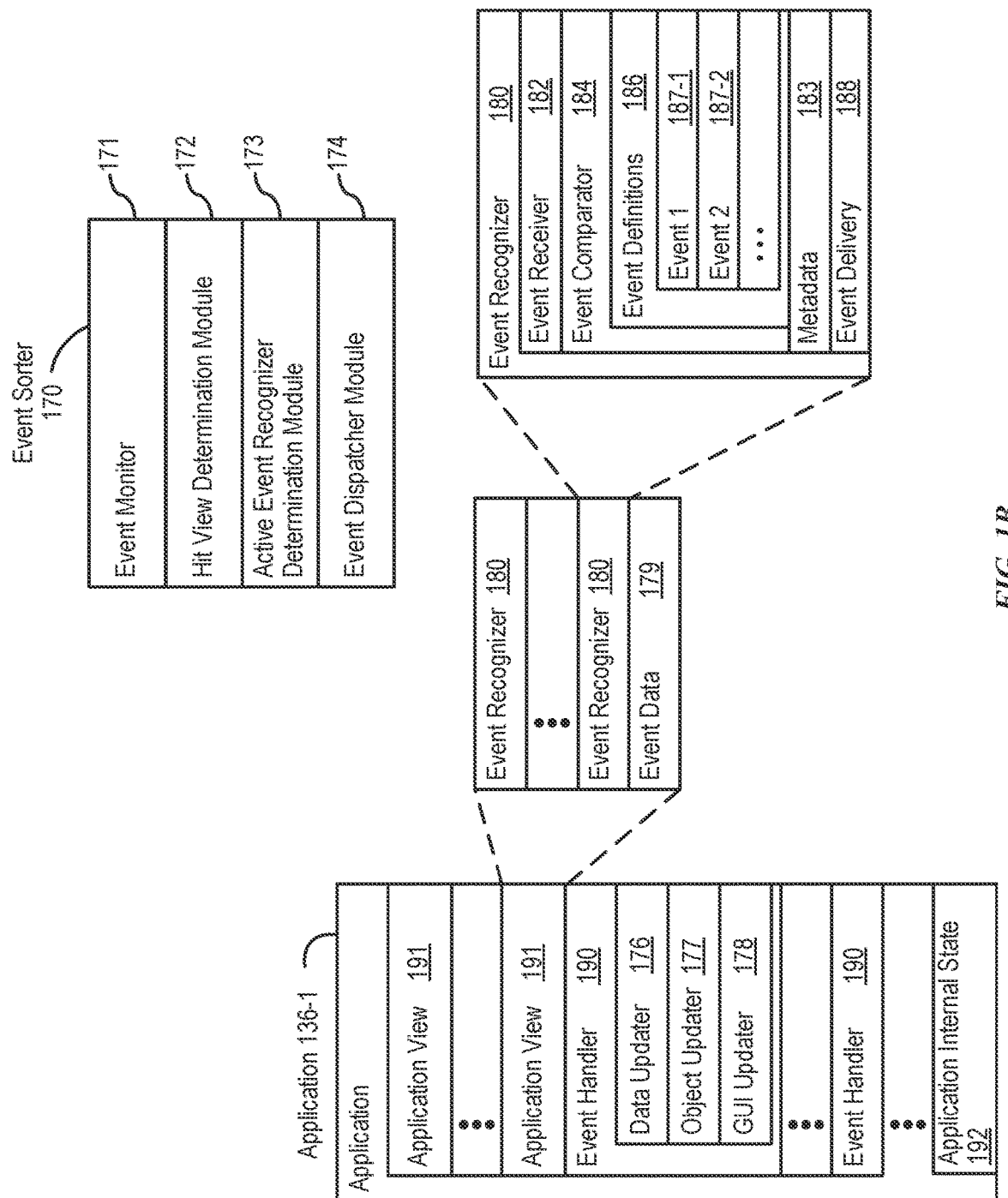
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
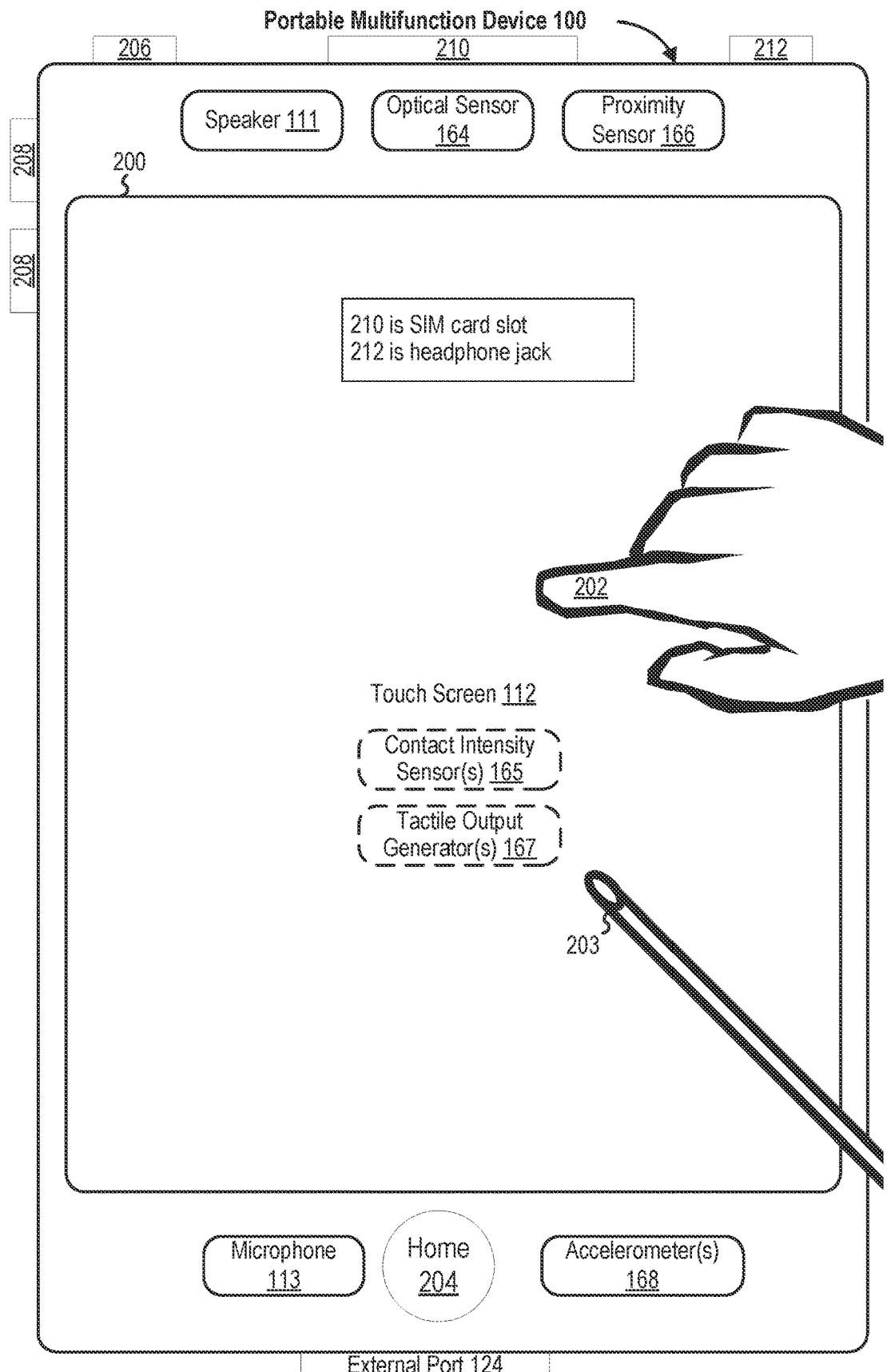
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
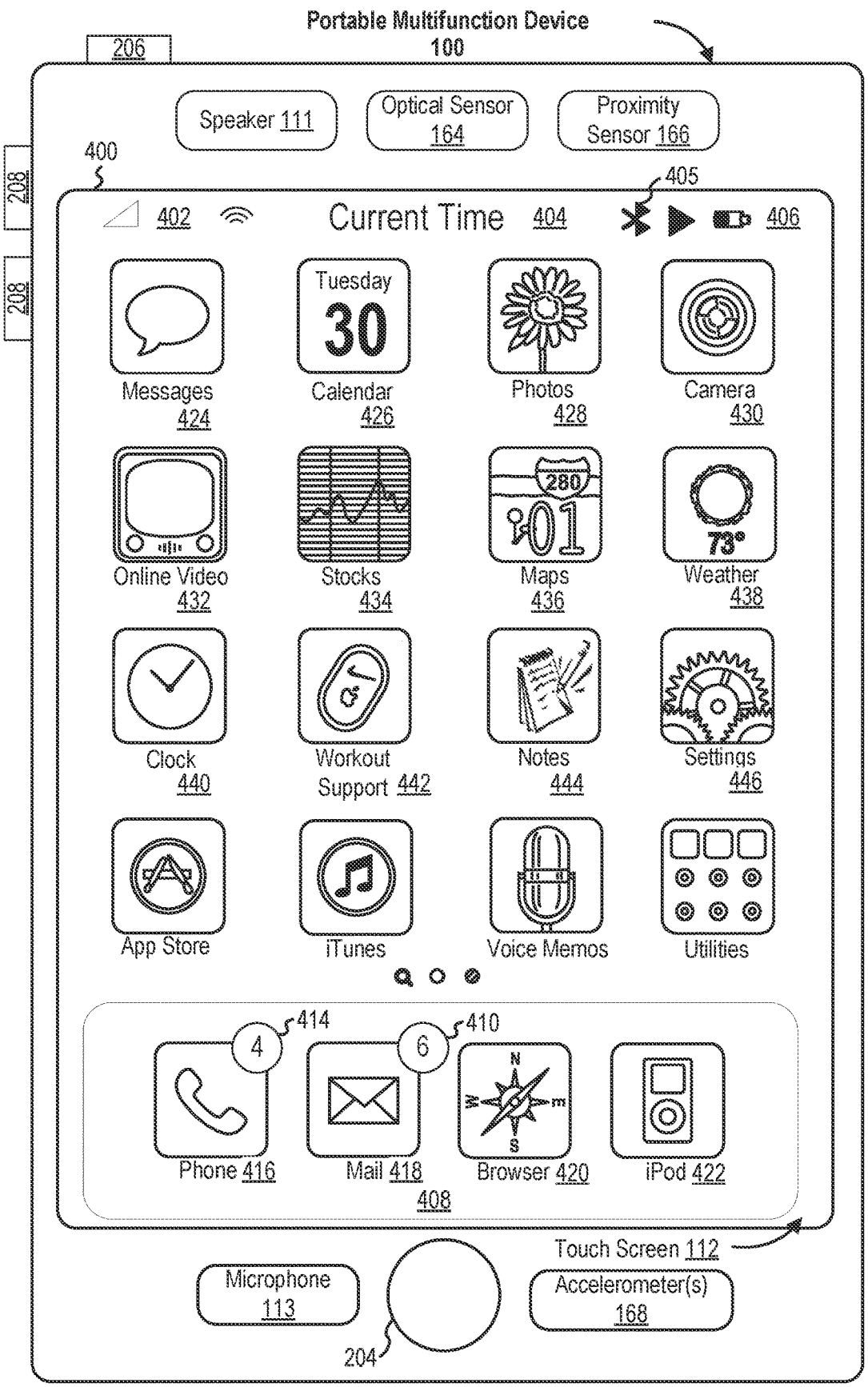
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
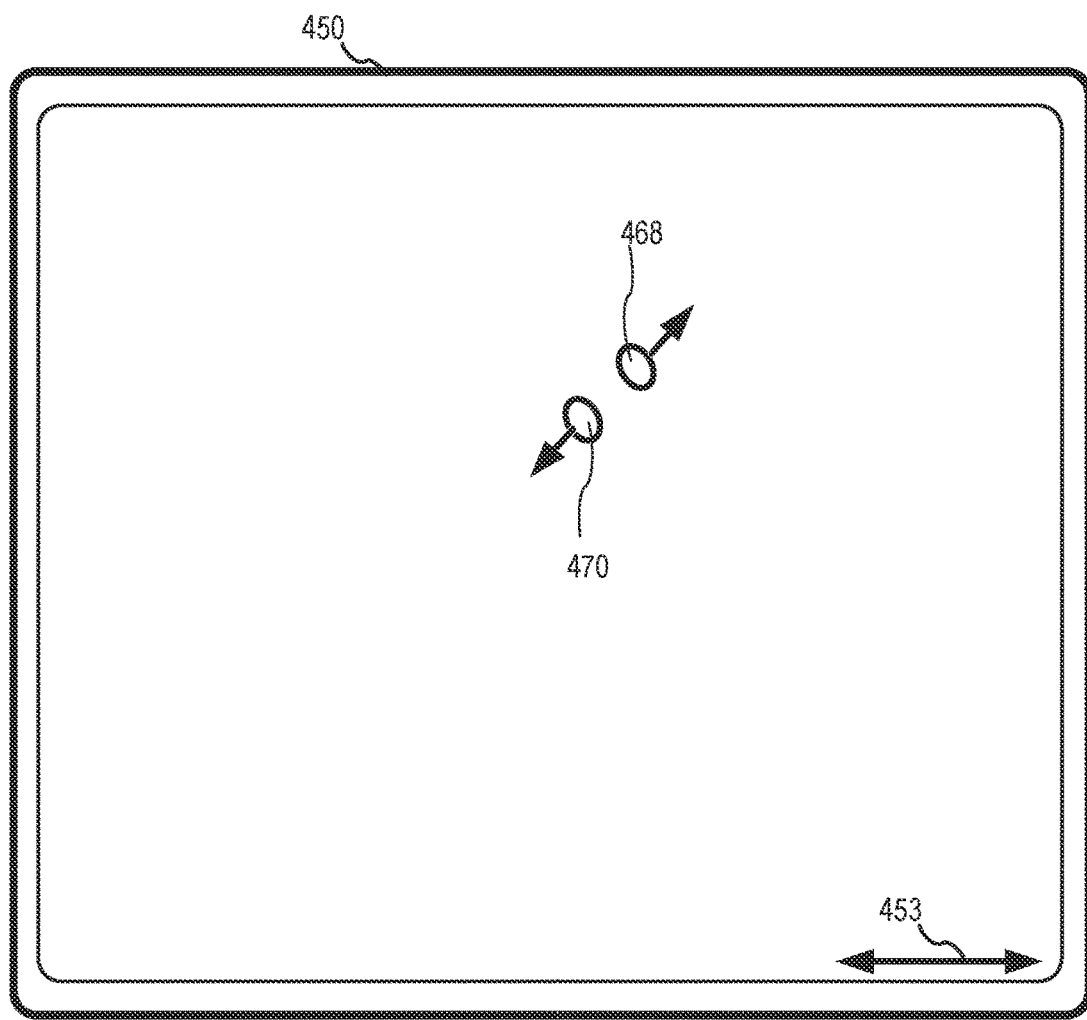
FIG. 4B illustrates an exemplary user interface for a multifunction device with a touch-sensitive surface that is separate from the display in accordance with some embodiments.
Figure 4B:
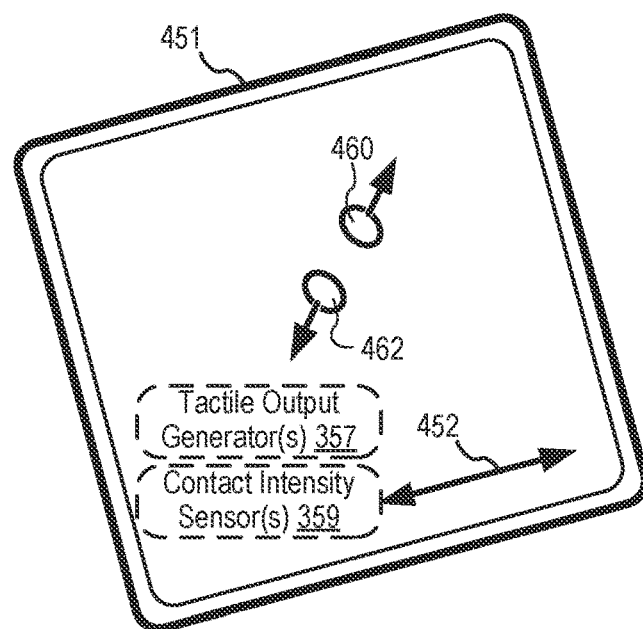

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used here, the term "affordance" refers to a user-interactive graphical user interface object that may be displayed on the display screen of devices 100 and/or 300 (FIGS. 1 and 3). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that may be implemented on a multifunction device with a display, such as device 300 or portable multifunction device 100.

FIGS. 5A-5M illustrate exemplary user interfaces for displaying search result information in accordance with some embodiments. The user interfaces in these figures are used to illustrate the processes described below, including the process in FIGS. 6A-6B.

FIGS. 5A-D illustrate exemplary user interfaces for receiving a search input and displaying search result information. At FIG. 5A, electronic device 100 displays a user interface, including search field 502. A user of the device can enter a search input, such as an alphanumeric text string, into search field 502 to initiate a search. In some examples, the user does not need to indicate completion of entering the search input, such as by activating a search affordance or pressing an enter button, to initiate the search. Instead, the device may automatically requests searches as the search input is progressively entered into search field 502.

Figure 5A:
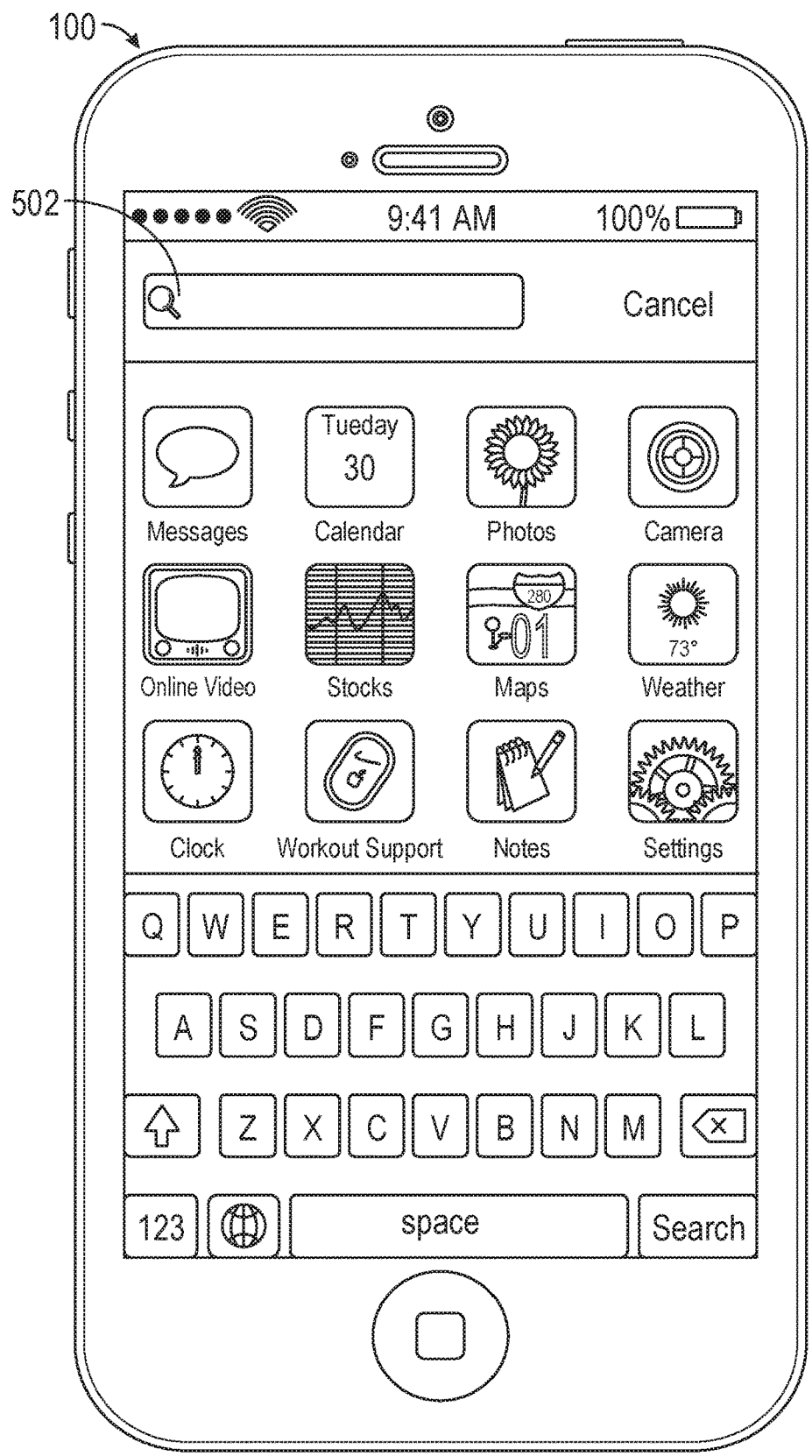
FIGS. 5A-5M illustrate exemplary user interfaces for displaying search result information in accordance with some embodiments.
Figure 5B:
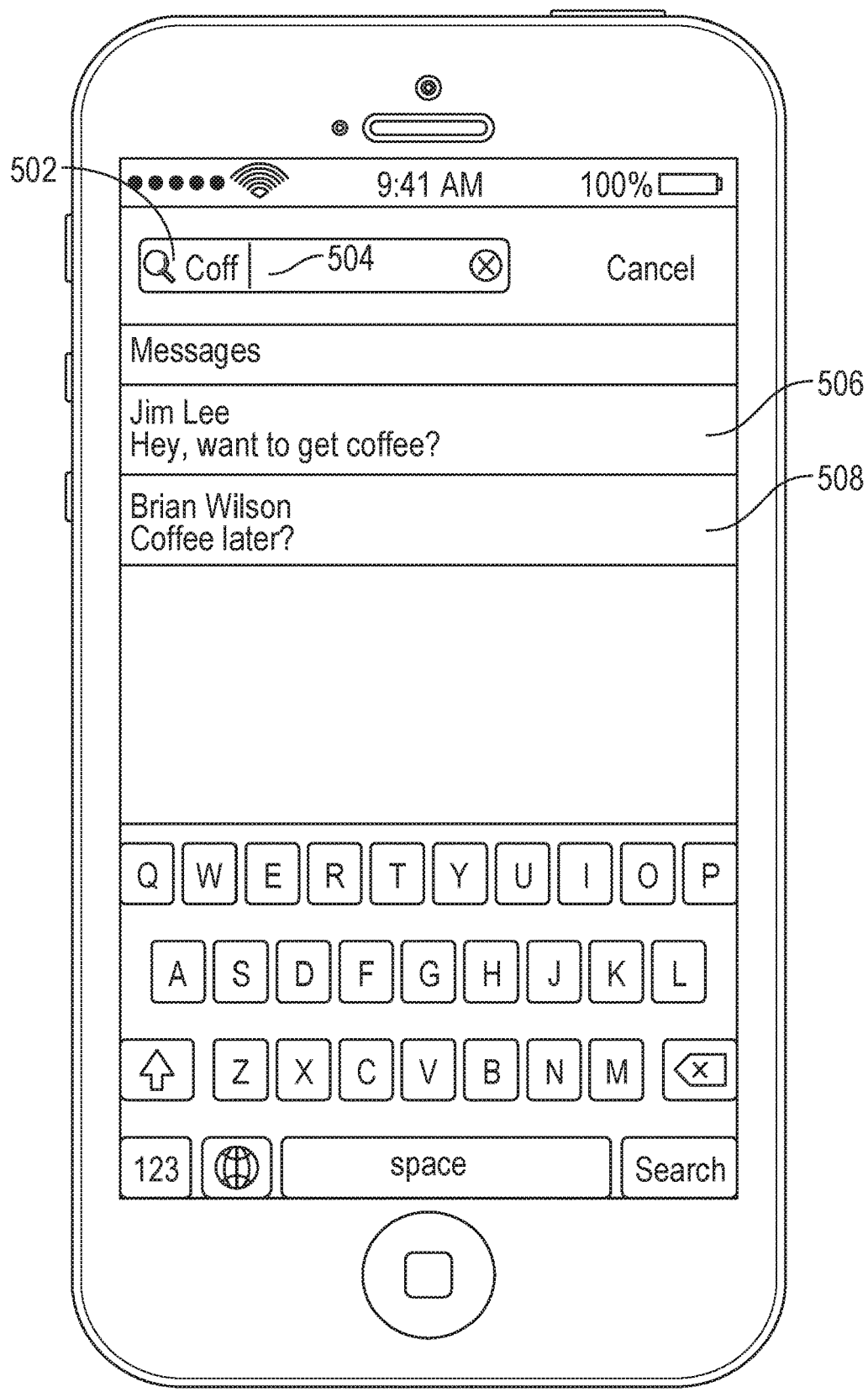

At FIG. 5B, the user has entered a search input 504 of "Coff" into search field 502. The device receives the search input 504 (e.g., "C", "Cof", and "Coff" as it is progressively entered). The device obtains one or more local search results based on the search input. The device determines whether the search input 504 (e.g., "Coff" in FIG. 5B) meets remote-search criteria. In some embodiments, the search input does not meet the remote-search criteria when the search input has a character count that does not exceed a threshold character count. For example, the remote-search criteria is met when the length of the search input 504 is above a predefined number of characters. In response to receiving the search input, and in accordance with a determination that the search input does not meet the remote-search criteria (e.g., a length of the search input is not above the predefined number of characters), the device displays, on the display, local search result information (e.g., messages 506 and 508 of FIG. 5B) that corresponds to the one or more local search results, as illustrated in FIG. 5B. In some examples, local search result information pertains to information that is locally stored on the device. Thus, the device does not have to access a remote location (such as a server) to access the information. Thus, FIG. 5B illustrates an example where the search input 504 of "Coff" does not meet the remote-search criteria.

Figure 5C:
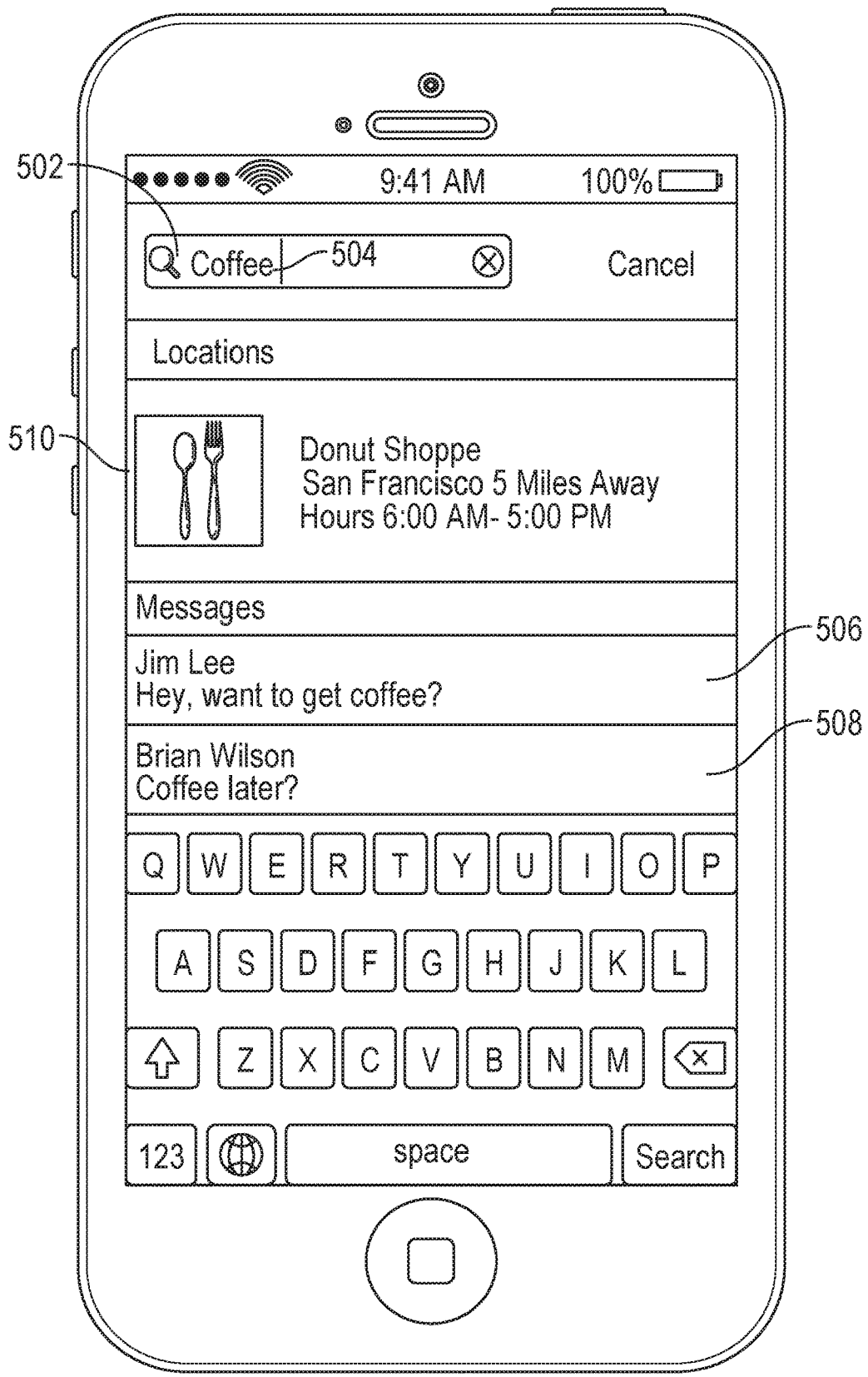

FIG. 5C illustrates an exemplary user interface where the search input 504 of "Coffee" does meet the remote-search criteria. In response to receiving the search input 504 (e.g., "Coffee" of FIG. 5C), and in accordance with a determination that the search input 504 (e.g., "Coffee" in FIG. 5C) meets the remote-search criteria (e.g., a length of the search input is above a predefined number of characters), the device obtains one or more remote search results based on the search input and concurrently displays, on the display, remote search result information (e.g., Donut Shoppe search result 510) that corresponds to the one or more remote search results and local search result information (e.g., messages 506 and 508 of FIG. 5C) that corresponds to the one or more local search results. In some examples, remote search result information pertains to information that is remotely stored (e.g., the device uses a network to access the information).

In some embodiments, the concurrently displayed remote search result information and local search result information are visibly displayed together on the display. For example, some of the remote search results and some of the local search results are displayed on the same screen. This makes the user aware that local search results are available when the user initially looks at the screen (and prior to any scrolling), even when remote search results are displayed at, for example, the top of the display. This is advantageous because local search results are often relevant to the user.

In some embodiments, the displayed remote search result information (e.g., search result 510 of FIG. 5C) comprises a remote search result of the one or more remote search results, the remote search result having a confidence value higher than a confidence threshold. For example, each of the one or more remote search results are assigned a corresponding confidence value. If the top remote search result (e.g., the remote search result with the highest confidence value) is determined not to be relevant to the user (e.g., the confidence value is not higher than the confidence threshold), then the remote search result is not displayed to the user. In some embodiments, this determination is performed at a remote server that provides the one or more remote search results. In some embodiments, the determination is performed at the device.

In some embodiments, the displayed remote search result information (e.g., search result 510 of FIG. 5C) comprises one or more top remote search results up to a threshold number of top remote search results (e.g., maximum one remote result so that the user is not inundated with remote results) that have a corresponding confidence value that exceeds a confidence threshold. Thus, even if numerous remote search results have confidence values that exceed the confidence threshold, the number of remote search results displayed is limited so that the user is more easily able to view and access local results.

In some embodiments, prior to displaying the remote search result information, the device determines whether an identified remote search result of the one or more remote search results corresponds to a matching local search result of the one or more local search results. In accordance with a determination that the identified remote search result corresponds to the matching local search result, the device excludes the identified remote search result from the remote search result information prior to displaying the remote search result information. For example, in some embodiments, the device does not display a link to buy a music album (the identified remote search result), if the device determines that the device already has access to the music album (e.g., the music album is stored locally). Instead of the link to buy the music album, the device provides a link to locally access the music album on the device.

Figure 5D:
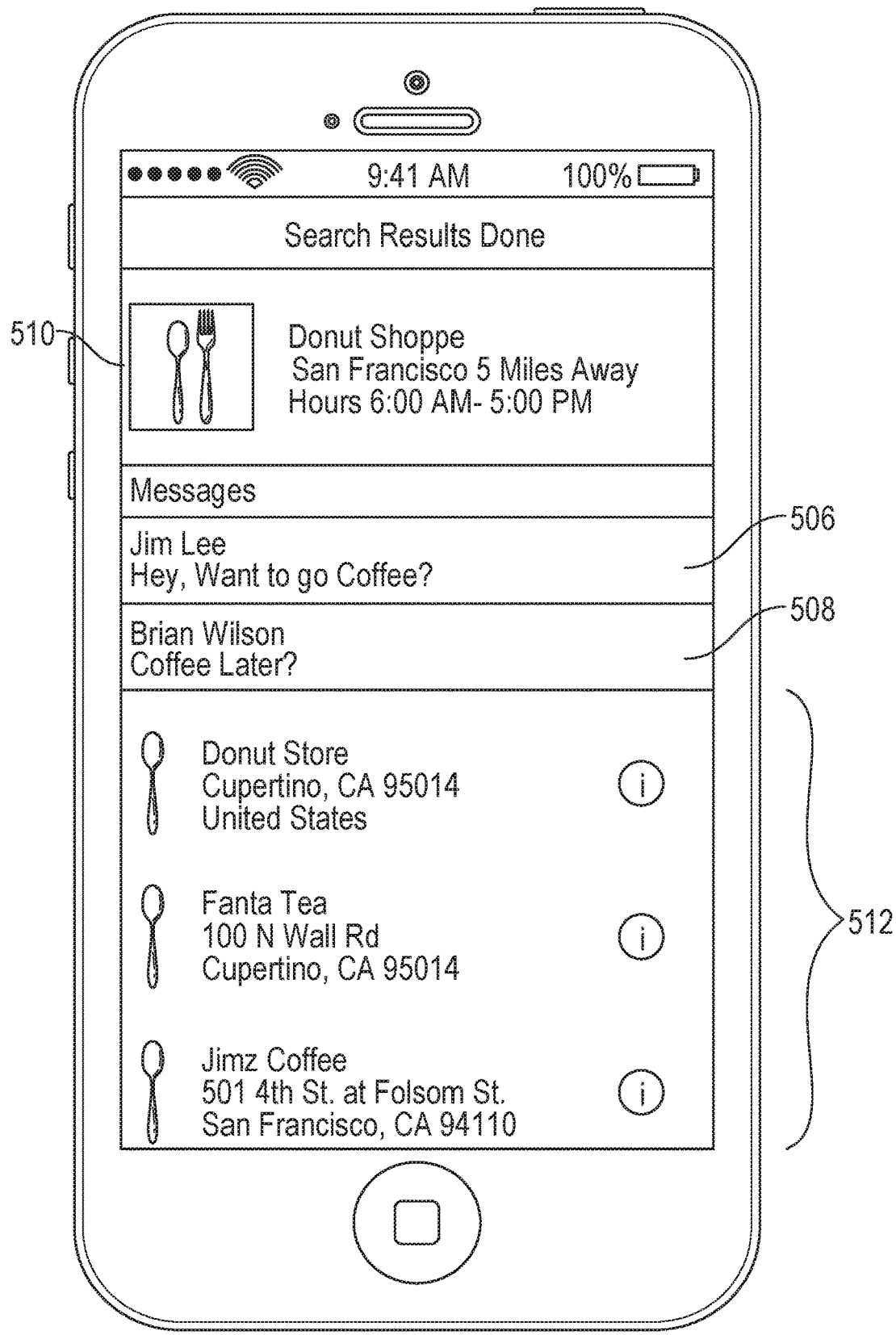

FIG. 5D illustrates an exemplary user interface for displaying local search result information and remote search result information in accordance with some embodiments. In some embodiments, concurrently displaying the remote search result information and the local search result information comprises displaying a first remote search result (e.g., search result 510 of FIG. 5D) of the one or more remote search results at a first location on the display. The device displays a plurality of local search results (e.g., messages 506 and 508 of FIG. 5D) of the one or more local search results at a second location on the display, the second location being below the first location. The device displays a second remote search result (e.g., search results 512 of FIG. 5D) of the one or more remote search results at a third location on the display, the third location being below the second location. In some embodiments, a remote search result is displayed at the top of the list of search results. This remote search result is followed by multiple displayed local search results, which are followed by another one or more remote search results. In this way, a user can quickly access the highest ranked remote search result and also have convenient access to local search results. While still accessible, the remote results other than the remote result displayed at the top of the list, are displayed at a location that is potentially less accessible to the user. For example, the user may need to scroll the screen to access the other remote results.

In some embodiments, the device receives additional characters added to the search input (e.g., the user enters more into the search field) and updates the search results. The device receives additional characters added to the search input to form a second search input. The device obtains one or more second local search results based on the second search input. The device determines whether the second search input meets the remote-search criteria. In accordance with a determination that the second search input does not meet the remote-search criteria (e.g., a length of the second search input is not above the predefined number of characters), the device displays, on the display, updated local search result information that corresponds to the one or more second local search results. In accordance with a determination that the second search input meets the remote-search criteria, the device obtains one or more second remote search results based on the second search input, and concurrently displays, on the display, updated remote search result information that corresponds to the one or more second remote search results and updated local search result information that corresponds to the one or more second local search results. In some circumstances, the second search input meets the remote-search criteria while the first search input did not meet the remote-search criteria. For example, the first search input may not meet the remote-search criteria because the first search input has a character count that does not exceed a threshold character count. As the user enters an additional character into the search field, the newly formed search input (e.g., second search input) may meet the remote-search criteria. For example, this second search input may meet the remote-search criteria because it exceeds the threshold character count.

Figure 5E:
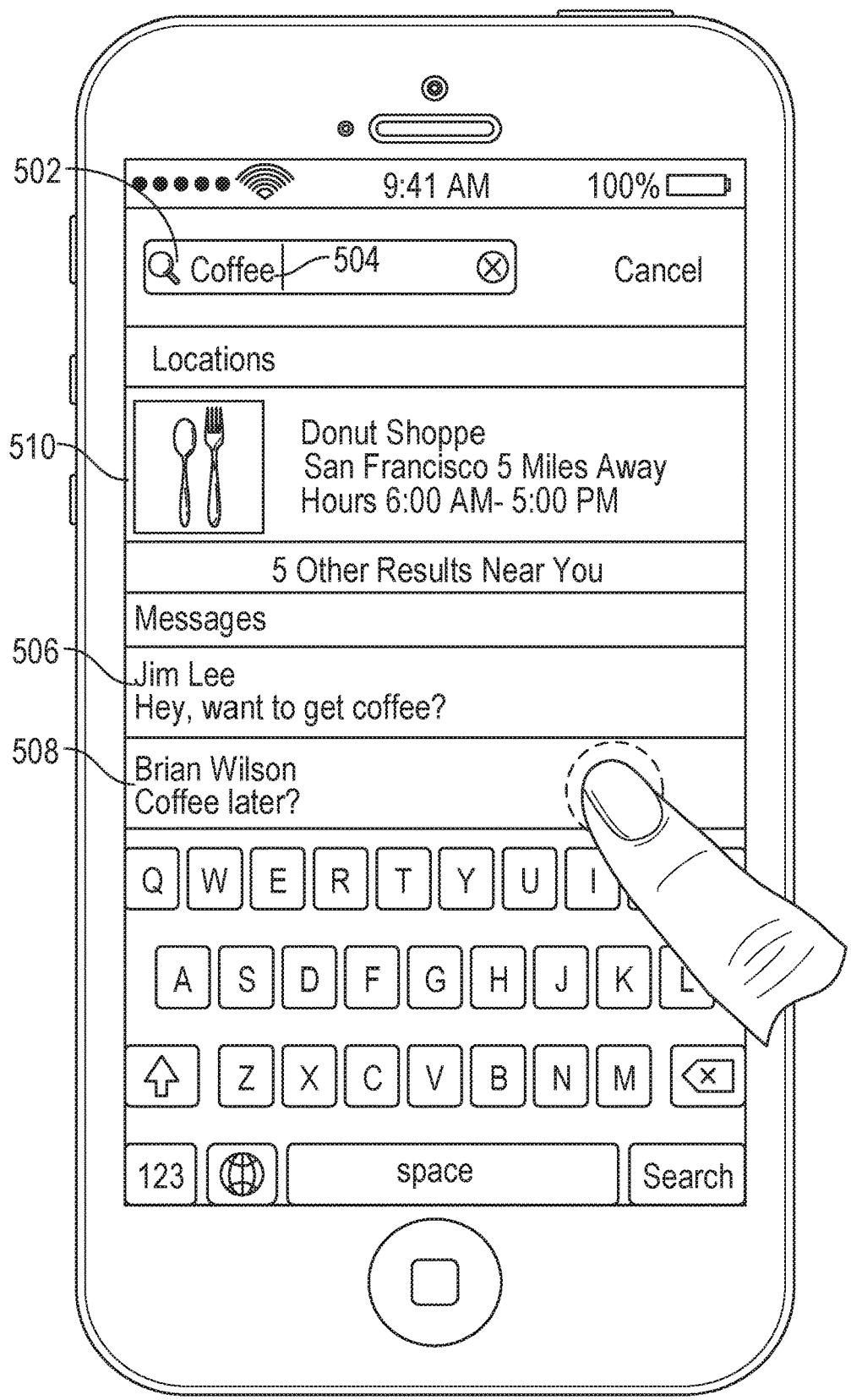
Figure 5F:
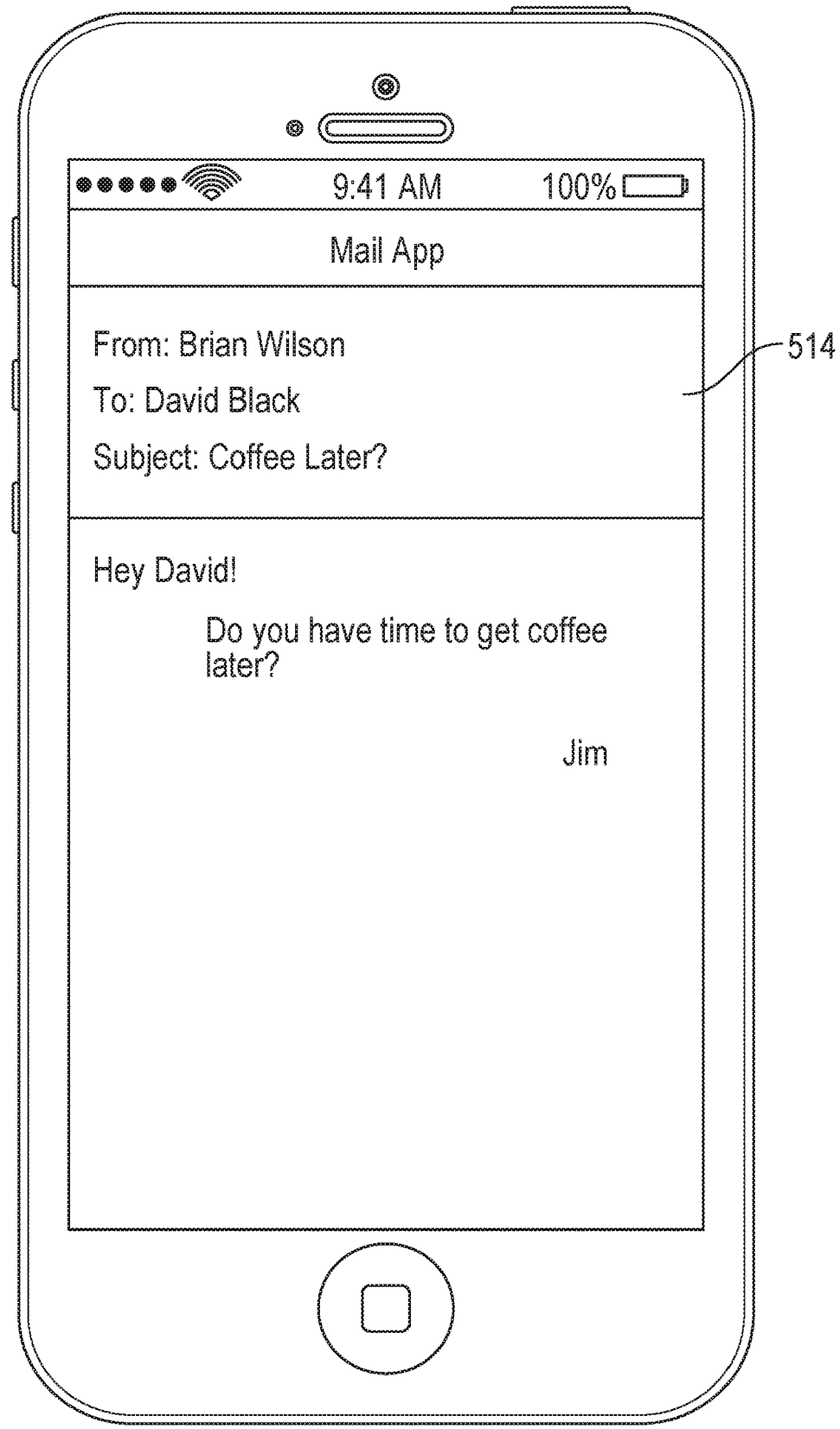

FIGS. 5E-5F illustrate exemplary user interfaces for displaying supplemental information as part of the remote search result information in accordance with some embodiments. In some embodiments, the displayed remote search result information comprises a first remote search result (e.g., Donut Shoppe search result 510 of FIG. 5E) associated with a respective software application (e.g., a software application that is different from an application in which the search is being performed; the software application may be a restaurant review application). The device obtains supplemental information (e.g., the distance to a restaurant "5 Miles", restaurant hours "6:00 AM-5:00 PM") related to the first remote search result from the respective software application. In some examples, the respective software application accesses the supplemental information over the Internet. The device displays the supplemental information as part of the remote search result information. The device receives a selection of (e.g., a user taps on) the first remote search result, and, in response to receiving the selection of the first remote search result, the device displays the respective software application (e.g., a restaurant review application).

In some embodiments, the displayed local search result information comprises a first local search result (e.g., message 508 of FIG. 5E) associated with a respective software application (e.g., mail application 514 of FIG. 5F). The device obtains supplemental information (e.g., the subject or body of the email) related to the first local search result from the respective software application (e.g., mail application 514). The device displays the supplemental information as part of the local search result information. In some examples, the supplemental information displayed as part of the local search result information is stored locally on the device (e.g., the email was previously downloaded onto the device). The device receives a selection of (e.g., a user taps on) the first local search result (e.g., message 508 of FIG. 5E), and, in response to receiving the selection of the first local search result, the device displays the respective software application (e.g., mail application 514 of FIG. 5F). Thus, for example, an email application may retrieve the subject or body of an email and display the subject or body of the email as part of a displayed email result. When the user selects the email result, the email application opens and displays the email.

In some embodiments, the displayed remote search result information comprises a remote search result (e.g., search result 510 of FIG. 5E) and information accessed from a remote source (e.g., a website server) associated with the remote search result (e.g., information accessed from a server such as location or business hours). In some embodiments, the displayed local search result information comprises a local search result (e.g., message 508 of FIG. 5E) and information accessed from a local source (e.g., application on phone, email application on phone) associated with the local search result (e.g., the subject or content of the message). By including information accessed from the remote source and the local source in the remote search result and local search result, respectively, the user is presented with additional information, thereby reducing the need for the user to select the search result to access the full content or application associated with the search result.

Figure 5G:
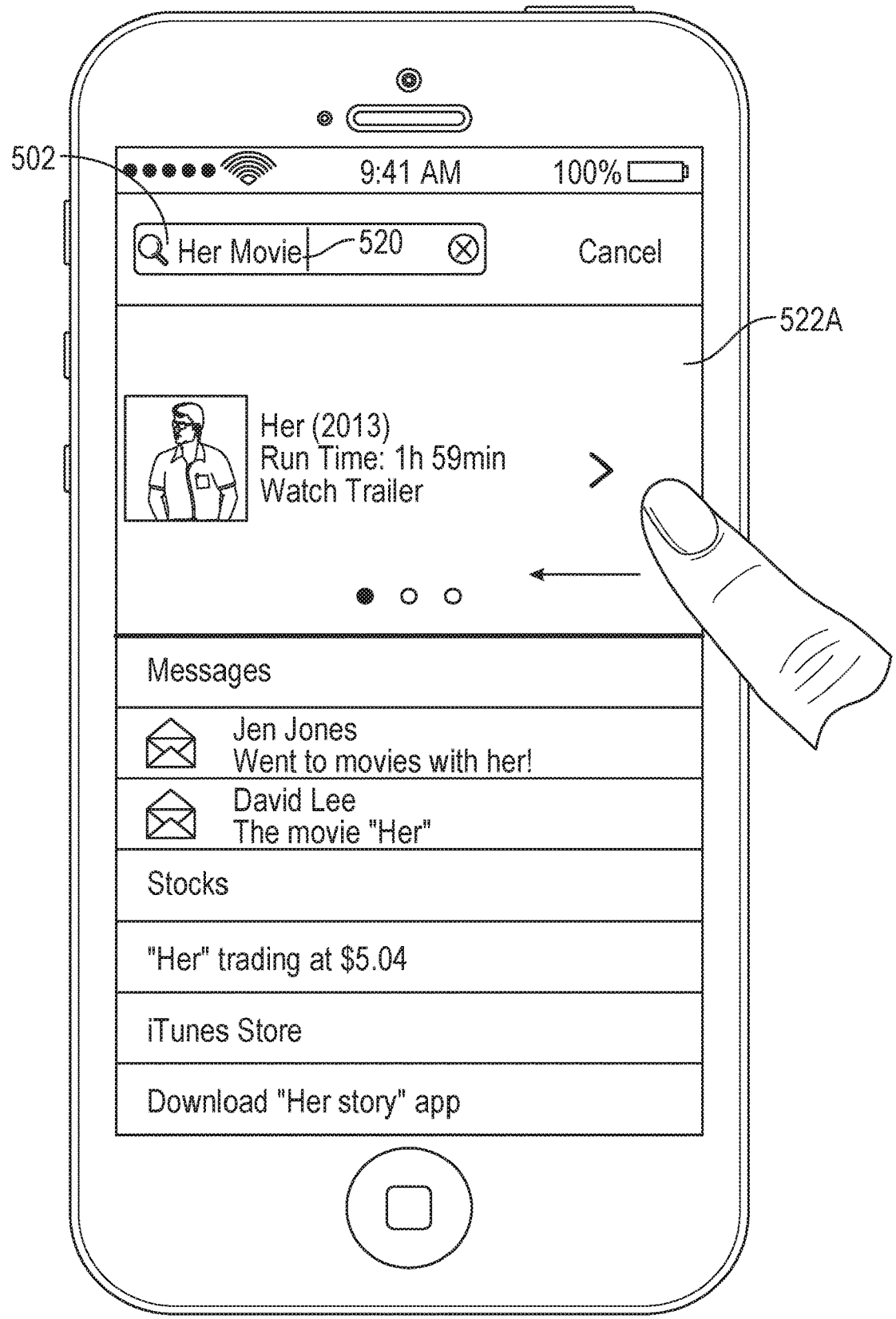
Figure 5H:
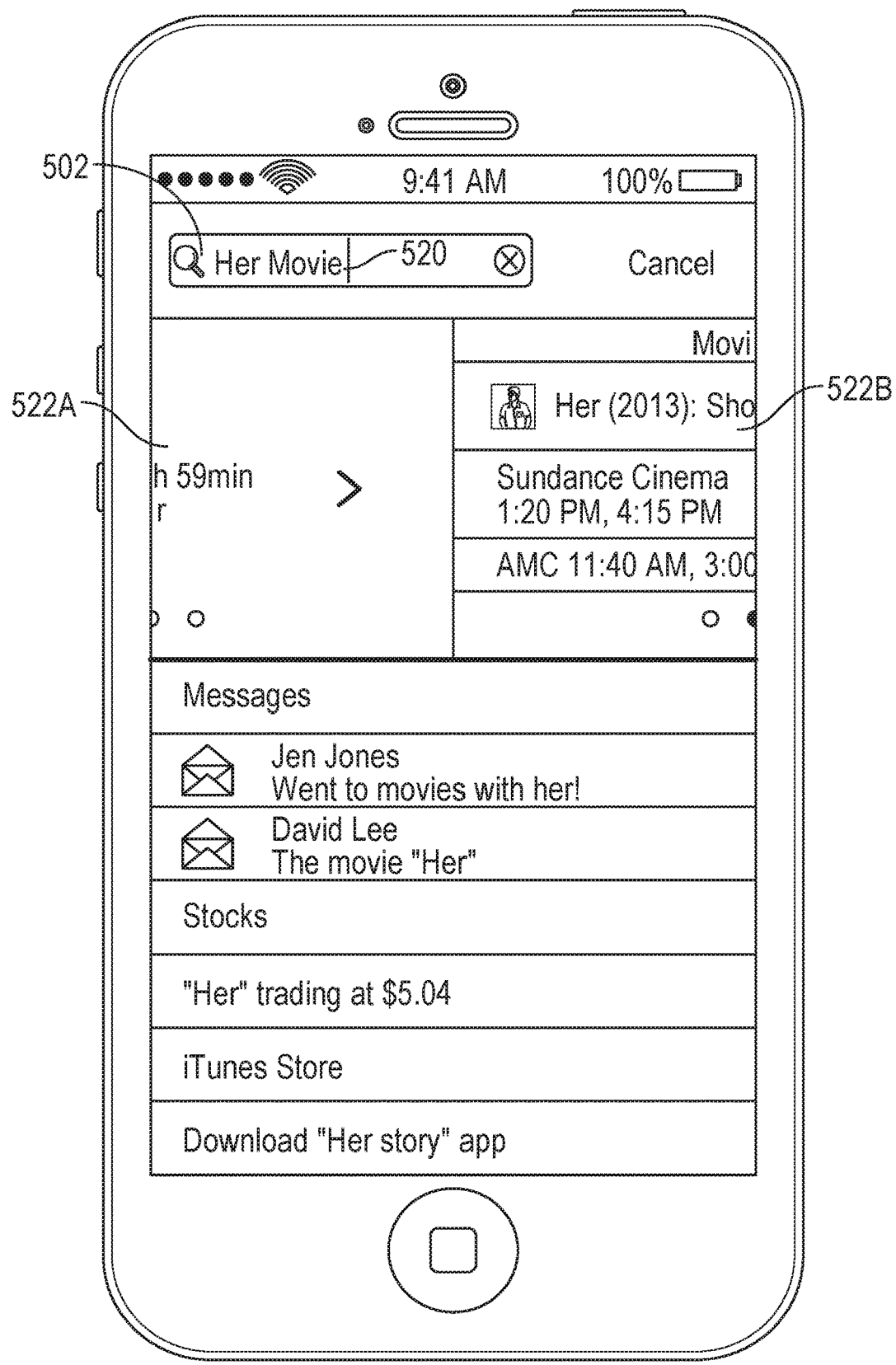
Figure 5I:
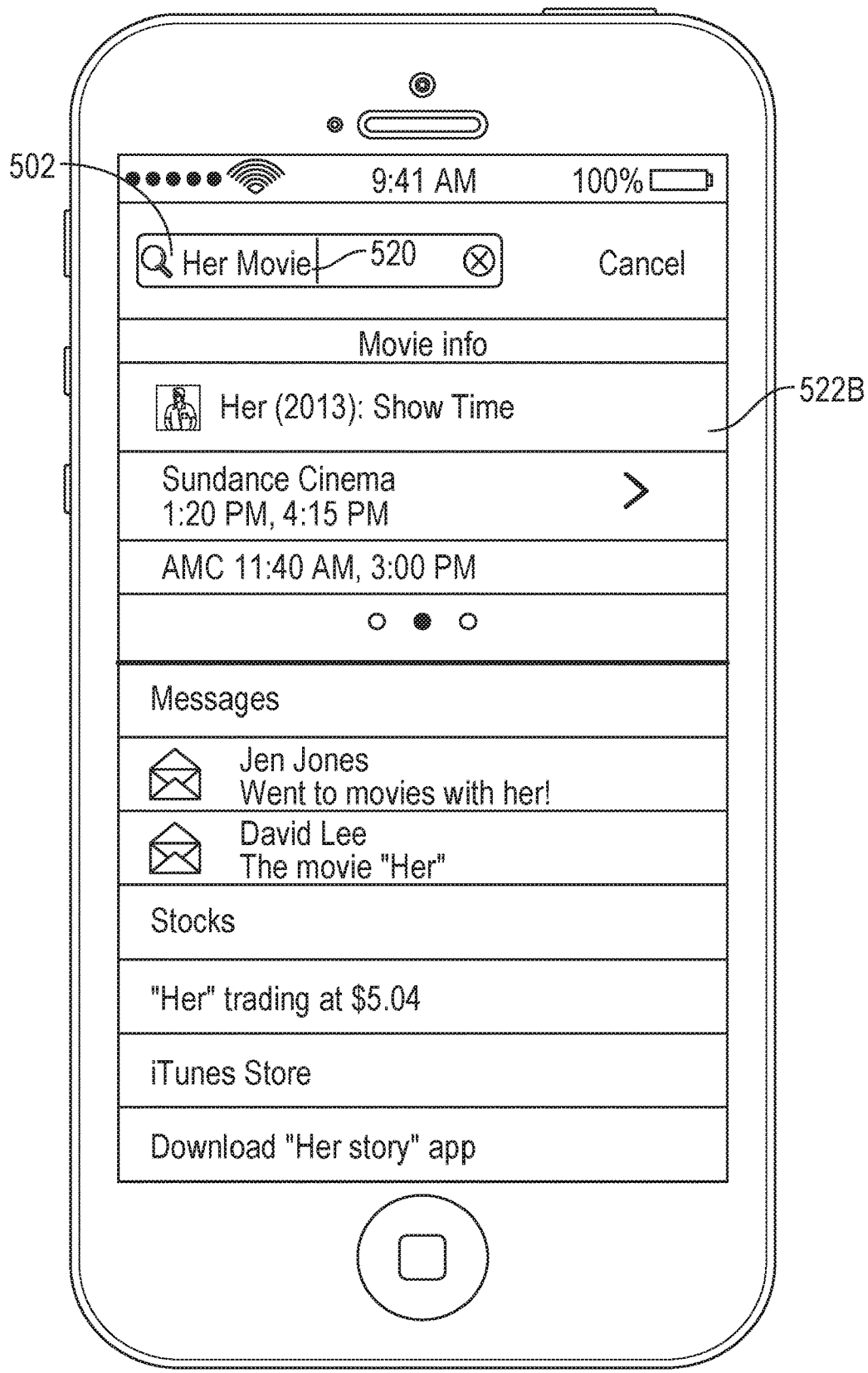

FIGS. 5G-5I illustrate exemplary user interfaces for displaying various parts of a remote search result in accordance with some embodiments. In these examples, a user has entered a search input of "Her Movie" (e.g., search input 520) and the device has displayed remote search result information. In some embodiments, the displayed remote search result information comprises a first remote search result. The device detects a swipe gesture (e.g., by the user swiping a finger, as illustrated in FIG. 5G) on a touch-sensitive surface at a location that corresponds to a location of a first portion of the first remote search result on the display (e.g., first portion 522A). In response to detecting the swipe gesture at the first portion of the first remote search result (e.g., first portion 522A), the device replaces display of the first portion of the first remote search result (e.g., first portion 522A) with display of a second portion of the first remote search result (e.g., 522B of FIG. 5I). In some embodiments, the first portion of the first remote search result (e.g., first portion 522A) is replaced with the second portion of the first remote search result (e.g., 522B of FIG. 5I) by sliding the two portions across the display in the direction of the swipe gesture, as illustrated in the transitions between FIG. 5G, FIG. 5H, and FIG. 5I. In this example, the first portion allows the user to see basic details about the movie "Her", as well as providing an option to watch a trailer for the movie. After the swipe gesture, in FIG. 5I, the device displays show times for the movie "Her", as well as providing an option to access a show time for booking a ticket to watch the movie. In another embodiment, in response to detecting a swipe gesture while movie details from a movie details application are displaying, the device displays a link to make a movie reservation using a movie reservation application. In some embodiments, in response to detecting a swipe gesture while restaurant reviews from a restaurant review application are displayed, the device displays a link to make reservations using a restaurant reservation application.

FIGS. 5J-N illustrate exemplary user interfaces for receiving a search input and displaying search result information in accordance with some embodiments. At FIG. 5J, device 100 displays a user interface, including search field 530. In this example, a user of the device has entered a search input 532, such as an alphanumeric text string "Malon", into search field 530 to initiate a search. In some examples, the user does not need to indicate completion of entering the search input, such as by activating a search affordance or pressing an enter button, to initiate the search. Instead, the device may automatically request a search using the search input as the search input is progressively entered into search field 530.

Figure 5J:
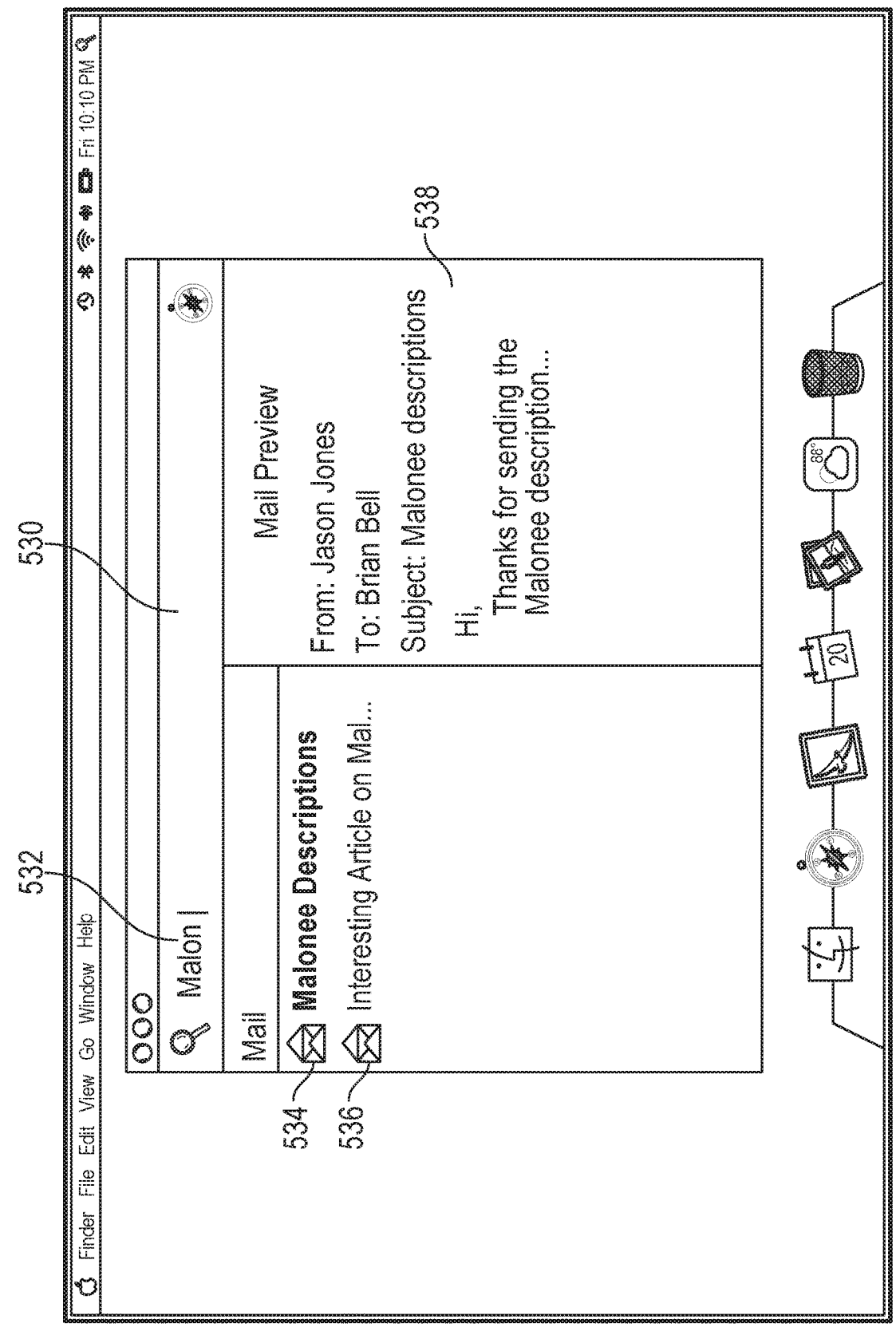

The device receives the search input 532 (e.g., as it is progressively entered). The device obtains one or more local search results based on the search input. The device determines whether the search input 532 (e.g., "Malon" in FIG. 5J) meets remote-search criteria. In some embodiments, the search input does not meet the remote-search criteria when the search input has a character count that does not exceed a threshold character count. For example, remote-search criteria is met when the length of the search input 532 is above a predefined number of characters. In response to receiving the search input, and in accordance with a determination that the search input does not meet the remote-search criteria (e.g., a length of the search input is not above the predefined number of characters), the device displays, on the display, local search result information (e.g., mail messages 534 and 536) that corresponds to the one or more local search results, as illustrated in FIG. 5J. Thus, FIG. 5J illustrates an example where the search input 532 of "Malon" does not meet remote-search criteria. However, relevant local results are still displayed. Search result 534 is selected by the user (e.g., by clicking the search result using a mouse cursor) on the left pane of the search application, and in response, a preview 538 of the content associated with search result 534 is displayed on the right pane of the search application. In this example, the preview 538 includes portions of the contents of a mail message that relates to the search input 532.

Figure 5K:
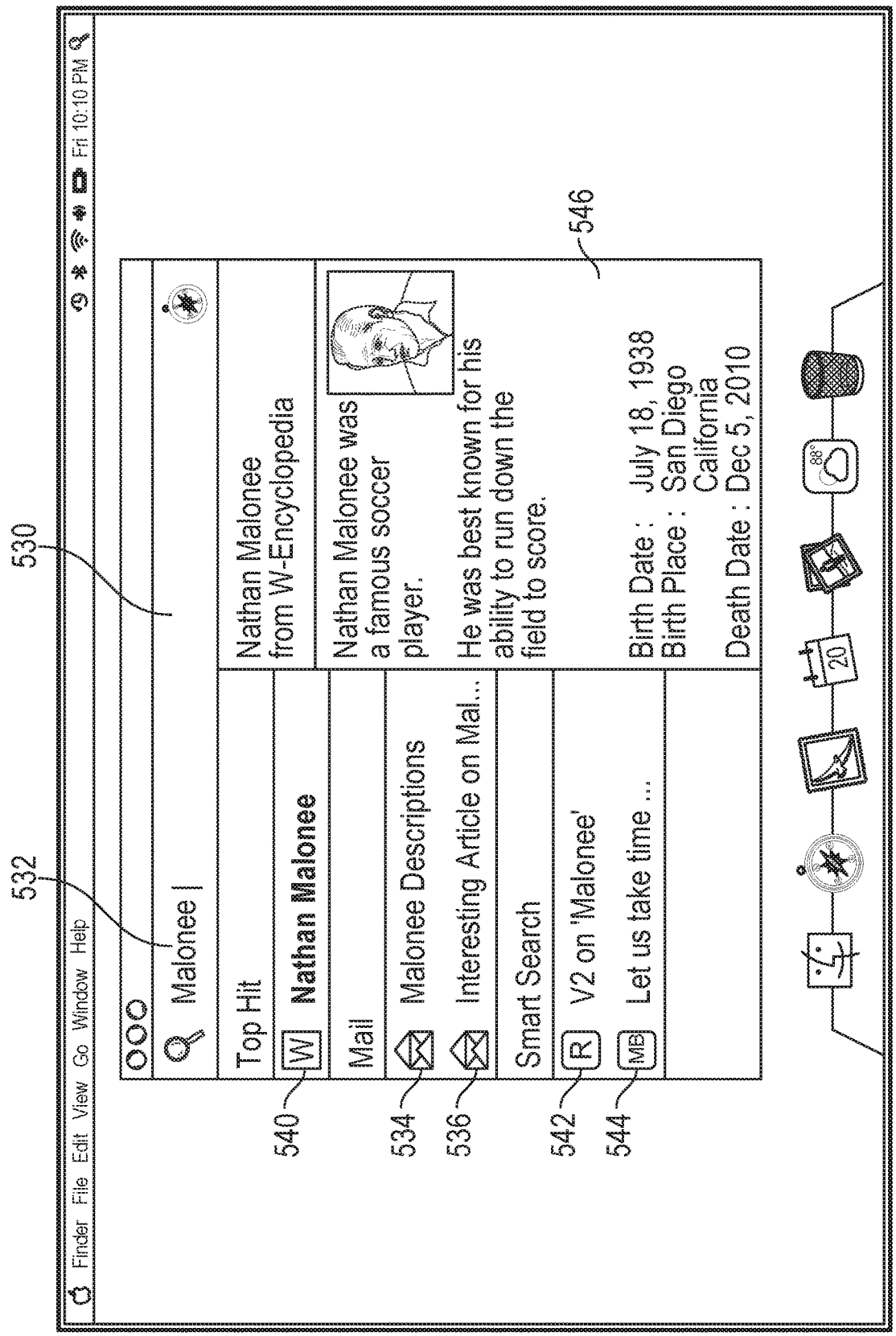

FIG. 5K illustrates an exemplary user interface where the search input 532 of "Malonee" does meet the remote-search criteria. In response to receiving the search input 532 (e.g., "Malonee" of FIG. 5K), and in accordance with a determination that the search input 532 (e.g., "Malonee" of FIG. 5K) meets the remote-search criteria (e.g., a length of the search input is above a predefined number of characters), the device obtains one or more remote search results based on the search input and concurrently displays, on the display, remote search result information (e.g., 540, 542, 544) that corresponds to the one or more remote search results and local search result information (e.g., mail messages 534 and 536) that correspond to the one or more local search results. In some embodiments, search result 540 is automatically selected (e.g., because it is the highest ranked result) on the left pane of the search application, and in response to being automatically selected, a preview 546 of the content associated with search result 540 is displayed on the right pane of the search application. In this example, the preview 546 includes portions of the contents of an Encyclopedia article that relates to the search term 532.

In some embodiments, the concurrently displayed remote search result information and local search result information are visibly displayed together on the display. For example, some of the remote search results and some of the local search results are displayed on the same screen. This makes the user aware that local search results are available when the user initially looks at the screen (and prior to any scrolling), even when remote search results are displayed at, for example, the top of search window application.

In some embodiments, the displayed remote search result information (e.g., Top Hit search result 540, Smart Search search results 542 and 544) comprises a remote search result of the one or more remote search results, the remote search result having a confidence value higher than a confidence threshold. For example, each of the one or more remote search results are assigned a corresponding confidence value. If the top search result (e.g., the remote search result with the highest confidence value) is determined not to be relevant to the user (e.g., confidence value is not higher than the confidence threshold), then the search result is not displayed to the user. In some embodiments, this determination is performed at a remote server that provides the one or more remote search results. In some embodiments, the determination is performed at the device. In FIG. 5K, Top Hit search result 540 has a corresponding confidence value higher than a confidence threshold, and is therefore displayed as part of the displayed remote search result information.

In some embodiments, the displayed remote search result information (e.g., Top Hit search result 540, Smart Search search results 542 and 544) comprises one or more top remote search results up to a threshold number of top remote search results (e.g., maximum three remote results so that the user is not inundated with remote results) that have a corresponding confidence value that exceeds a confidence threshold. Thus, even if numerous remote results have confidence values that exceed the confidence threshold, the number of remote results displayed is limited so that the user is more easily able to view and access local results. In FIG. 5K, the threshold number of top remote search results is three. Thus, even though a search for search input 532 returns more than three remote search results, only a maximum of three remote search results are displayed. In other examples, the threshold number of top remote search results determines how many remote search results are displayed at the top of the list of search results.

In some embodiments, prior to displaying the remote search result information, the device determines whether an identified remote search result of the one or more remote search results corresponds to a matching local search result of the one or more local search results. In accordance with a determination that the identified remote search result corresponds to the matching local search result, the device excludes the identified remote search result from the remote search result information prior to displaying the remote search result information. For example, in some embodiments, the device does not display a link to buy a video documentary (the identified remote search result), if the device determines that the device already has access to the video documentary (e.g., the video documentary is stored locally). Instead of the link to buy the video documentary, the device provides a link to locally access the video documentary on the device.

FIG. 5K also illustrates an exemplary user interface for displaying local search result information and remote search result information according to some embodiments. In some embodiments, concurrently displaying the remote search result information and the local search result information comprises displaying a first remote search result (e.g., Top Hit search result 540 of FIG. 5K) of the one or more remote search results at a first location on the display, displaying a plurality of local search results (e.g., Mail messages 534 and 536 of FIG. 5K) of the one or more local search results at a second location on the display, the second location being below the first location, and displaying a second remote search result (e.g., Smart Search search result 542 of FIG. 5K) of the one or more remote search results at a third location on the display, the third location being below the second location. In some embodiments, a remote search result is displayed at the top of the list of search results. This remote search result is followed by multiple displayed local search results, which are followed by another one or more remote search results. In this way, a user can quickly access the highest ranked remote search result and also have convenient access to local search results. While still accessible, the remote results other than the remote result displayed at the top of the list, are displayed at a location that is potentially less accessible to the user. For example, the user may need to scroll the screen to access the other remote results.

In some embodiments, the device receives additional characters added to the search input and updates the search results as the characters are added. The device receives additional characters added to the search input to form a second search input. The device obtains one or more second local search results based on the second search input. The device determines whether the second search input meets the remote-search criteria. In accordance with a determination that the second search input does not meet the remote-search criteria (e.g., a length of the second search input is not above the predefined number of characters), the device displays, on the display, updated local search result information that corresponds to the one or more second local search results. In accordance with a determination that the second search input meets the remote-search criteria, the device obtains one or more second remote search results based on the second search input, and concurrently displays, on the display, updated remote search result information that corresponds to the one or more second remote search results and updated local search result information that corresponds to the one or more second local search results. In some circumstances, the second search input meets the remote-search criteria while the first search input did not meet the remote-search criteria. For example, the first search input may not meet the remote-search criteria because the first search input has a character count that does not exceed a threshold character count. As the user enters an additional character into the search field, the newly formed search input (e.g., second search input) may meet the remote-search criteria. For example, this second search input may meet the remote-search criteria because it exceeds the threshold character count.

Figure 5L:
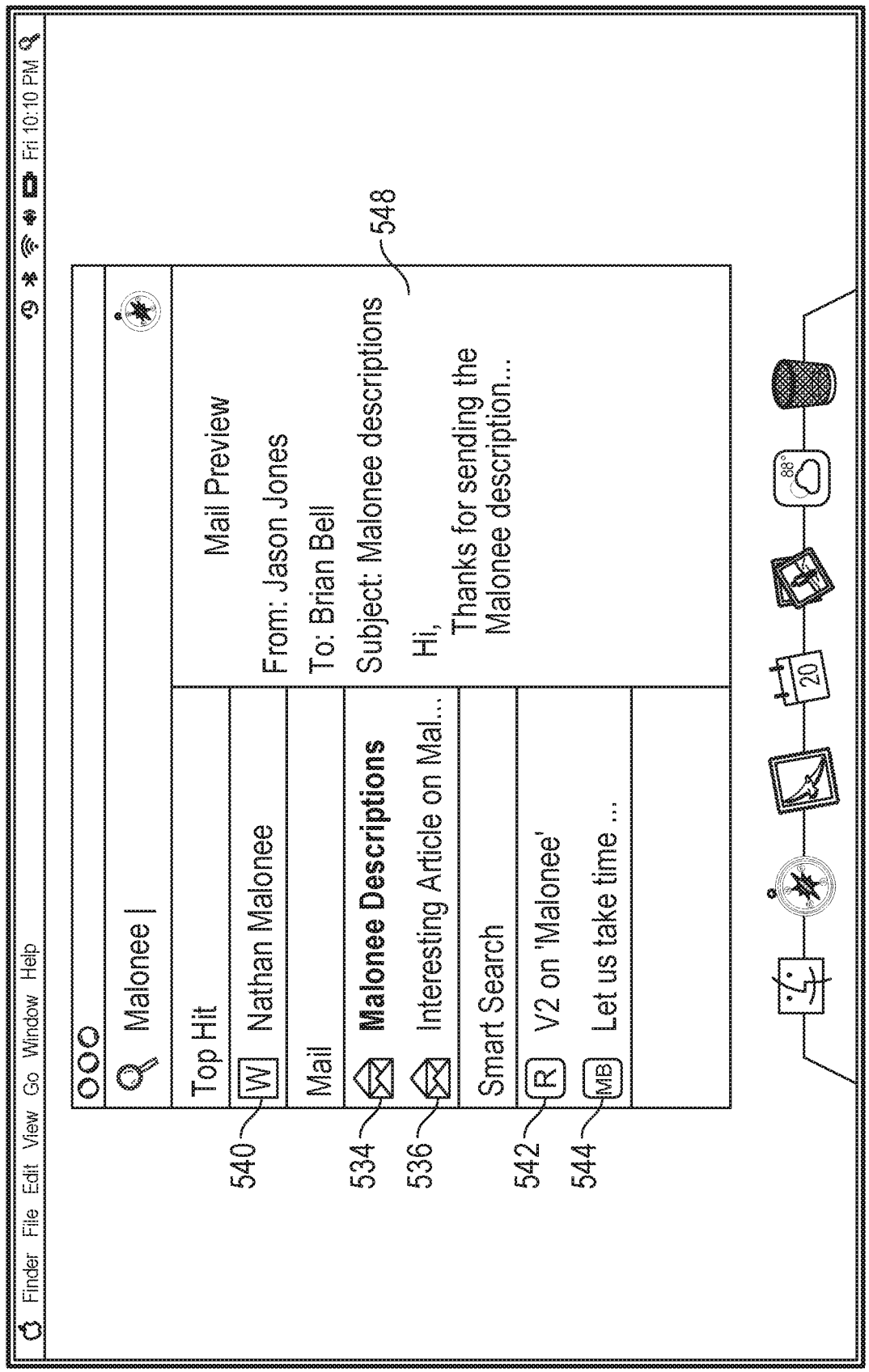
Figure 5M:
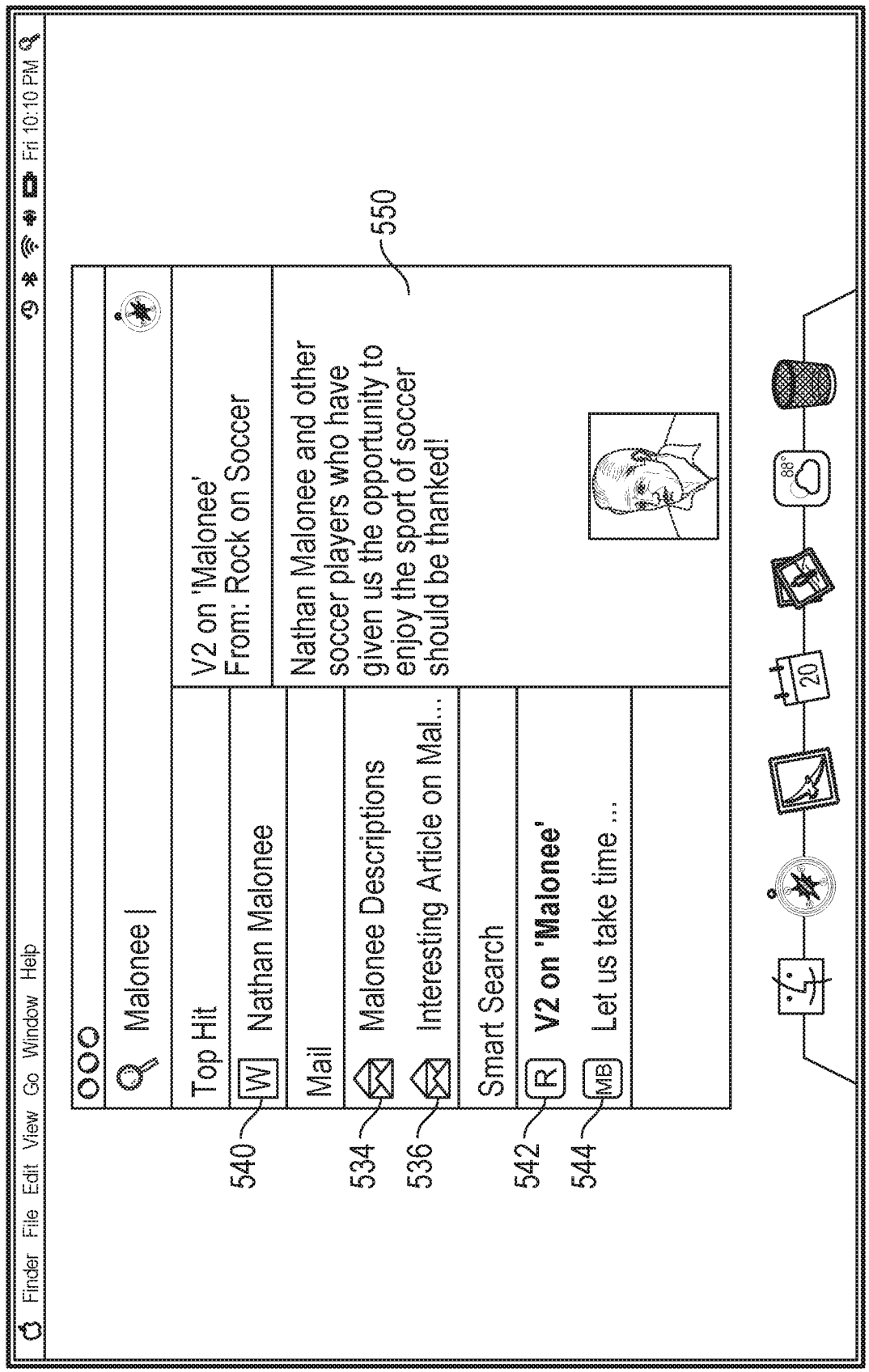

FIGS. 5K-5M illustrate exemplary user interfaces for receiving selections of search results on the left pane of a search application and displaying a preview of the selected search result on the right pane of the search application. For example, at FIG. 5K search result 540 is selected (as indicated by being bold), and a preview of the search result is displayed (e.g., 546 of FIG. 5K). In FIG. 5L, a user has selected mail messages 534, and a preview of mail messages 534 is displayed (e.g., 548 of FIG. 5L) in the right pane of the search application. In FIG. 5M, a user has selected search result 542, and a preview of the search result is displayed (e.g., 550 of FIG. 5M).

Figure 6B:
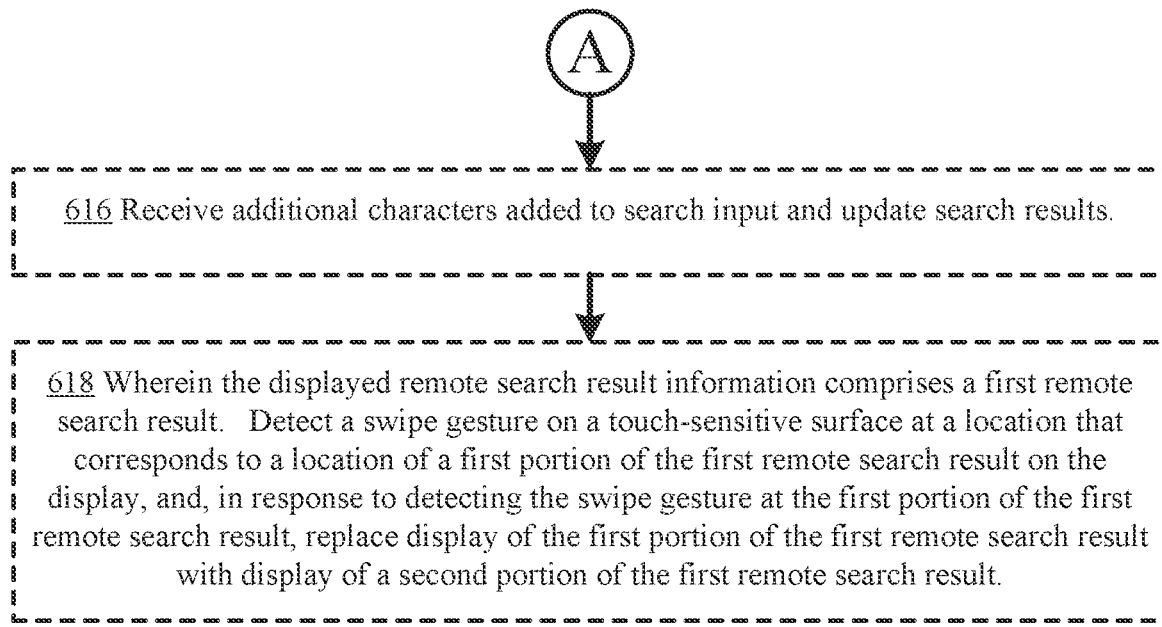

FIGS. 6A-6B are flow diagrams illustrating a method for displaying search result information in accordance with some embodiments. Method 600 is performed at a device (e.g., device 300, FIG. 3, or portable multifunction device 100, FIG. 1) with a display. Some operations in method 600 may be combined, the order of some operations may be changed, and some operations may be omitted.

As described below, method 600 provides an intuitive way to display search result information in accordance with some embodiments. The method reduces the cognitive burden on a user when searching, thereby creating a more efficient human-machine interface. For battery-operated computing devices, enabling a user to conduct a search faster and more efficiently conserves power and increases the time between battery charges.

At block 602, the device receives a search input (e.g., search input 504 of FIG. 5B, search input 532 of FIG. 5J). At block 604, the device obtains one or more local search results based on the search input. At block 606, the device determines whether the search input (e.g., search input 504 of FIG. 5B, search input 532 of FIG. 5J) meets remote-search criteria. In some embodiments, the search input does not meet the remote-search criteria when the search input has a character count that does not exceed a threshold character count. For example, remote-search criteria is met when the length of the search input is above a predefined number of characters.

At block 608, in response to receiving the search input the device performs one or more operations. At block 610, in accordance with a determination that the search input does not meet the remote-search criteria (e.g., a length of the search input is not above the predefined number of characters), the device displays, on the display, local search result information (e.g., messages 506 and 508 of FIG. 5B, mail messages 534 and 536 of FIG. 5J) that corresponds to the one or more local search results.

At block 612, in response to receiving the search input, and in accordance with a determination that the search input (e.g., search input 504 of FIG. 5C, search input 532 of FIG. 5K) meets the remote-search criteria (e.g., a length of the search input is above a predefined number of characters), the device obtains one or more remote search results based on the search input and concurrently displays, on the display, remote search result information (e.g., search result 510 of FIG. 5C, search results 540, 542, 544 of FIG. 5K) that corresponds to the one or more remote search results and local search result information (e.g., messages 506 and 508 of FIG. 5C, mail messages 534 and 536 of FIG. 5K) that corresponds to the one or more local search results.

In some embodiments, the concurrently displayed remote search result information and local search result information are visibly displayed together on the display. For example, some of the remote search results and some of the local search results are displayed on the same screen. This makes the user aware that local search results are available when the user initially looks at the screen (and prior to any scrolling), even when remote search results are displayed at, for example, the top of the display.

In some embodiments, the displayed remote search result information (e.g., search result 510 of FIG. 5C, search results 540, 542, and 544 of FIG. 5K) comprises a remote search result of the one or more remote search results, the remote search result having a confidence value higher than a confidence threshold. For example, each of the one or more remote search results are assigned a corresponding confidence value. If the top search result (e.g., the remote search result with the highest confidence value) is determined not to be relevant to the user (e.g., confidence value is not higher than the confidence threshold), then the search result is not displayed to the user. In some embodiments, this determination is performed at a remote server that provides the one or more remote search results. In some embodiments, the determination is performed at the device.

In some embodiments, the displayed remote search result information (e.g., search result 510 of FIG. 5C, search results 540, 542, and 544 of FIG. 5K) comprises one or more top remote search results up to a threshold number of top remote search results (e.g., maximum one remote result so that the user is not inundated with remote results) that have a corresponding confidence value that exceeds a confidence threshold. Thus, even if numerous remote results have confidence values that exceed the confidence threshold, the number of remote results displayed is limited so that the user is more easily able to view and access local results. In some embodiments, the threshold number of top remote search results limits the number of remote search results displayed at the top of the displayed search results (e.g., above the initial displayed local search result).

In some embodiments, prior to displaying the remote search result information, the device determines whether an identified remote search result of the one or more remote search results corresponds to a matching local search result of the one or more local search results. In accordance with a determination that the identified remote search result corresponds to the matching local search result, the device excludes the identified remote search result from the remote search result information prior to displaying the remote search result information. For example, in some embodiments, the device does not display a link to buy an album (the identified remote search result), if the device determines that the device already has access to the album (e.g., the album is stored locally). Instead of the link to buy the album, the device provides a link to locally access the album on the device.

At block 614, in some embodiments, concurrently displaying the remote search result information and the local search result information comprises displaying a first remote search result of the one or more remote search results (e.g., 510 of FIG. 5D, 540 of FIG. 5K) at a first location on the display, displaying a plurality of local search results (e.g., messages 506 and 508 of FIG. 5D, mail messages 534, 536 of FIG. 5K) of the one or more local search results at a second location on the display, the second location being below the first location, and displaying a second remote search result (e.g., search results 512 of FIG. 5D, search results 542 and 544 of FIG. 5K) of the one or more remote search results at a third location on the display, the third location being below the second location. In some embodiments, a remote search result is displayed at the top of the list of search results. This remote search result is followed by multiple displayed local search results, which are followed by another one or more remote search results. In this way, a user can quickly access the highest ranked remote search result and also have convenient access to local search results. While still accessible, the remote results other than the remote result displayed at the top of the list, are displayed at a location that is potentially less accessible to the user. For example, the user may need to scroll the screen to access the other remote results.

At block 616, in some embodiments, the device receives additional characters added to the search input and updates the search results. The device receives additional characters added to the search input to form a second search input. The device obtains one or more second local search results based on the second search input. The device determines whether the second search input meets the remote-search criteria. In accordance with a determination that the second search input does not meet the remote-search criteria (e.g., a length of the second search input is not above the predefined number of characters), the device displays, on the display, updated local search result information that corresponds to the one or more second local search results. In accordance with a determination that the second search input meets the remote-search criteria, the device obtains one or more second remote search results based on the second search input, and concurrently displays, on the display, updated remote search result information that corresponds to the one or more second remote search results and updated local search result information that corresponds to the one or more second local search results. In some circumstances, the second search input meets the remote-search criteria while the first search input did not meet the remote-search criteria. For example, the first search input may not meet the remote-search criteria because the first search input has a character count that does not exceed a threshold character count. As the user enters an additional character into the search field, the newly formed search input (e.g., second search input) may meet the remote-search criteria. For example, this second search input may meet the remote-search criteria because it exceeds the threshold character count.

In some embodiments, the displayed remote search result information comprises a first remote search result (e.g., search result 510 of FIG. 5D) associated with a respective software application (e.g., a software application that is different from an application in which the search is being performed, such as a restaurant review application). The device obtains supplemental information related to the first remote search result from the respective software application. The device displays the supplemental information as part of the remote search result information. The device receives a selection of (e.g., a user taps on) the first remote search result, and, in response to receiving the selection of the first remote search result, the device displays the respective software application (e.g., a restaurant review application). This allows the user to access more information about a search result by selecting the search result. The respective software application that is displayed may include additional details about the search result.

In some embodiments, the displayed local search result information comprises a first local search result (e.g., message 508 of FIG. 5E) associated with a respective software application (e.g., mail application 514 of FIG. 5F). The device obtains supplemental information (e.g., the subject or body of the email message) related to the first local search result from the respective software application (e.g., mail application 514). The device displays the supplemental information as part of the local search result information. The device receives a selection of (e.g., a user taps on) the first local search result, and, in response to receiving the selection of the first local search result, the device displays the respective software application (e.g., mail application 514 of FIG. 5F). Thus, for example, an email application may retrieve the subject or body of an email and display the subject or body of the email as part of a displayed email result. When the user selects the email result, the email application opens and displays the email so that the user can access more details about the email.

In some embodiments, the displayed remote search result information comprises a remote search result (e.g., search result 510 of FIG. 5E) and information accessed from a remote source (e.g., a website server) associated with the remote search result (e.g., information accessed from a website, distance, business hours), and wherein the displayed local search result information comprises a local search result (e.g., message 508 of FIG. 5E) and information accessed from a local source (e.g., application on phone, email application on phone) associated with the local search result (e.g., the subject or content of the message). By including information accessed from the remote source and the local source in the remote search result and local search result, respectively, the user is presented with additional information, thereby reducing the need for the user to select the search result to access the full content or application associated with the search result.

At block 618, in some embodiments, the displayed remote search result information comprises a first remote search result. The device detects a swipe gesture on a touch-sensitive surface at a location that corresponds to a location of a first portion of the first remote search result on the display (e.g., 522A of FIG. 5G). In response to detecting the swipe gesture at the first portion of the first remote search result (e.g., 522A of FIG. 5G), the device replaces display of the first portion of the first remote search result (e.g., 522A of FIG. 5G) with display of a second portion of the first remote search result (e.g., second portion 522B of FIG. 5I). In some embodiments, the first portion of the first remote search result (e.g., first portion 522A) is replaced with the second portion of the first remote search result (e.g., 522B of FIG. 5I) by sliding the two portions across the display in the direction of the swipe gesture. In some embodiments, in response to detecting a swipe gesture while movie details from a movie details application are displaying, the device displays a link to make a movie reservation using a movie reservation application. In some embodiments, in response to detecting a swipe gesture while restaurant reviews from a restaurant review application are displayed, the device displays a link to make reservations using a restaurant reservation application.

Note that details of the processes described above with respect to method 600 (e.g., FIGS. 6A-B and 5A-5M) are also applicable in an analogous manner to the methods described below. For example, methods 800 and 1000 may include one or more of the characteristics of the various methods described above with reference to method 600. For brevity, these details are not repeated below. The various methods and techniques described above with reference to method 600 may be optionally implemented as one or more units, such as those described with regard to FIG. 11.

The operations described above with reference to the figures may be implemented by components depicted in FIGS. 1A-1B. For example, display operations and determination operations may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 7A:
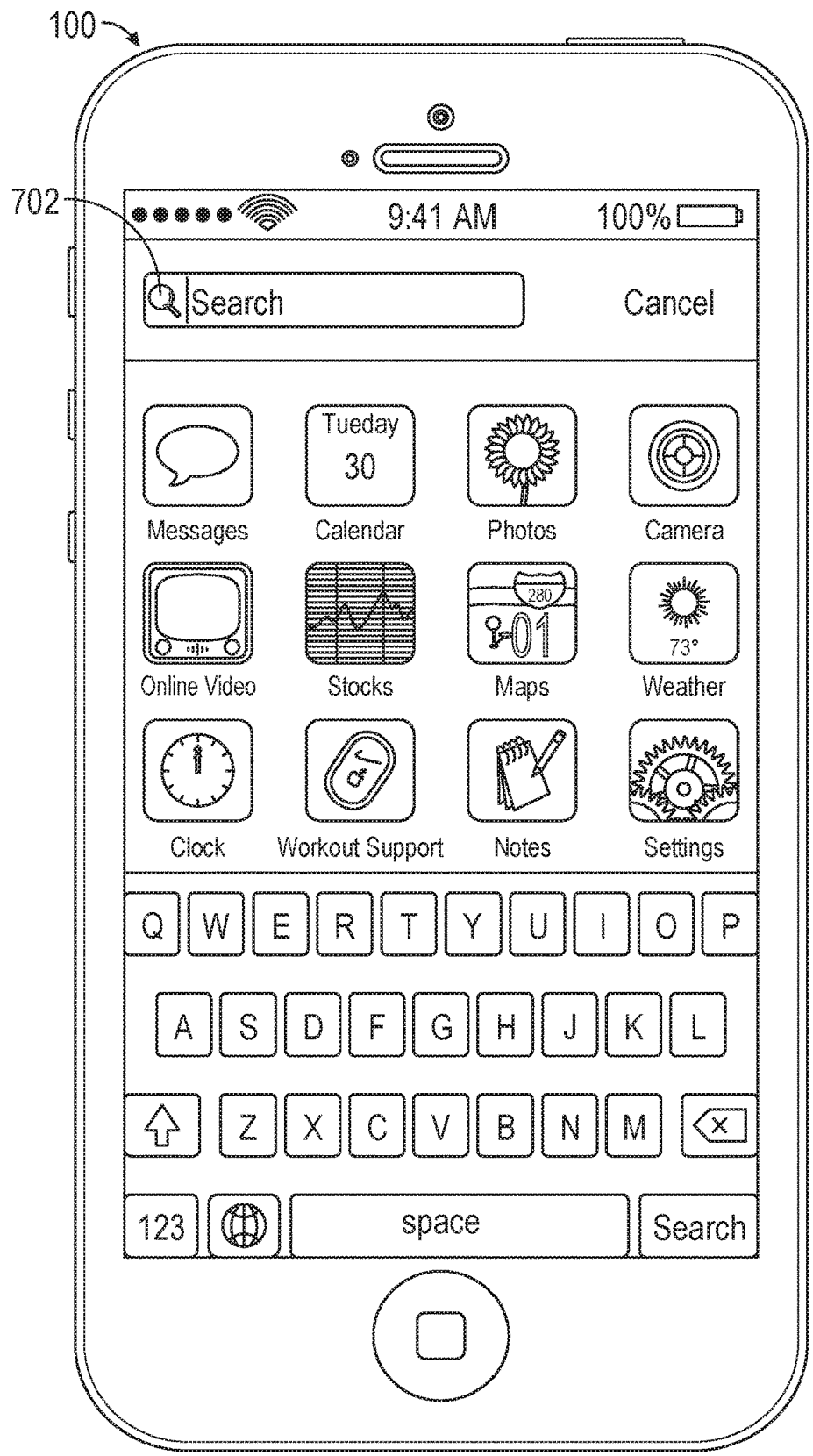
FIGS. 7A-7N illustrate exemplary user interfaces for previewing content of a search result in accordance with some embodiments.
Figure 7B:
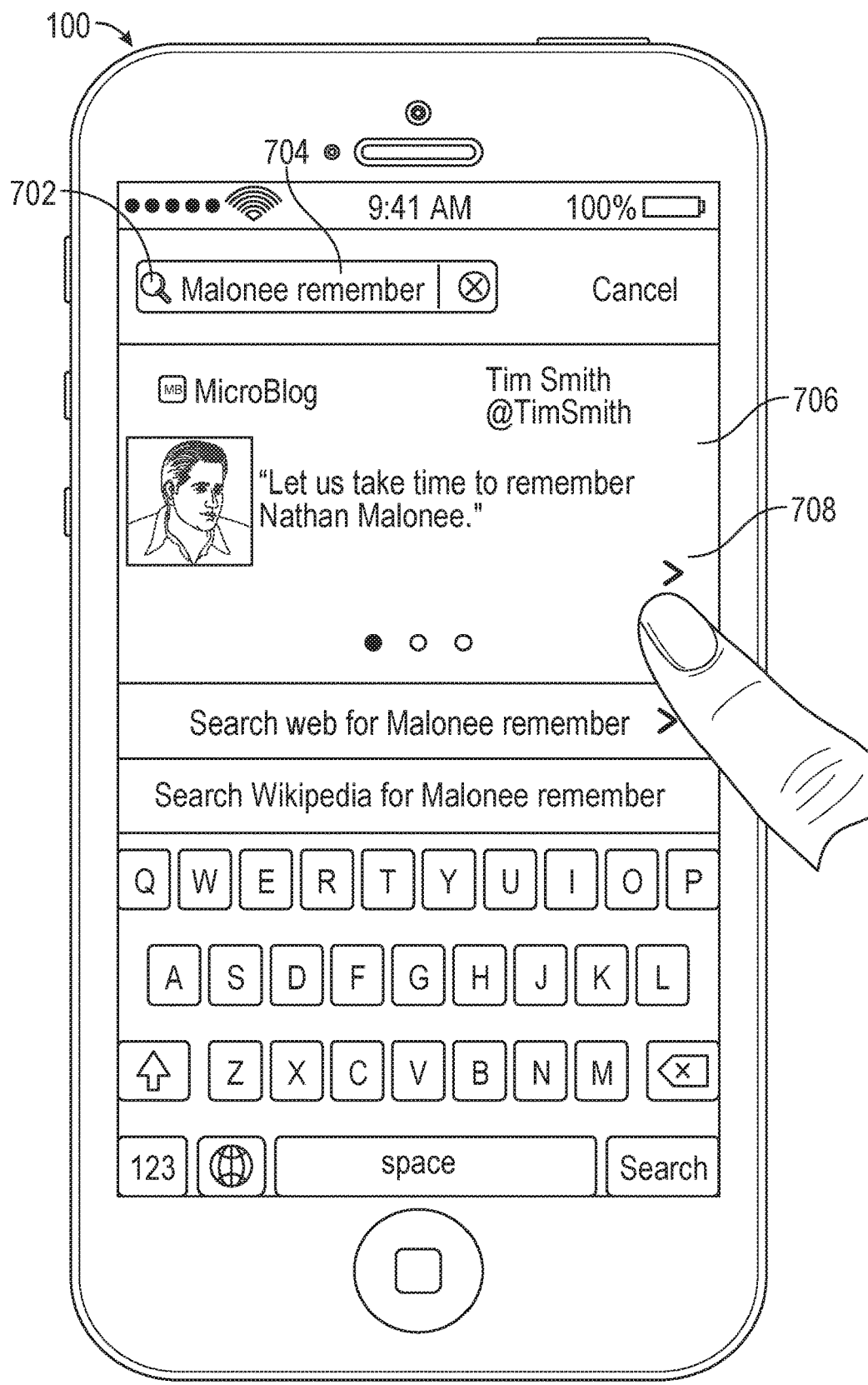
Figure 7C:
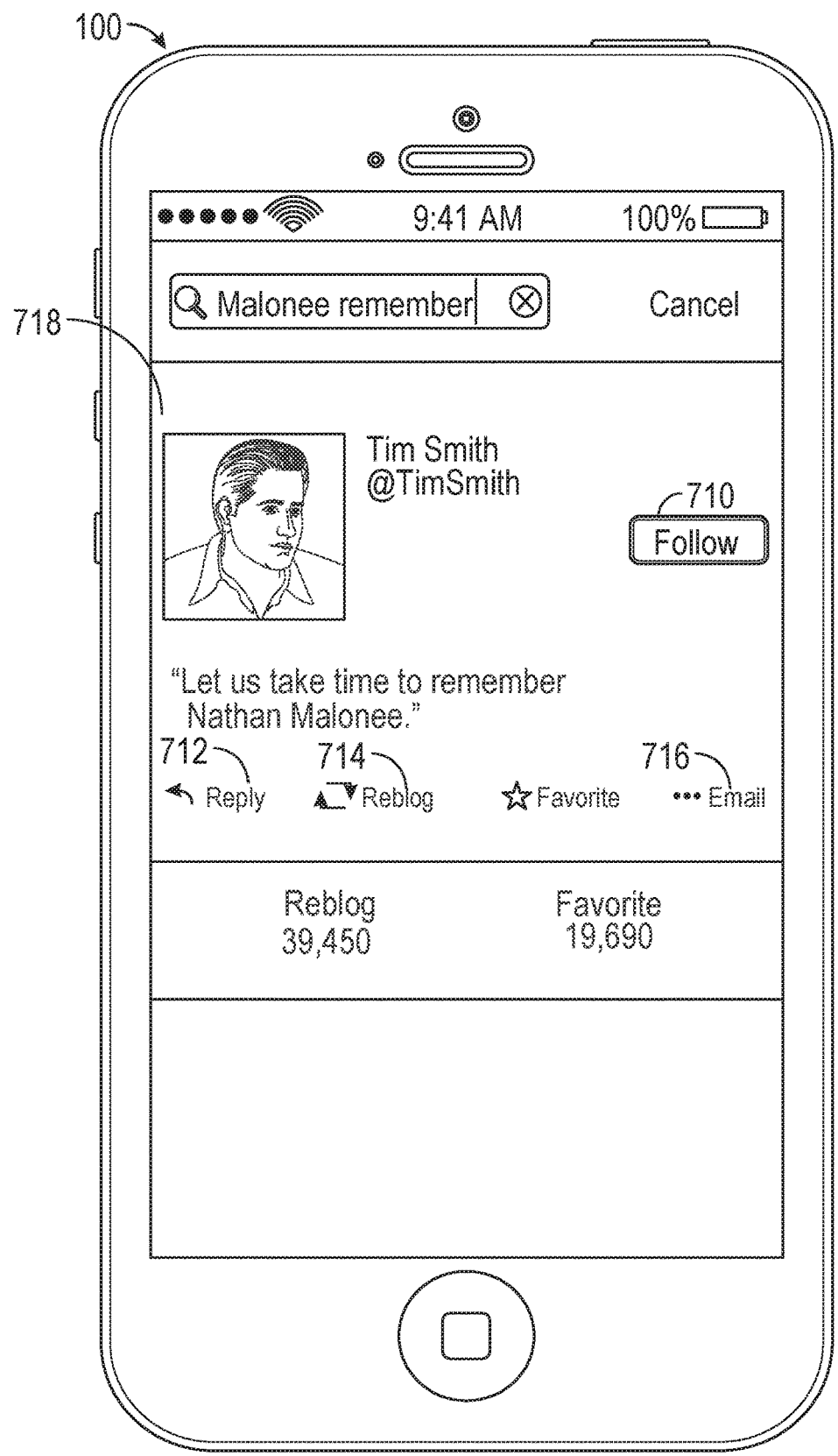
Figure 7D:
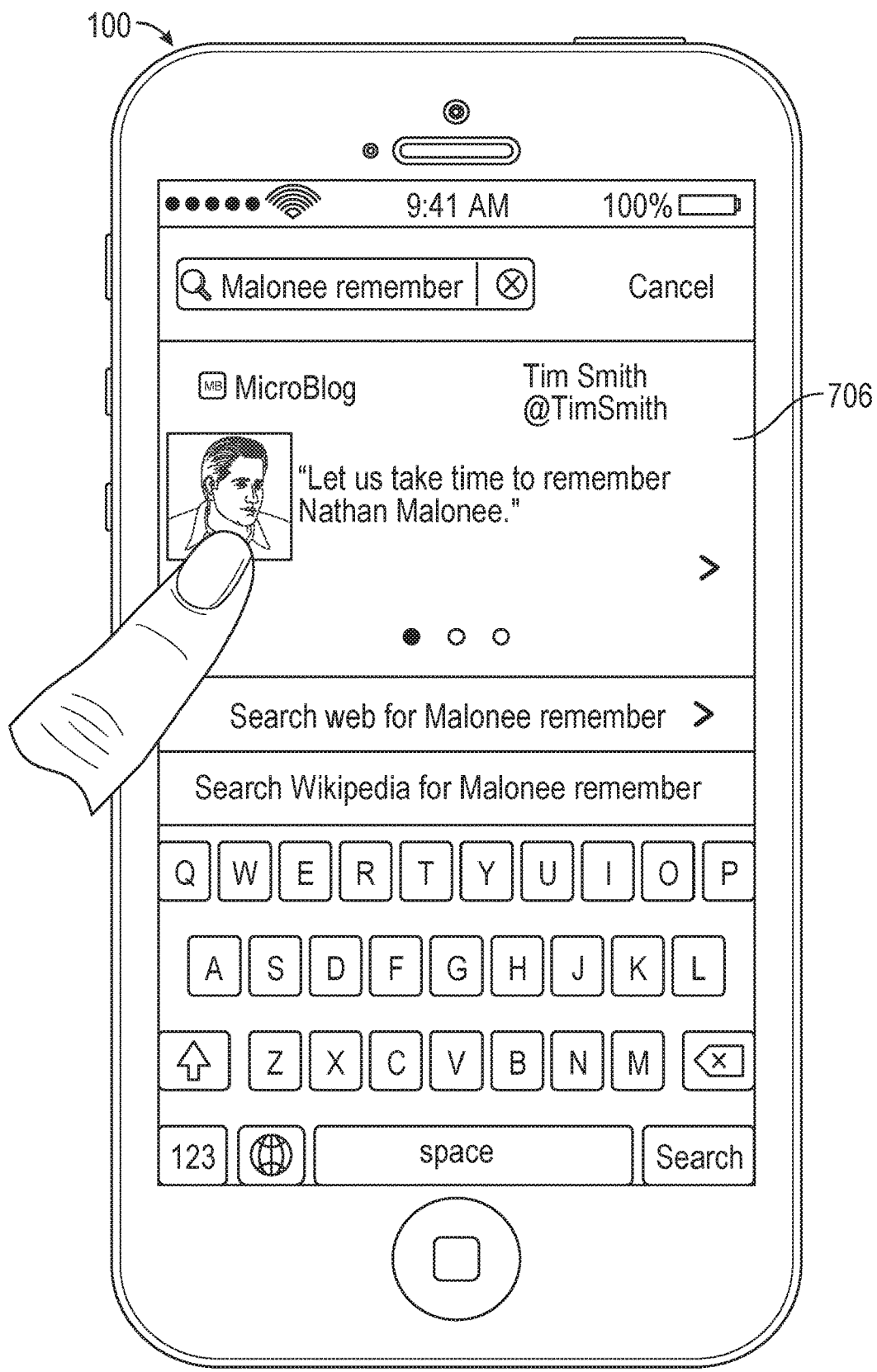
Figure 7E:
Figure 7F:
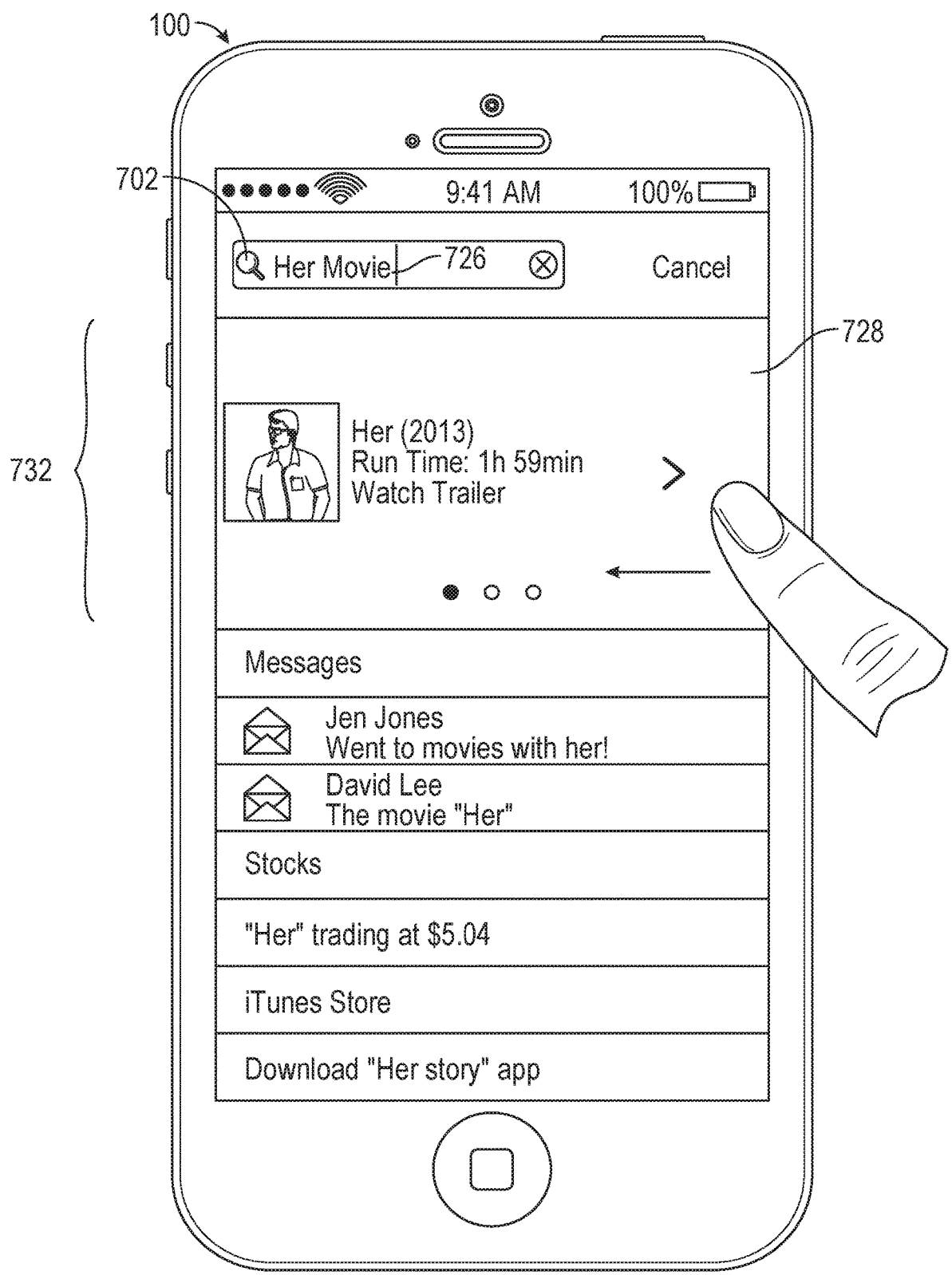
Figure 7G:
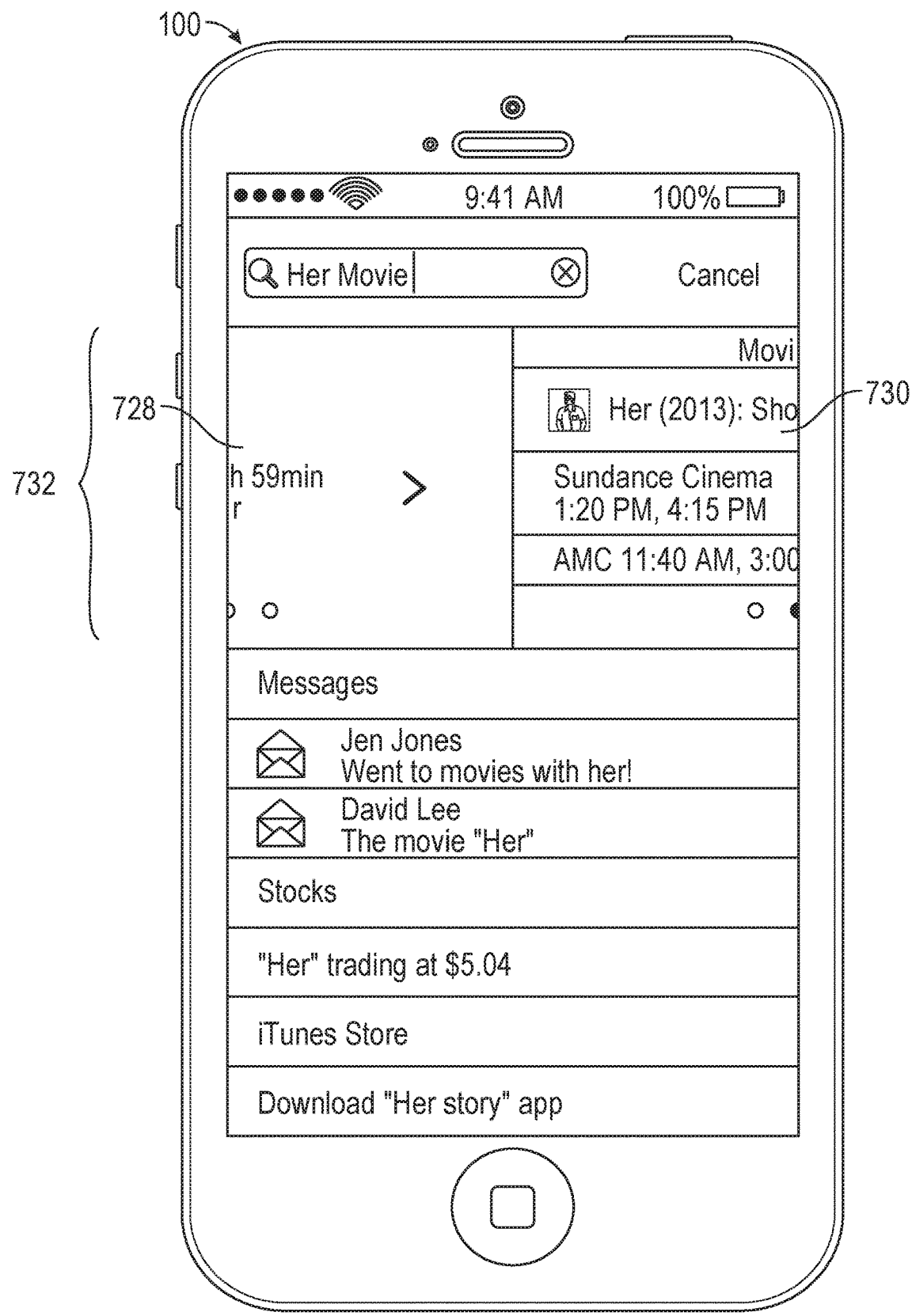
Figure 7H:
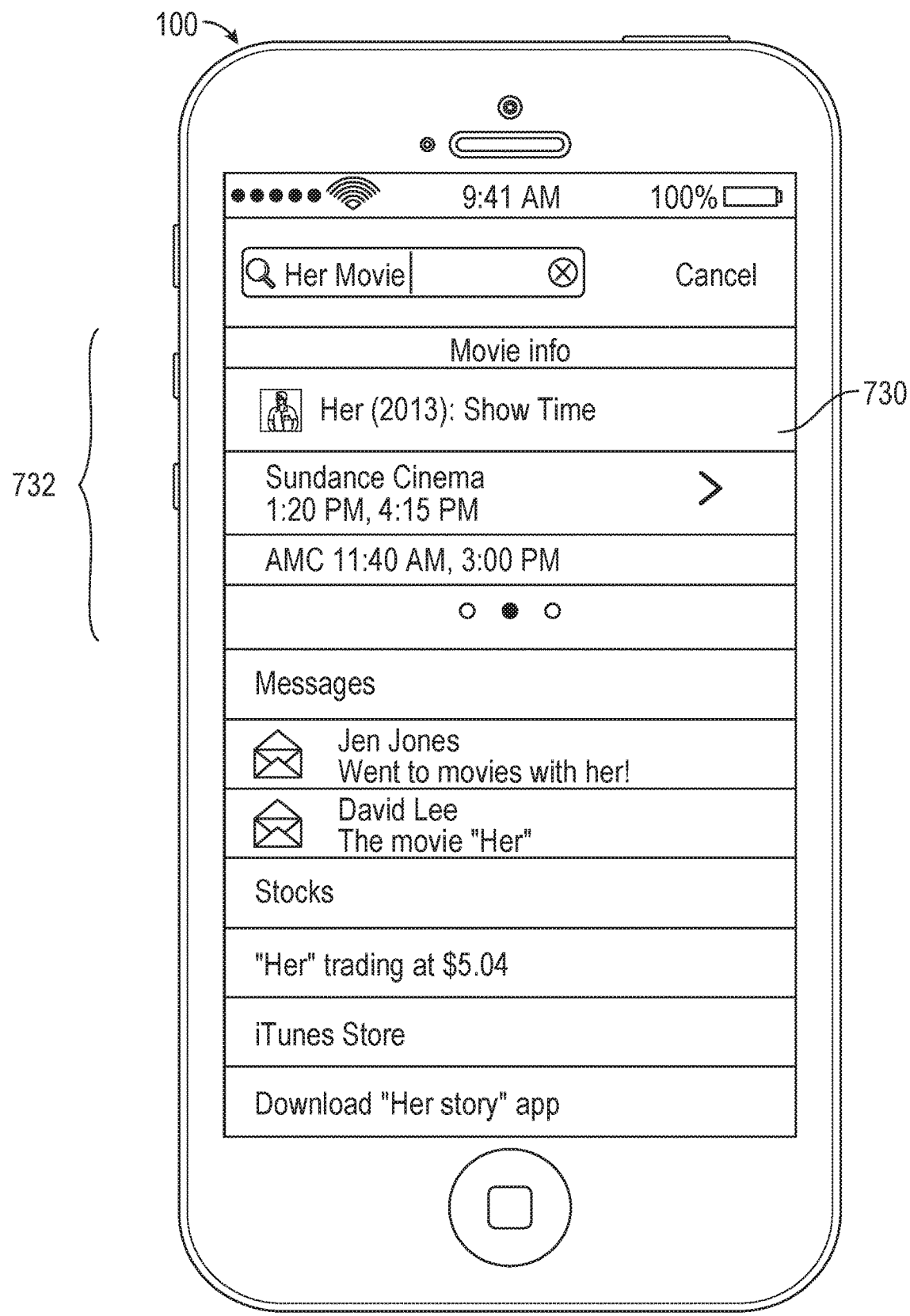
Figure 7I:
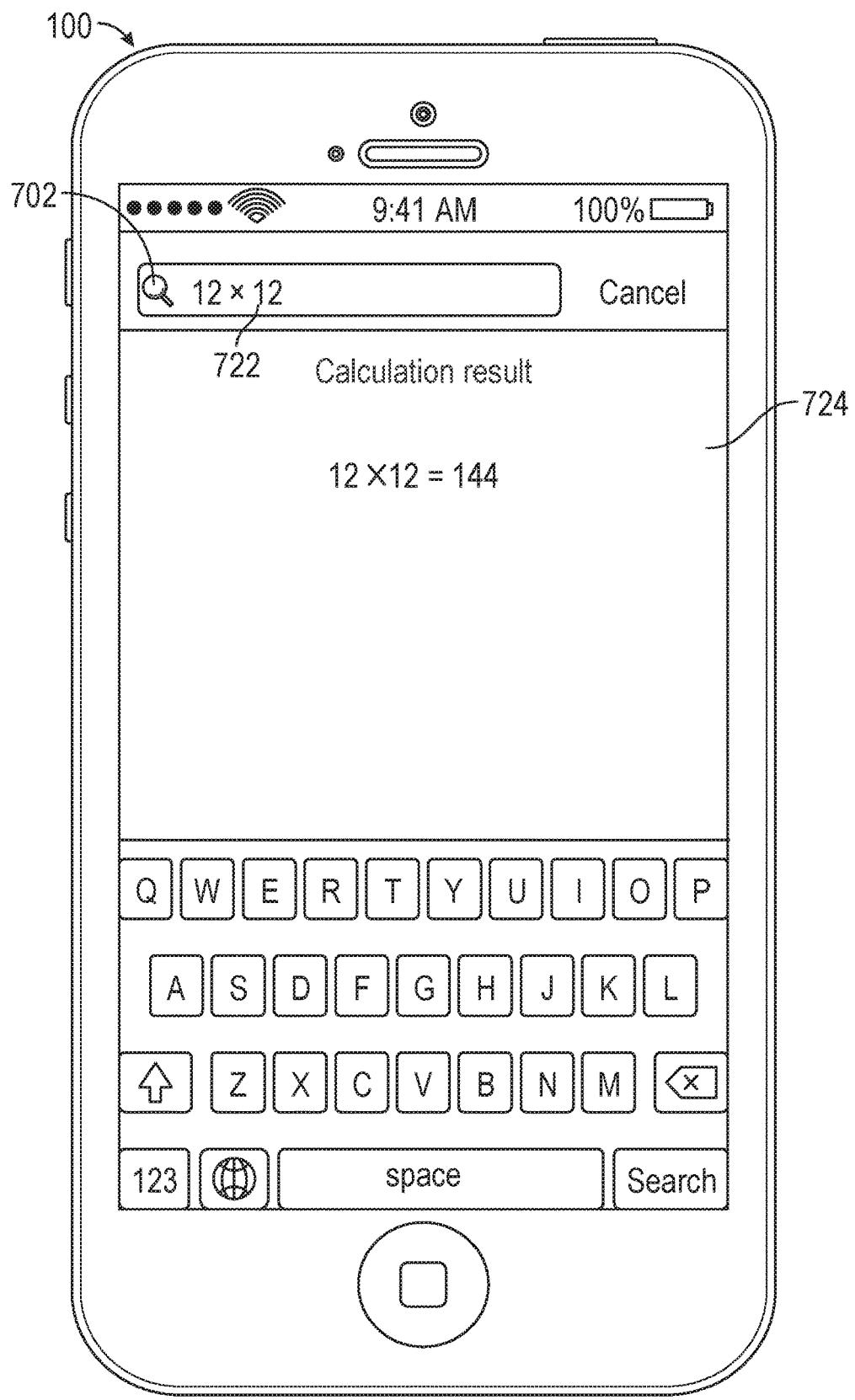
Figure 7J:
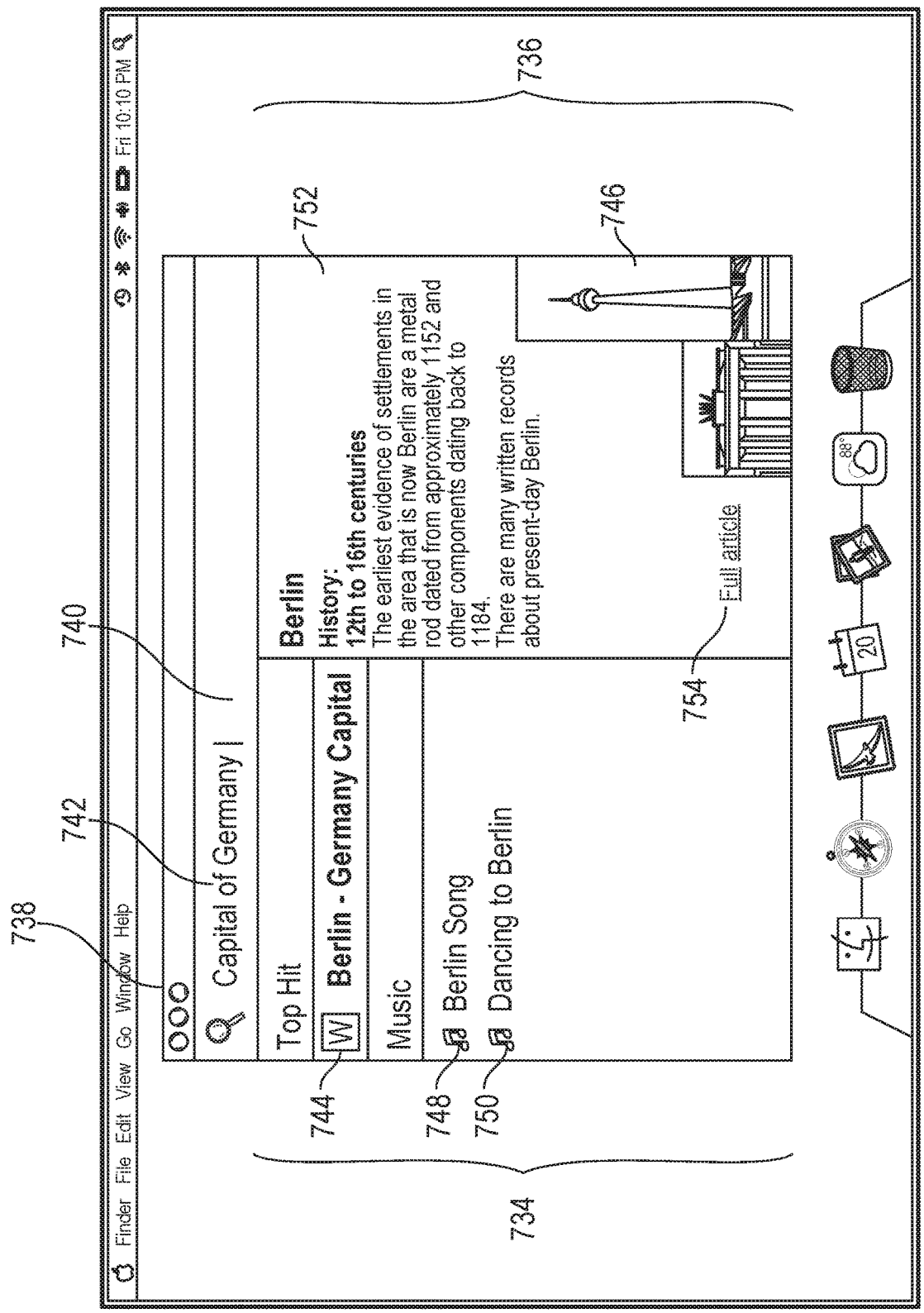
Figure 7K:
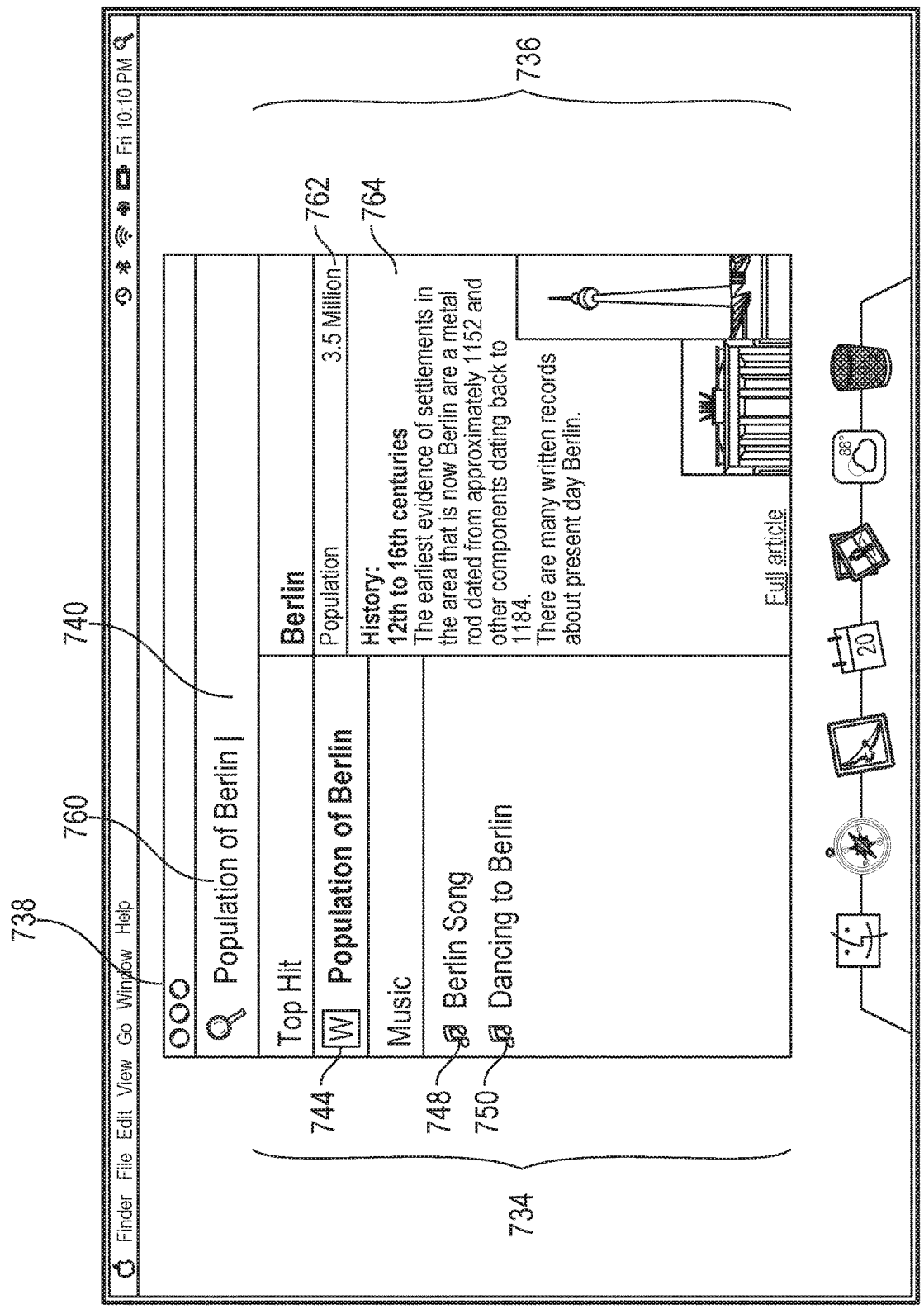
Figure 7L:
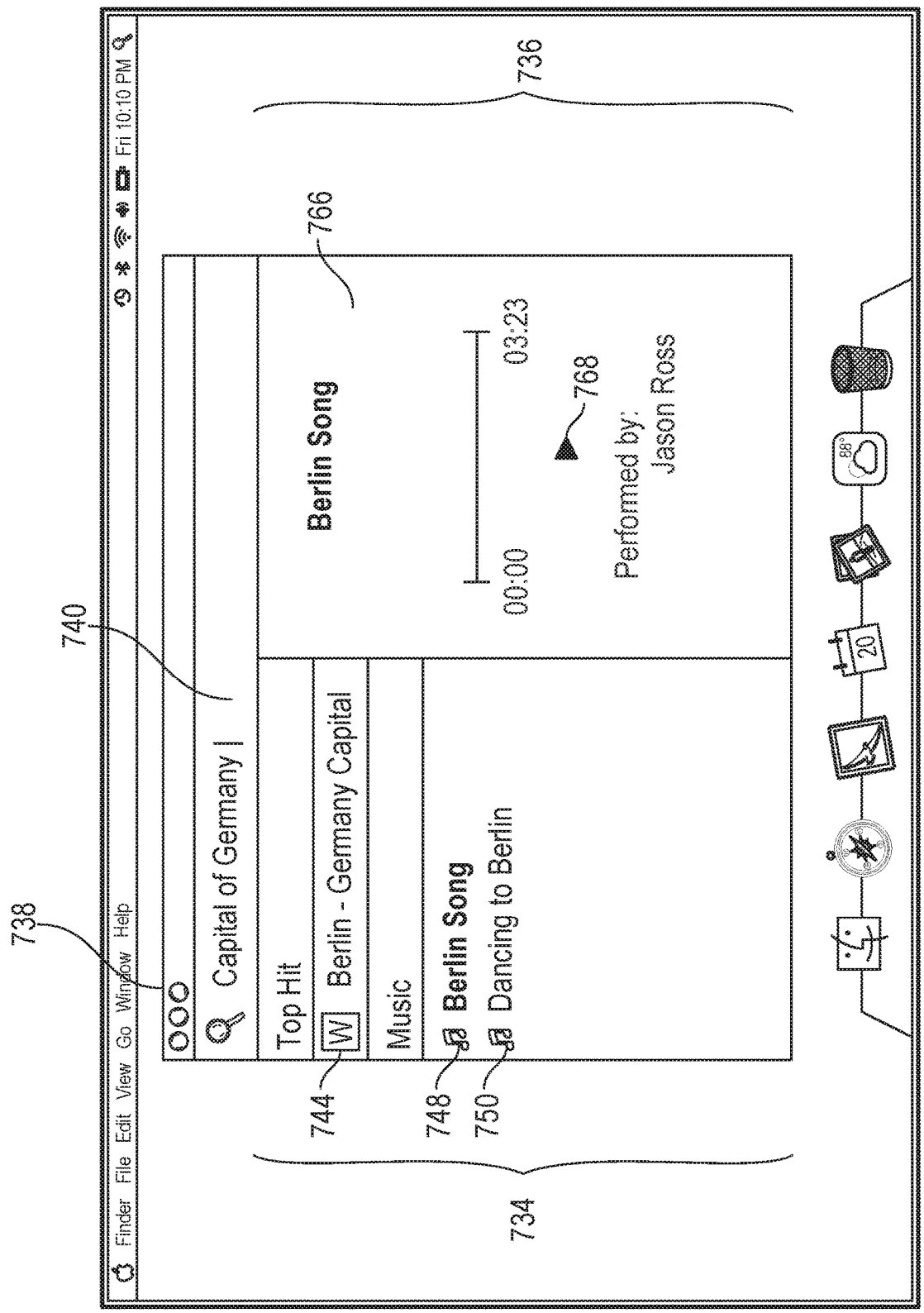
Figure 7M:
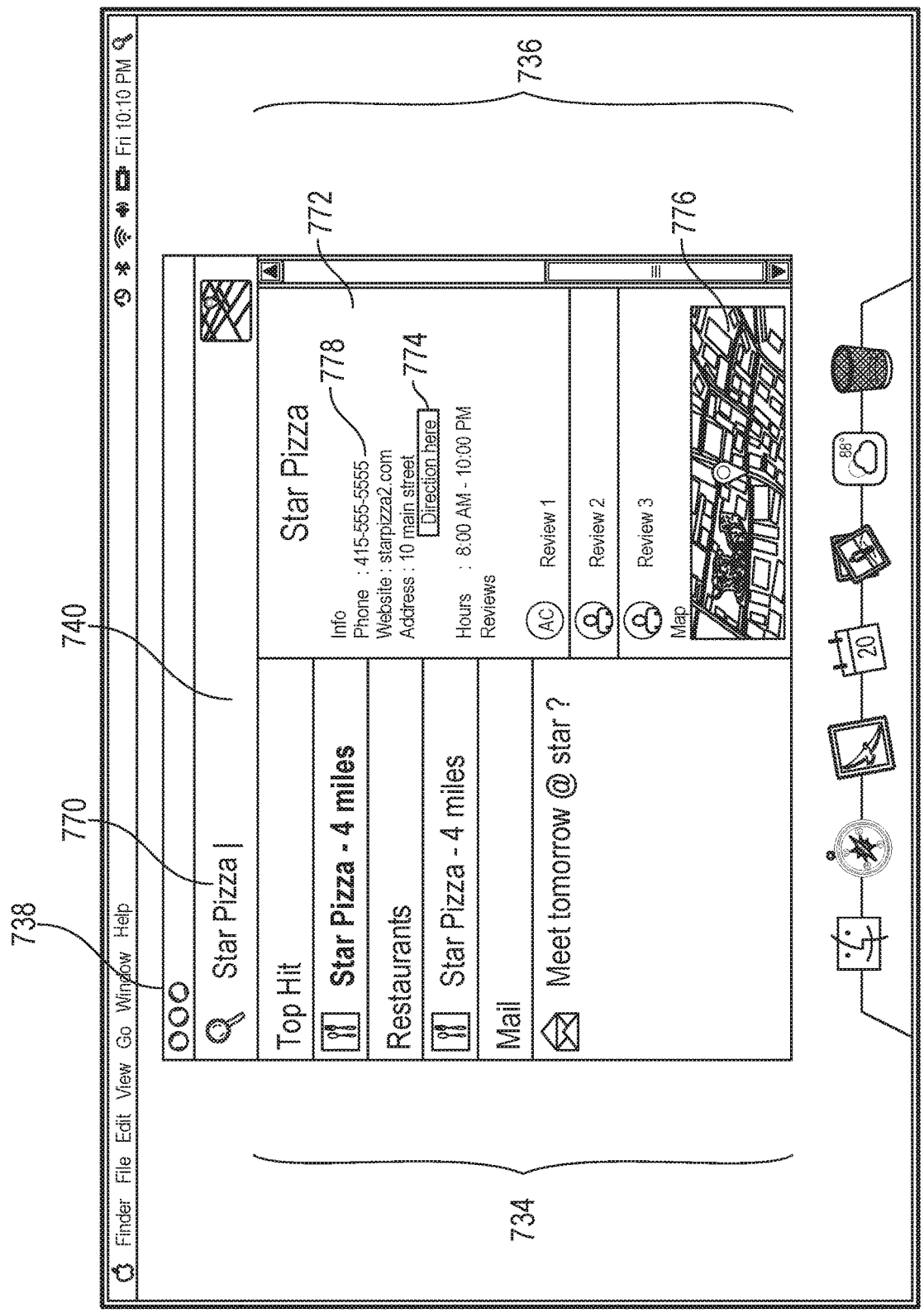
Figure 7N:
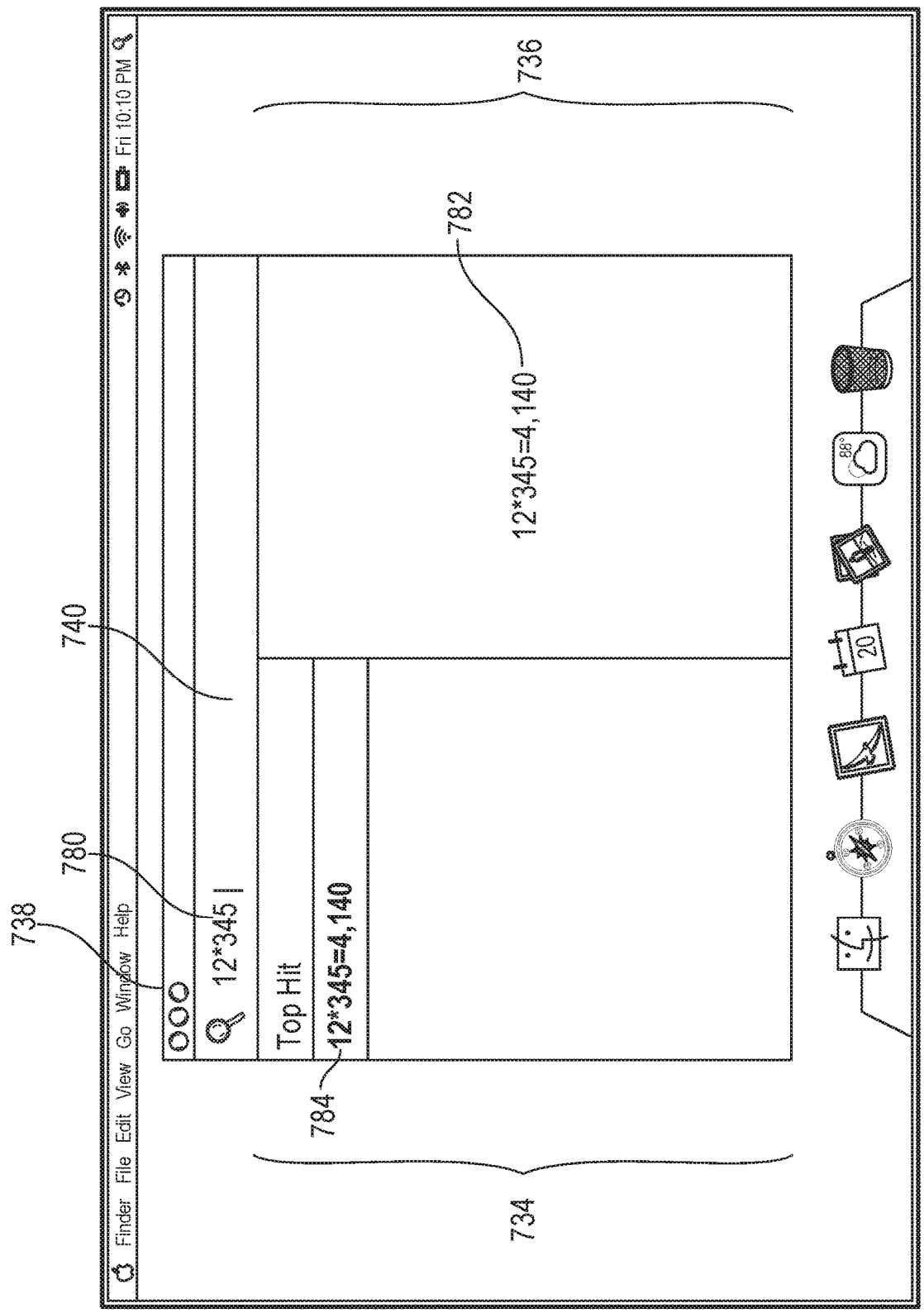

FIGS. 7A-7N illustrate exemplary user interfaces for previewing content of a search result in accordance with some embodiments. The techniques and user interfaces in these figures are used to illustrate the processes described below, including the process in FIG. 8.

FIGS. 7A-7D illustrate exemplary user interfaces for receiving a search input and providing a preview of content in accordance with some embodiments. At FIG. 7A, electronic device 100 displays a user interface, including search field 702. A user of the device can enter a search input, such as an alphanumeric text string, into search field 702 to initiate a search. In some examples, the user does not need to indicate completion of entering the search input, such as by activating a search affordance or pressing an enter button, to initiate the search. Instead, the device may automatically requests searches as the search input is progressively entered into search field 702.

FIG. 7B illustrates the user having entered a search input 704 into the search field 702 of a search application. The device receives the search input (e.g, 704 of FIG. 7B) and displays one or more search results (e.g., search result 706) obtained based on the received search input 704. For example, search result 706 relates to a microblogging message. The device receives a request to preview a respective search result (e.g., to preview search result 706) of the one or more search results. For example, at FIG. 7B, the user selects (e.g., taps on) a preview affordance 708 to preview the respective search result (e.g., search result 706). In some embodiments, the result can be accessed (e.g., the full result) by selecting the search result (rather than the preview affordance). An exemplary preview is illustrated in FIG. 7C.

FIG. 7C illustrates a preview of content of the respective search result (e.g., of search result 706 of FIG. 7B). In response to receiving the request to preview the respective search result, the device displays a preview of content of the respective search result (e.g., preview 718 of FIG. 7C). The preview of content of the respective search result (e.g., 718 of FIG. 7C) includes one or more actionable user interface objects (e.g., objects 710, 712, 714, 716) that, when activated, cause the device to perform an operation associated with the respective search result. In some embodiments, the preview of content of the respective search result includes a plurality of different actionable user interface objects that, when activated, cause the device to perform different operations associated with the respective search result.

For example, object 710, when activated, performs a follow operation to register the device to follow the author of the microblog entry; object 712, when activated, performs a reply operation to initiate a reply to the microblog entry; object 714, when activated, performs a reblog operation to initiate a resubmission of the microblog entry; object 716, when activated, initiates an email communication with the author of the microblog entry.

In some embodiments, the preview of the respective search result is displayed in the search application. By being provided with a preview and access to actionable user interface objects, the user can easily preview content and perform operations quickly and without the need to access various applications. For example, the user does not need to open a separate microblogging application or a separate website browser application to access the full microblog entry and to perform operations that are associated with the microblog entry.

In some embodiments, receiving the request to preview the respective search result comprises receiving a selection of a preview affordance (e.g., 708 of FIG. 7B) associated with the respective search result. For example, a user selects a caret (e.g., 708 of FIG. 7B) in a mobile operating system to preview the related search result.

In some embodiments, the search input (e.g., 704 of FIG. 7B) is received at a search application and the preview of content of the respective search result (e.g., 718 of FIG. 7C) is displayed in the search application (e.g., the search results and the previews are displayed in the same search application). By receiving the search input and displaying the preview in the same application, the user has convenient access to previewing content without the need to perform cumbersome techniques to switch between a search application and a viewing application.

In some embodiments, the preview of content of the respective search result (e.g., 718 of FIG. 7C) replaces the respective search result (e.g., 706 of FIG. 7B). In some embodiments, the preview of the content completely replaces the respective search result.

In some embodiments, the one or more actionable user interface objects include a first actionable user interface object. The first actionable user interface object initiates a communication with an entity associated with the respective search result when the first actionable user interface object is activated. For example, object 716 of FIG. 7C, when activated, initiates an email communication with the author of the microblog entry. In some embodiments, the preview of content includes the contact information of a person or business, including a phone number or email address. Selecting the phone number or email address initiates a phone call or email, respectively, with the person or business. Initiating a communication using the preview of content allows a user to quickly contact a person or individual related to the search result.

In some embodiments, the one or more actionable user interface objects include a second actionable user interface object. The second actionable user interface object initiates playback of a media content associated with the respective search result when the second actionable user interface object is activated. In some embodiments, the preview of content includes multimedia playback and purchase information, including a link for accessing media. Selecting the link for accessing media initiates playback of media content. For example, a user can search for media content, conduct a playback of the media content, and initiate a purchase of the media content by using the search application.

In some embodiments, the one or more actionable user interface objects include a third actionable user interface object. The third actionable user interface object initiates display of webpage content associated with the respective search result when the third actionable user interface object is activated. In some embodiments, the preview of content includes a portion of a webpage, including a link to a related webpage. Selecting the link initiates display of the related webpage. In some embodiments, a related webpage is displayed in the search application. In some embodiments, the related webpage is displayed in a separate application.

In some embodiments, the one or more actionable user interface objects include a fourth actionable user interface object, and the fourth actionable user interface object comprises display of map content associated with the respective search result and the map content can be scrolled. In some embodiments, the preview of content includes a portion of a map, which can be panned, zoomed, or scrolled. In some embodiments, the map displayed in the preview can be activated to cause the display of a separate map application.

FIG. 7D-7E illustrate exemplary user interfaces for displaying a software application associated with a search result in accordance with some embodiments. While a preview of content of the search result can be helpful, there are times when a user may want to view detailed information relating to the respective search result or may want to view the full content of the respective search result. In some embodiments, the device receives selection of the respective search result (e.g., the user taps on search result 706). As illustrated in FIG. 7E, in response to receiving selection of the respective search result, the device displays a software application corresponding to the selected search result (e.g., the application related to the respective search result is displayed and provides further details about the result). In this example, the software application is a microblogging application (e.g., 720 of FIG. 7E) that enables the user to view further details about the search result. In some embodiments, the software application corresponding to the respective search result is different from the search application.

FIGS. 7F-7H illustrate exemplary user interfaces for displaying various parts of a search result in accordance with some embodiments. In these examples, a user has entered a search input of "Her Movie" (e.g., search input 726) into search field 702 of FIG. 7F. The user can perform an operation (e.g., a finger gesture) to display various parts of search result 732. In some embodiments, displaying one or more search results obtained based on the received search input comprises displaying a first search result (e.g., search result 732). The device detects a swipe gesture on a touch-sensitive surface at a location that corresponds to a location of a first portion of the first search result on the display (e.g., first portion 728). In response to receiving the swipe gesture at the first portion of the first search result (e.g., first portion 728), the device completely replaces display of the first portion of the first search result (e.g., first portion 728) with display of a second portion of the first search result (e.g., second portion 730 of FIG. 7H). In some embodiments, the first portion of the first remote search result (e.g., first portion 728) is replaced with the second portion of the first remote search result (e.g., second portion 730) by sliding the two portions across the display in the direction of the swipe gesture, as illustrated in the transitions between FIG. 7F, FIG. 7G, and FIG. 7H. In this example, the first portion allows the user to see basic details about the movie "Her", as well as having the option to watch a trailer for the movie. After the swipe gesture, in FIG. 7H, the device displays show times for the movie "Her", as well as providing the option to access a show time for booking a ticket. In another embodiment, in response to detecting a swipe gesture while movie details from a movie details application are displaying, the device displays a link to make a movie reservation using a movie reservation application. In some embodiments, in response to detecting a swipe gesture while restaurant reviews from a restaurant review application are displayed, the device displays a link to make reservations using a restaurant reservation application.

FIG. 7I illustrates an exemplary user interface for displaying the result of a calculation or conversion in accordance with some embodiments. In FIG. 7I, a user has entered a search input 722 (e.g., "12×12") into search field 702. The device performs a computation on the search input 722, and provides the computation result as a search result 724. In some embodiments, the device determines whether the search input meets a computation criteria. In one example, the search input meets the computation criteria when the search input is a mathematical expression. In accordance with a determination that the search input 722 meets the computation criteria, the device displays a computation result (e.g., 724 of FIG. 7I) of the one or more search results. The computation result is based on a computation performed based on at least a portion of the search input. Thus, the computation result may be displayed along with other search results. In some embodiments, the search results are displayed in a drop down menu from an address bar of a web browser. In some embodiments the search results are displayed in a stand-alone search window.

FIGS. 7J-7N illustrate exemplary user interfaces for receiving a search input and providing a preview of content in accordance with some embodiments. At FIG. 7J, electronic device 100 displays a user interface of a search application 738, including search field 740. A user of the device has entered a search input (e.g., 742 of FIG. 7J) into search field 740 to initiate a search. In some examples, the user does not need to indicate completion of entering the search input, such as by activating a search affordance or pressing an enter button, to initiate the search. Instead, the device may automatically requests searches as the search input is progressively entered into search field 740.

In the user interface of FIG. 7J, the device receives the search input (e.g, 742 of FIG. 7J) and displays one or more search results (e.g., search results 744, 748, 750) obtained based on the received search input 742. In FIG. 7J, the one or more search results are displayed in a left pane 734 of the search application 738. For example, search result 744 relates to an encyclopedia article about the city of Berlin, search result 748 relates to a song titled "Berlin Song" and search result 750 relates to a song titled "Dancing to Berlin". The device receives a request to preview a respective search result (e.g., search result 744) of the one or more search results. For example, at FIG. 7J, the user selects (e.g., taps on using a finger or activates using a mouse cursor) a preview affordance to preview the respective search result (e.g., search result 744). In some embodiments, the preview affordance is selected when the user activates any portion of the search result. In some embodiments, the preview affordance is the title of the search result (e.g., "Berlin—Germany Capital" for 744 of FIG. 7J).

FIG. 7J also illustrates a preview of content of the respective search result (e.g., search result 744 of FIG. 7J). In response to receiving the request to preview the respective search result, the device displays a preview of content of the respective search result (e.g., preview 752 of FIG. 7J). In FIG. 7J, the preview of content is displayed in a right pane 736 of the search application 738. The preview of content of the respective search result (e.g., 752 of FIG. 7J) includes one or more actionable user interface objects (e.g., objects 746 and 754) that, when activated, cause the device to perform an operation associated with the respective search result. In some embodiments, the preview of content of the respective search result includes a plurality of different actionable user interface objects that, when activated, cause the device to perform different operations associated with the respective search result.

For example, object 746, when activated, causes an image display operation to be performed that displays a full-size image of the respective object; object 754, when activated, causes a webpage display operation to be performed that displays the contents of a webpage associated with the respective object. In some embodiments, the preview of the respective search result and the operations performed are displayed in the search application. By being provided with a preview and access to actionable user interface objects, the user can easily preview content and perform operations quickly and without the need to access various applications. For example, the user does not need to open a separate image-viewing application or a separate website browser application to perform the operations that are associated with the objects 746 and 754. In some embodiments, the full-size image and the contents of the webpage are displayed in the right pane 736, and replace the preview.

In some embodiments, receiving the request to preview the respective search result comprises receiving a selection of a preview affordance associated with the respective search result. For example, a user selects a different search result from a list of results on the left pane (e.g., left pane 734) of a search application (e.g., search application 738) to preview the respective search result on the right pane (e.g., right pane 736) of the search application.

In some embodiments, the search input (e.g., 742 of FIG. 7J) is received at a search application and the preview of content of the respective search result (e.g., 752 of FIG. 7J) is displayed in the search application (e.g., the search results and the previews are displayed in the same search application). By receiving the search input and displaying the preview in the same application, the user has convenient access to previewing content without the need to perform cumbersome techniques to switch between a search application and a viewing application.

In some embodiments, the preview of content of the respective search result replaces the respective search result. In some embodiments, the preview of the content completely replaces the search result.

In some embodiments, the preview of content of the respective search result is displayed concurrently with the respective search result (e.g, the search result 744 is displayed in the left pane 734 and the preview 752 is displayed in the right pane 736).

FIGS. 7J and 7K illustrate exemplary user interfaces for displaying different previews for the same content. In some embodiments, the preview of content changes based on the search terms, even if the previews are of the same content. For example, important information such as the population of a city is displayed as part of the preview of an encyclopedia article of the city if, for example, the search input includes "population". If, however, a different search input produces the same encyclopedia article as a search result, the preview of the encyclopedia article may not include the population of the city if, for example, the search input does not include "population". In another example, if the search input specifies "elevation", a preview of the same encyclopedia article of the city will display the elevation, and not the population.

In some embodiments, the preview of content of the respective search result includes first information when the search input includes a first term, and the preview of content of the respective search result includes second information when the search input includes a second term, the first term different from the second term. For example, the preview 752 displayed in FIG. 7J and the preview 764 displayed in FIG. 7K are exemplary previews for the same encyclopedia article about Berlin. Preview 752 resulting from search input 742 of "Capital of Germany" does not include a description relating to the population of Berlin as part of the preview 752 of the encyclopedia article. However, preview 764 resulting from a different search input (e.g., search input 760 of FIG. 7K, "Population of Berlin") includes first information 762 relating to the population of Berlin as part of the preview 764 (e.g. "Population 3.5 Million") of the same encyclopedia article. Thus, different search inputs that result in the same search result can produce different previews of the content of the search result. Accordingly, important information from the result is displayed for the user in the preview of content of the search result.

In some embodiments, the preview of content of the respective search result includes information in a first order when the search input includes a first term, and the preview of content of the respective search result includes information in a second order when the search input includes a second term, the first term different from the second term. For example, important information such as population of a city is displayed at the top of the preview of an encyclopedia article of the city if the search input includes "population". However, if the search input does not include "population" and includes a different term, the preview may include the population of the city at a different location in the preview (e.g., at the bottom of the preview). Similarly, if the query specifies "elevation", a preview of the same encyclopedia article of the city will display the elevation of the city at the top of the preview, and not the population.

FIGS. 7J and 7L illustrate exemplary user interfaces for replacing one preview of content with another preview of content in accordance with some embodiments. At FIG. 7J, the device has received a request to preview search result 744 of FIG. 7J. In some embodiments, the device receives a second request to preview a second search result (e.g., search result 748 of FIG. 7L) of the one or more search results (e.g., search results 744, 748, 750 of FIGS. 7J and 7L). In response to receiving the second request to preview the second search result, the device replaces display of the preview of content of the respective search result (e.g., preview 752 of FIG. 7J) with display of a preview of content of the second search result (e.g., preview 766 of FIG. 7L). The preview of content of the second search result (e.g., preview 766 of FIG. 7L) includes one or more actionable user interface objects (e.g., play object 768) that, when activated, causes the device to perform an operation associated with the second search result. In some embodiments, the list of search results is maintained on the display even while the preview is updated. Thus, a user can select from among the search results in the left pane 734, to see the preview of the selected result in the right pane 736 of search application 738. An indication may be displayed so that the user knows which search result is currently being previewed. For example, search result 748 in FIG. 7L is bolded to indicate that the preview in right pane 736 relates to search result 748.

In some embodiments, the one or more actionable user interface objects include a second actionable user interface object. The second actionable user interface object initiates playback of a media content associated with the respective search result when the second actionable user interface object is activated. For example, object 768 of FIG. 7L, when activated, initiates playback of the song "Berlin Song", which is associated with the search result 748 of FIG. 7L. In some embodiments, the preview of content includes multimedia playback and purchase information, including a link for accessing media. Selecting the link for accessing media initiates playback of media content. For example, a user can search for media content, conduct a playback of the media content, and initiate a purchase of the media content by using the search application.

In some embodiments, the one or more actionable user interface objects include a third actionable user interface object. The third actionable user interface object initiates display of webpage content associated with the respective search result when the third actionable user interface object is activated. In some embodiments, the preview of content includes a portion of a webpage, including a link to a related webpage. Selecting the link initiates display of the related webpage. For example, preview 752 of FIG. 7J includes object 754, which, when activated, initiates display of the full encyclopedia article associated with search result 744 of FIG. 7J. In some embodiments, a related webpage is displayed in the search application. In some embodiments, the related webpage is displayed in a separate application.

FIG. 7M illustrates an exemplary user interface for displaying a preview of a search result. Search input 770 results in search results displayed in left pane 734. Preview 772 is for a restaurant review of Star Pizza. Preview 772 includes one or more actionable user interface objects. For example, object 778 of FIG. 7M, when activated, initiates an telephone communication with the restaurant Star Pizza at the telephone number 415-555-5555. In some embodiments, the one or more actionable user interface objects include a first actionable user interface object (e.g., object 778 of FIG. 7M). The first actionable user interface object (e.g., object 778) initiates a communication with an entity associated with the respective search result when the first actionable user interface object is activated. In some embodiments, the preview of content includes the contact information of a person or business, including a phone number or email address. Selecting the phone number or email address initiates a phone call or email, respectively, with the person or business. Initiating a communication using the preview of content allows a user to quickly contact a person or individual related to the search result.

In some embodiments, the one or more actionable user interface objects include a fourth actionable user interface object, and the fourth actionable user interface object comprises display of map content associated with the respective search result and the map content can be scrolled. For example, preview 772 of FIG. 7M includes object 776, which includes display of a map. The displayed map of object 776 may be scrolled. For example, a user can scroll the map of object 776 to the left or right using a mouse cursor or a finger gesture. In some embodiments, the preview of content includes a portion of a map, which can be panned, zoomed, or scrolled. For example, a user can pan, zoom, or scroll the map of object 776 using a mouse cursor or a finger gesture. In some embodiments, the map displayed in the preview can be activated to cause the display of a separate map application. In some embodiments, an activated actionable user interface object causes display of a separate map application. For example, activating object 774 causes display of a separate map application that provides driving directions to the Star Pizza restaurant.

FIG. 7N illustrates an exemplary user interface for displaying the result of a calculation or conversion in accordance with some embodiments. In FIG. 7N, a user has entered a search input 780 ("12*345") into search field 740 of search application 738. The device performs a computation on the search input 780, and provides the computation result as a search result 784. In some examples, preview 782 displays the result of the computation as preview 782. In some embodiments, the device determines whether the search input meets a computation criteria. In one example, the search input meets the computation criteria when the search input is a mathematical expression. In accordance with a determination that the search input meets the computation criteria, the device displays a computation result of the one or more search results. The computation result is based on a computation performed based on at least a portion of the search input. Thus, the computation result may be displayed along with other search results. In some embodiments, the search results are displayed in a drop down menu from an address bar of a web browser. In some embodiments the search results are displayed in a stand-alone search window.

Figure 8:
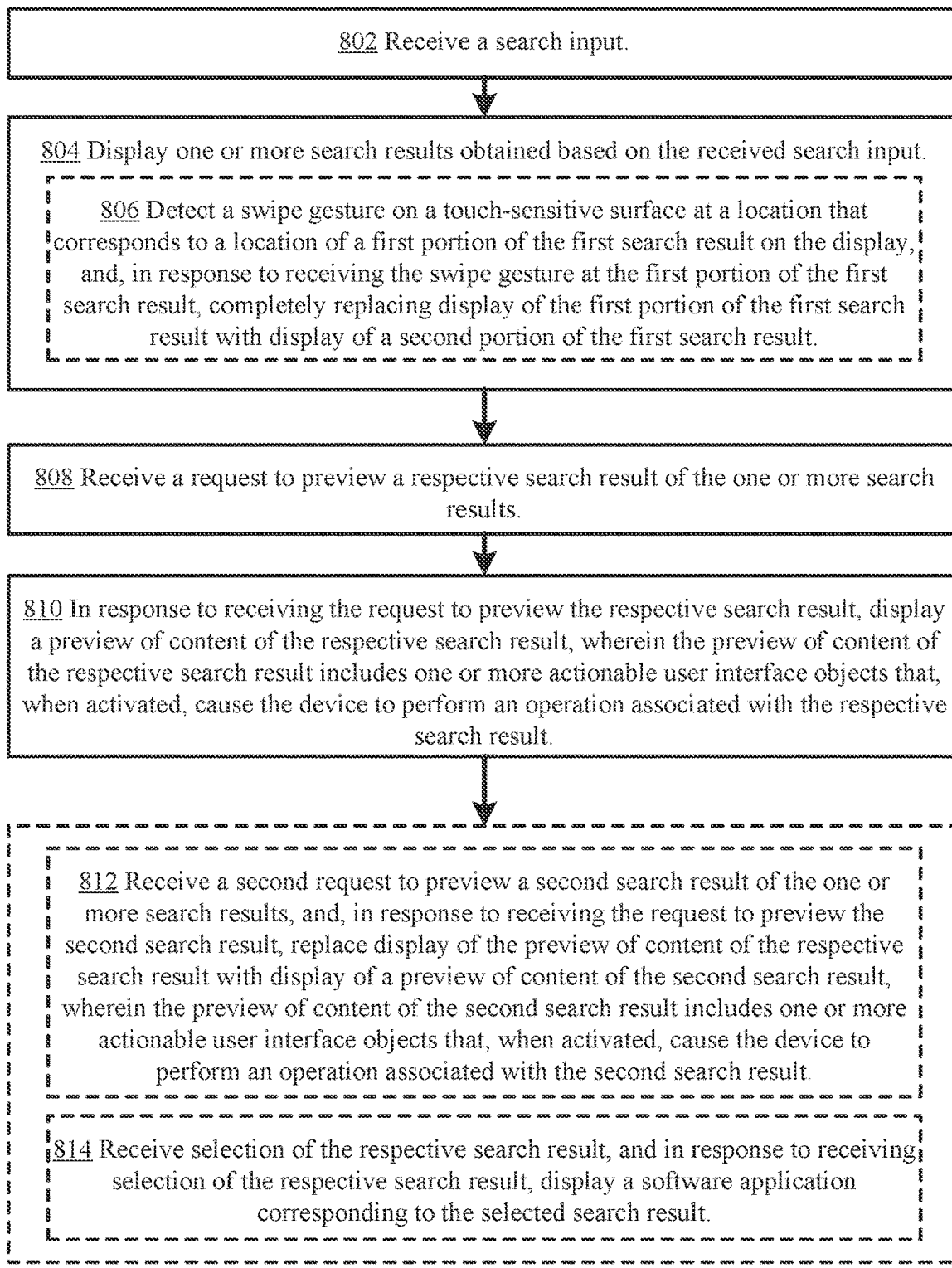
FIG. 8 is a flow diagram illustrating a method for previewing content of a search result in accordance with some embodiments.

FIG. 8 is a flow diagram illustrating a method 800 for previewing content of a search result in accordance with some embodiments. Method 800 is performed at a device (e.g., device 300, FIG. 3, or portable multifunction device 100, FIG. 1) with a display. Some operations in method 800 may be combined, the order of some operations may be changed, and some operations may be omitted.

As described below, method 800 provides an intuitive way to display previews of content of a search result in accordance with some embodiments. The method reduces the cognitive burden on a user when searching, thereby creating a more efficient human-machine interface. For battery-operated computing devices, enabling a user to conduct a search faster and more efficiently conserves power and increases the time between battery charges.

At block 802, the device receives a search input (e.g, 704 of FIG. 7B, 742 of FIG. 7J). At block 804, the device displays one or more search results (e.g., 706 of FIG. 7B, 744, 748, 750 of FIG. 7J) obtained based on the received search input.

At block 806, in some embodiments, displaying one or more search results obtained based on the received search input comprises displaying a first search result (e.g., search result 732 of FIG. 7F). The device detects a swipe gesture on a touch-sensitive surface at a location that corresponds to a location of a first portion of the first search result on the display (e.g., 728 of FIG. 7F). In response to receiving the swipe gesture at the first portion of the first search result (e.g., 728 of FIG. 7F), the device completely replaces display of the first portion of the first search result (e.g., 728 of FIG. 7F) with display of a second portion of the first search result (e.g., 730 of FIG. 7H). In some embodiments, the first portion of the first remote search result (e.g., 728 of FIG. 7F) is replaced with the second portion of the first remote search result (e.g., 730 of FIG. 7H) by sliding the two portions across the display in the direction of the swipe gesture. In another embodiment, in response to detecting a swipe gesture while movie details from a movie details application are displaying, the device displays a link to make a movie reservation using a movie reservation application. In some embodiments, in response to detecting a swipe gesture while restaurant reviews from a restaurant review application are displayed, the device displays a link to make reservations using a restaurant reservation application.

At block 808, the device receives a request to preview a respective search result (e.g., 706 of FIG. 7B, 744 of FIG. 7J) of the one or more search results. In some embodiments, receiving the request to preview the respective search result comprises receiving a selection of a preview affordance (e.g., 708 of FIG. 7B) associated with the respective search result (e.g., 706 of FIG. 7B).

At block 810, in response to receiving the request to preview the respective search result, the device displays a preview of content of the respective search result (e.g., 718 of FIG. 7C, 752 of FIG. 7J). The preview of content of the respective search result (e.g., 718 of FIG. 7C, 752 of FIG. 7J) includes one or more actionable user interface objects (e.g., objects 710, 712, 714, 716 of FIG. 7C, objects 746, 754 of FIG. 7J) that, when activated, cause the device to perform an operation associated with the respective search result. In some embodiments, the preview of content of the respective search result includes a plurality of different actionable user interface objects (e.g., objects 710, 712, 714, 716 of FIG. 7C, objects 746, 754 of FIG. 7J) that, when activated, cause the device to perform different operations associated with the respective search result. In some embodiments, the preview of the respective search result is displayed in the search application. By being provided with a preview and access to actionable user interface objects, the user can easily preview content and perform operations quickly and without the need to access various applications. For example, the user does not need to open a separate application to access content and to perform operations that are associated with the content.

In some embodiments, the search input (e.g, 704 of FIG. 7B, 742 of FIG. 7J) is received at a search application and the preview of content of the respective search result (e.g., 718 of FIG. 7C, 752 of FIG. 7J) is displayed in the search application (e.g., search input, the search results, and the previews are displayed in the same search application). By receiving the search input and displaying the preview in the same application, the user has convenient access to previewing content without the need to perform cumbersome techniques to switch between a search application and a viewing application.

In some embodiments, the preview of content of the respective search result (e.g., 718 of FIG. 7C) replaces the respective search result (e.g., 706 of FIG. 7B). In some embodiments, the preview of the content completely replaces the search result.

In some embodiments, the preview of content of the respective search result is displayed concurrently with the respective search result (e.g, in FIG. 7J, the search result 744 is displayed in the left pane 734 and the preview 752 is displayed in the right pane 736).

In some embodiments, the preview of content of the respective search result includes first information (e.g., 752 of FIG. 7J) when the search input (e.g., 742 of FIG. 7J) includes a first term, and the preview of content of the respective search result includes second information (e.g., 764 of FIG. 7K) when the search input includes a second term (e.g., 760 of FIG. 7K), the first term different from the second term (e.g., important information such as population of a city is displayed as part of the preview of an encyclopedia article of the city if, for example, the query includes "population". Similarly, if the query specifies "elevation", a preview of the same encyclopedia article of the city will display the elevation, and not the population) Thus, different search inputs that result in the same search result can produce different previews of the content of the result. Accordingly, important information from the result is displayed for the user in the preview of content of the search result.

In some embodiments, the preview of content of the respective search result includes information in a first order when the search input includes a first term, and the preview of content of the respective search result includes information in a second order when the search input includes a second term, the first term different from the second term. For example, important information such as population of a city is displayed at the top of the preview of an encyclopedia article of the city if the search input includes "population". However, if the search input does not include "population" and includes a different term, the preview may include the population of the city at a different location in the preview (e.g., at the bottom of the preview). Similarly, if the query specifies "elevation", a preview of the same encyclopedia article of the city will display the elevation of the city at the top of the preview, and not the population.

At block 812, in some embodiments, the device receives a second request to preview a second search result (e.g., 748 of FIG. 7L) of the one or more search results (e.g., 744, 748, 750 of FIGS. 7J and 7L). In response to receiving the second request to preview the second search result, the device replaces display of the preview of content of the respective search result (e.g., 752 of FIG. 7J) with display of a preview of content of the second search result (e.g., 766 of FIG. 7L). The preview of content of the second search result (e.g., 766 of FIG. 7L) includes one or more actionable user interface objects (e.g., 768 of FIG. 7L) that, when activated, causes the device to perform an operation associated with the second search result. In some embodiments, the list of search results is maintained on the display even while the preview is updated. Thus, a user can select from among the search results in the left pane (e.g., 734 of FIGS. 7J and 7L), to see the preview of the selected result in the right pane (e.g. 736 of FIGS. 7J and 7L) of the search application (e.g., 738 of FIGS. 7J and 7L).

In some embodiments, the one or more actionable user interface objects include a first actionable user interface object (e.g., 716 of FIG. 7C). The first actionable user interface object (e.g., 716 of FIG. 7C) initiates a communication with an entity associated with the respective search result when the first actionable user interface object is activated. In some embodiments, the preview of content includes the contact information of a person or business, including a phone number or email address. Selecting the phone number or email address initiates a phone call or email, respectively, with the person or business. Initiating a communication using the preview of content allows a user to quickly contact a person or individual related to the search result.

In some embodiments, the one or more actionable user interface objects include a second actionable user interface object (e.g., 768 of FIG. 7L). The second actionable user interface object (e.g., 768 of FIG. 7L) initiates playback of a media content associated with the respective search result when the second actionable user interface object is activated. In some embodiments, the preview of content includes multimedia playback and purchase information, including a link for accessing media. Selecting the link for accessing media initiates playback of media content. For example, a user can search for media content, conduct a playback of the media content, and initiate a purchase of the media content by using the search application.

In some embodiments, the one or more actionable user interface objects include a third actionable user interface object (e.g., 754 of FIG. 7J). The third actionable user interface object (e.g., 754 of FIG. 7J) initiates display of webpage content associated with the respective search result when the third actionable user interface object is activated. In some embodiments, the preview of content includes a portion of a webpage, including a link to a related webpage. Selecting the link initiates display of the related webpage. In some embodiments, a related webpage is displayed in the search application. In some embodiments, the related webpage is displayed in a separate application.

In some embodiments, the one or more actionable user interface objects include a fourth actionable user interface object (e.g., 776 of FIG. 7M), and the fourth actionable user interface (e.g., 776 of FIG. 7M) object comprises display of map content associated with the respective search result and the map content can be scrolled. In some embodiments, the preview of content includes a portion of a map, which can be panned, zoomed, or scrolled. In some embodiments, the map displayed in the preview can be activated to cause the display of a separate map application.

At block 814, in some embodiments, the device receives selection of the respective search result (e.g., 706 of FIG. 7D). In response to receiving selection of the respective search result (e.g., 706 of FIG. 7D), the device displays a software application corresponding to the selected search result (e.g., 720 of FIG. 7E; the application related to the selected search result is displayed and provides further details about the result). In some embodiments, the software application corresponding to the respective search result is different from the search application.

In some embodiments, the device determines whether the search input (e.g., 722 of FIG. 7I, 780 of FIG. 7N) meets a computation criteria. In one example, the search input meets the computation criteria when the search input is a mathematical expression. In accordance with a determination that the search input (e.g., 722 of FIG. 7I, 780 of FIG. 7N) meets the computation criteria, the device displays a computation result (e.g., 724 of FIG. 7I, 782 of FIG. 7N) of the one or more search results. The computation result is based on a computation performed based on at least a portion of the search input (e.g., 722 of FIG. 7I, 780 of FIG. 7N). Thus, the computation result may be displayed along with other search results. In some embodiments, the search results are displayed in a drop down menu from an address bar of a web browser. In some embodiments the search results are displayed in a stand-alone search window.

Note that details of the processes described above with respect to method 800 (e.g., FIGS. 8 and 7A-7N) are also applicable in an analogous manner to the methods described below and above. For example, methods 600 and 1000 may include one or more of the characteristics of the various methods described above with reference to method 800. For brevity, these details are not repeated below. The various methods and techniques described above with reference to method 800 may be optionally implemented as one or more units, such as those described with regard to FIG. 11.

The operations described above with reference to the figures may be implemented by components depicted in FIGS. 1A-1B. For example, display operations and receive operations may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 9A-9M illustrate exemplary user interfaces for providing options to initiate a search using a search engine in accordance with some embodiments. The user interfaces in these figures are used to illustrate the processes described below, including the process in FIGS. 10A-10B.

Figure 9A:
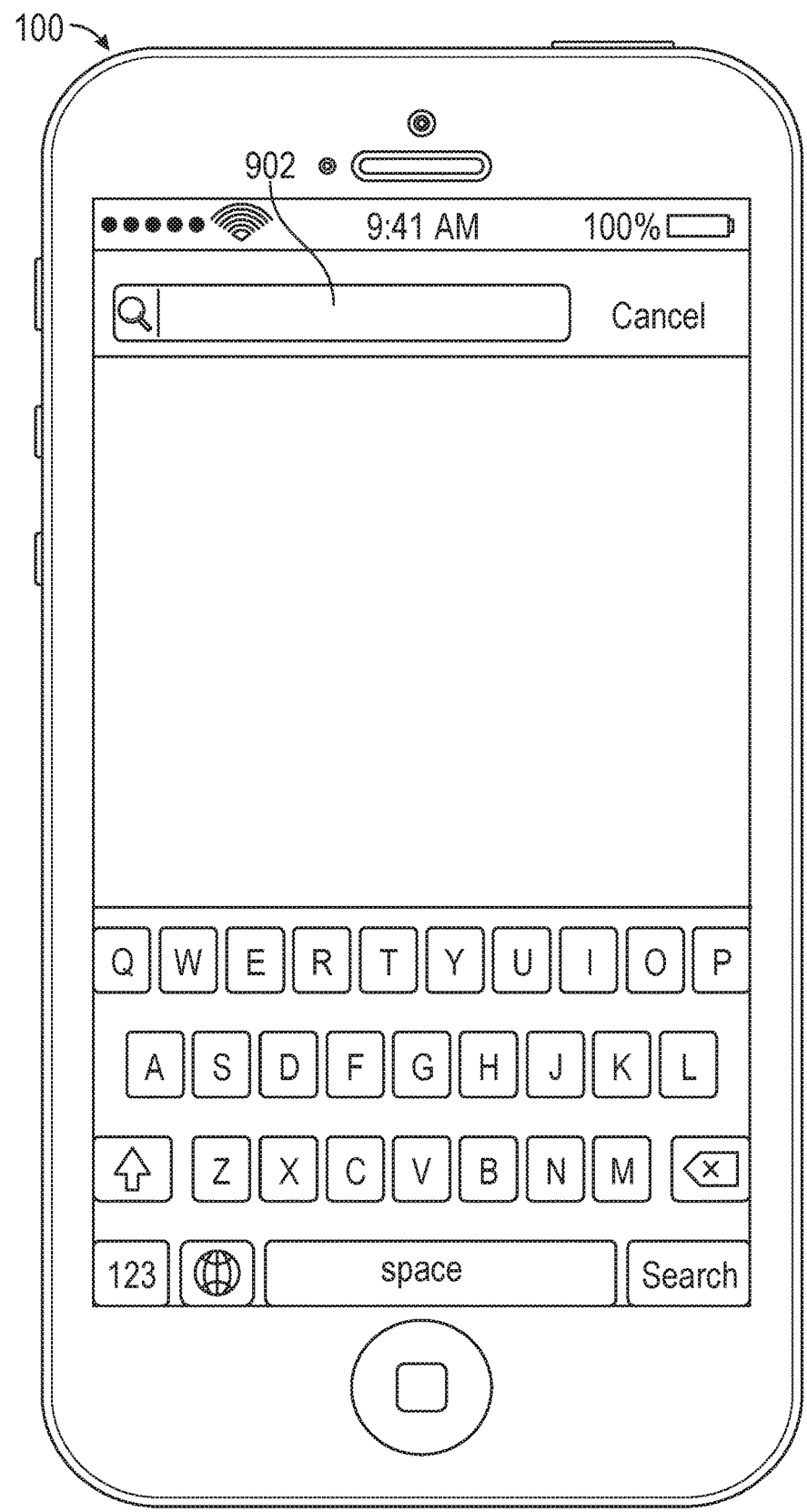
FIGS. 9A-9M illustrate exemplary user interfaces for providing options to initiate a search using a search engine in accordance with some embodiments.
Figure 9B:
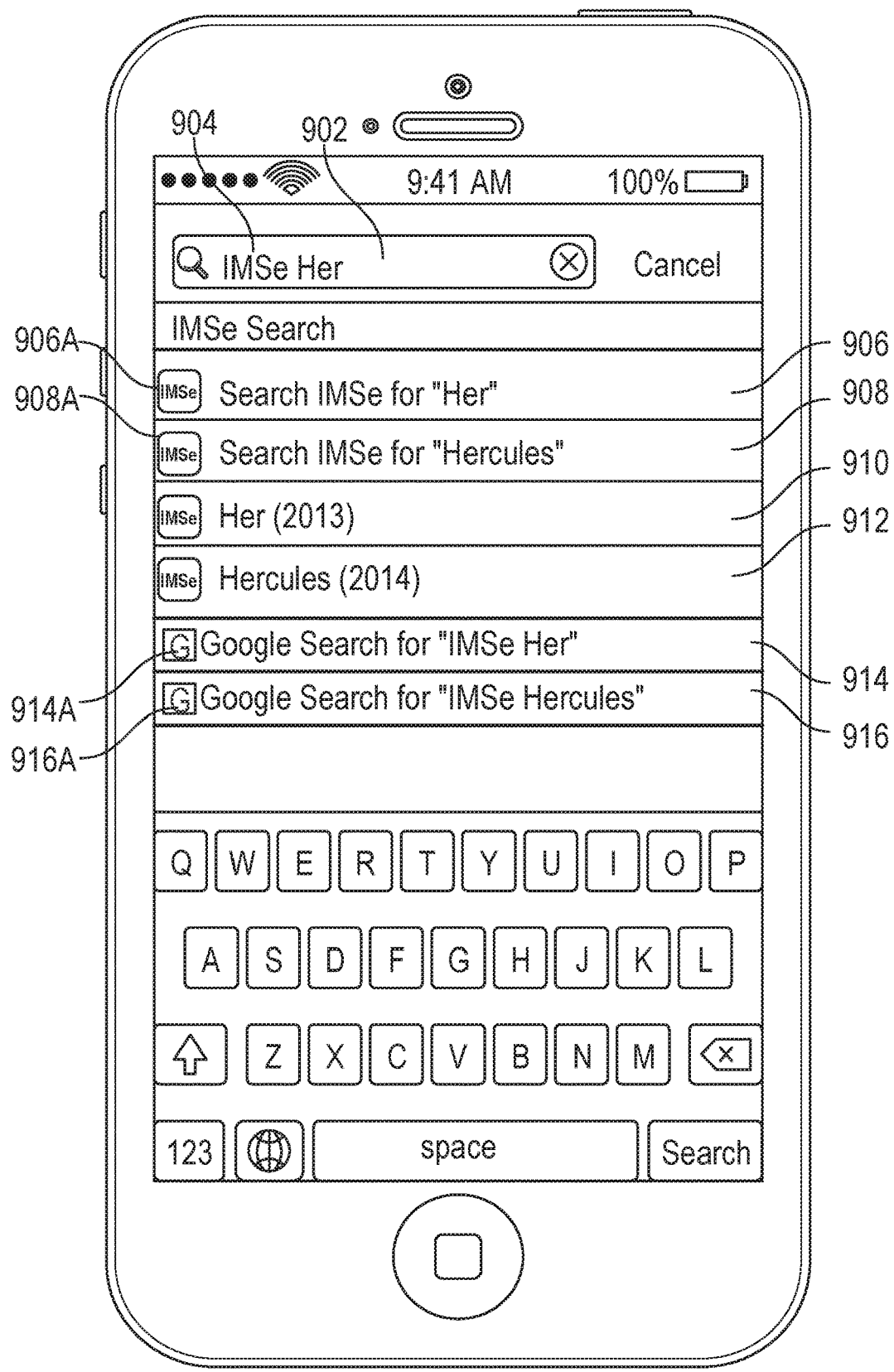

FIGS. 9A-9E illustrate exemplary user interfaces for providing various search options in accordance with some embodiments. FIG. 9A illustrates an exemplary user interface of an electronic device 100, including search field 902. In some examples, search field 902 also displays (and accepts) website URLs for access to websites. Thus, when a website is being accessed, the URL of the website may be displayed in search field 902. Similarly, a user can directly access a website by entering the URL of the website into search field 902. For example, search field 902 may be displayed as part of a web browser application or may be displayed as part of the operating system. At FIG. 9B, a user has entered a search input 904 (e.g., "IMSe Her") into search field 902. For example, IMSe may be the short name for "Internet Movie Search evaluator," a website that provides descriptions and reviews about movies. The IMSe website has its own search engine, which may be accessible directly through the website (e.g., at "IMSe.com/search.html") or accessible through APIs (e.g., making an API call for a search and receiving an API response with search results and details). The device receives the search input (e.g., 904 of FIG. 9B) and determines whether the search input (e.g., 904) includes a search-engine-specifier term. In the example of FIG. 9B, "IMSe" of search input 904 is a search-engine-specifier term. In some embodiments, the determination is case-sensitive. Thus, "imse" and "IMSe" are treated differently. In some embodiments, the determination is case-insensitive, and "imse" and "IMSe" are treated the same. In some embodiments, the device maintains a database that maps search-specifier-terms to corresponding search engines.

In accordance with a determination that the search input includes a search-engine-specifier term that corresponds to a respective search engine (e.g., the term "IMSe" corresponds to the search engine of the Internet Movie Search evaluator server), the device concurrently displays one or more selectable options (e.g., options 906, 908 of FIG. 9B) for initiating a search of at least a first portion of the search input using the respective search engine (e.g., search for "Her" or "Hercules" using the IMSe search engine) and one or more selectable options (e.g., options 914, 916 of FIG. 9B) for initiating a search of at least a second portion of the search input using a default search engine (e.g., search for "IMSe Her" or "IMSe Hercules" using a default search engine, such as Google). For example, initiating a search using the respective search engine initiates a search that uses the IMSe search engine, rather than simply searching the IMSe website using the default search engine.

In some embodiments, the at least the first portion of the search input does not include the search-engine-specifier term (e.g., searching IMSe for "Her" using the IMSe search engine does not use the term "IMSe" as part of the search query sent to the IMSe search engine). In some embodiments, the at least the second portion of the search input includes the search-engine-specifier term (e.g., searching the default search engine uses the entire search input "IMSe Her" for the search).

In some embodiments, the device displays a first identifier icon (e.g., 906A, 908A of FIG. 9B) adjacent to each of the one or more selectable options (e.g., options 906, 908 of FIG. 9B) for initiating search of at least the first portion of the search input using the respective search engine. The device displays a second identifier icon (e.g., 914A, 916A of FIG. 9B) adjacent to each of the one or more selectable options (e.g., options 914, 916 of FIG. 9B) for initiating search of at least the second portion of the search input using the default search engine. The first identifier icon is different from the second identifier icon. Thus, a user can easily determine that the different search options are related to different search engines.

In some embodiments, the one or more selectable options (e.g., options 906, 908 of FIG. 9B) for initiating the search of at least the first portion of the search input using the respective search engine includes one or more search completion suggestions (e.g., 908 of FIG. 9B) received from the respective search engine (e.g., the respective search engine selected based on the search-engine-specifier term provides suggested search terms for the search options). For example, although the term "Hercules" was not in the search input, the search options presented to the user include the suggestion of searching for "Hercules" using the respective search engine because the respective search engine provided the suggestion.

In some embodiments, the one or more selectable options (e.g., options 914, 916 of FIG. 9B) for initiating the search of at least the second portion of the search input using the default search engine includes one or more search completion suggestions (e.g., 916 of FIG. 9B) received from the default search engine (e.g., the default search engine provides suggested search terms). For example, although the term "Hercules" was not in the search input, the search results presented to the user include the suggestion of searching for "Hercules" using the default search engine because the default search engine provided the suggestion.

In some embodiments, the search input comprises two or more character strings separated by a separation character (e.g., a space) and the search-engine-specifier term is a leading character string of the search input. In the example of FIG. 9B, the string "IMSe" is separated from the string "Her" by a space. The search-engine-specifier term is "IMSe" (e.g., the leading character string).

In some embodiments, determining whether the search input includes a search-engine-specifier term comprises determining whether a leading word of the search input has a character count that exceeds a threshold character count (e.g., determining whether the leading word is longer than 2 letters). In accordance with a determination that that the leading word does not have a character count that exceeds the threshold character count (e.g., the leading word is 2 letters or less), the device reaches a determination that the search input does not include a search-engine-specifier term.

In some embodiments, the search-engine-specifier term of the search input is a second-level domain name of the respective search engine (e.g., the search-engine-specifier term for a search engine of www.icloud.com is "icloud").

In some embodiments, the search-engine-specifier term of the search input is a third-level domain name of the respective search engine (e.g., the search-engine-specifier term for a search engine of www.icloud.co.uk is "icloud").

Figure 9C:
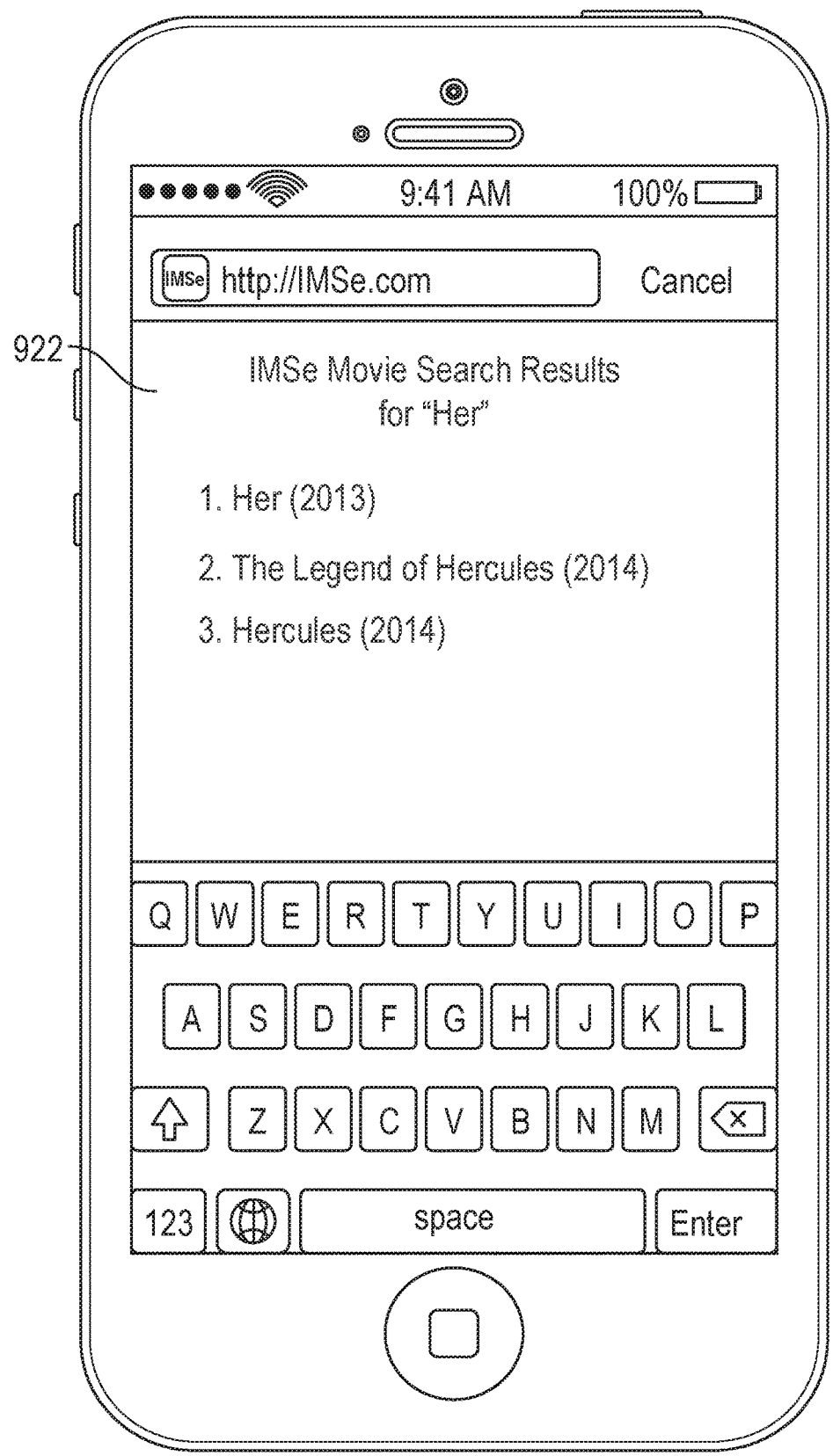

FIGS. 9B and 9C illustrate exemplary user interfaces for displaying search results in accordance with some embodiments. In some embodiments, the device receives user selection of a first selectable option (e.g., the user taps on option 906 of FIG. 9B) of the one or more selectable options for initiating search of at least the first portion of the search input using the respective search engine (e.g., the IMSe search engine). In response to receiving user selection of the first selectable option, the device initiates search of at least the first portion of the search input using the respective search engine (e.g., go to a URL or call an API to search for the results; the search is requested with the IMSe search engine using a search query of "Her"). The device receives search result information from the respective search engine (e.g., the IMSe search engine returns the top hit and/or a list of search results). As illustrated in FIG. 9C, the device displays a search result (e.g., a list of search results; 922 of FIG. 9C) based on the search result information. In some examples, the search result information includes the URLs and/or the titles of the results. For example, the display of a search result may be done by directing the user to a search result webpage (e.g., http://IMSe.com) of the respective search engine.

Figure 9D:
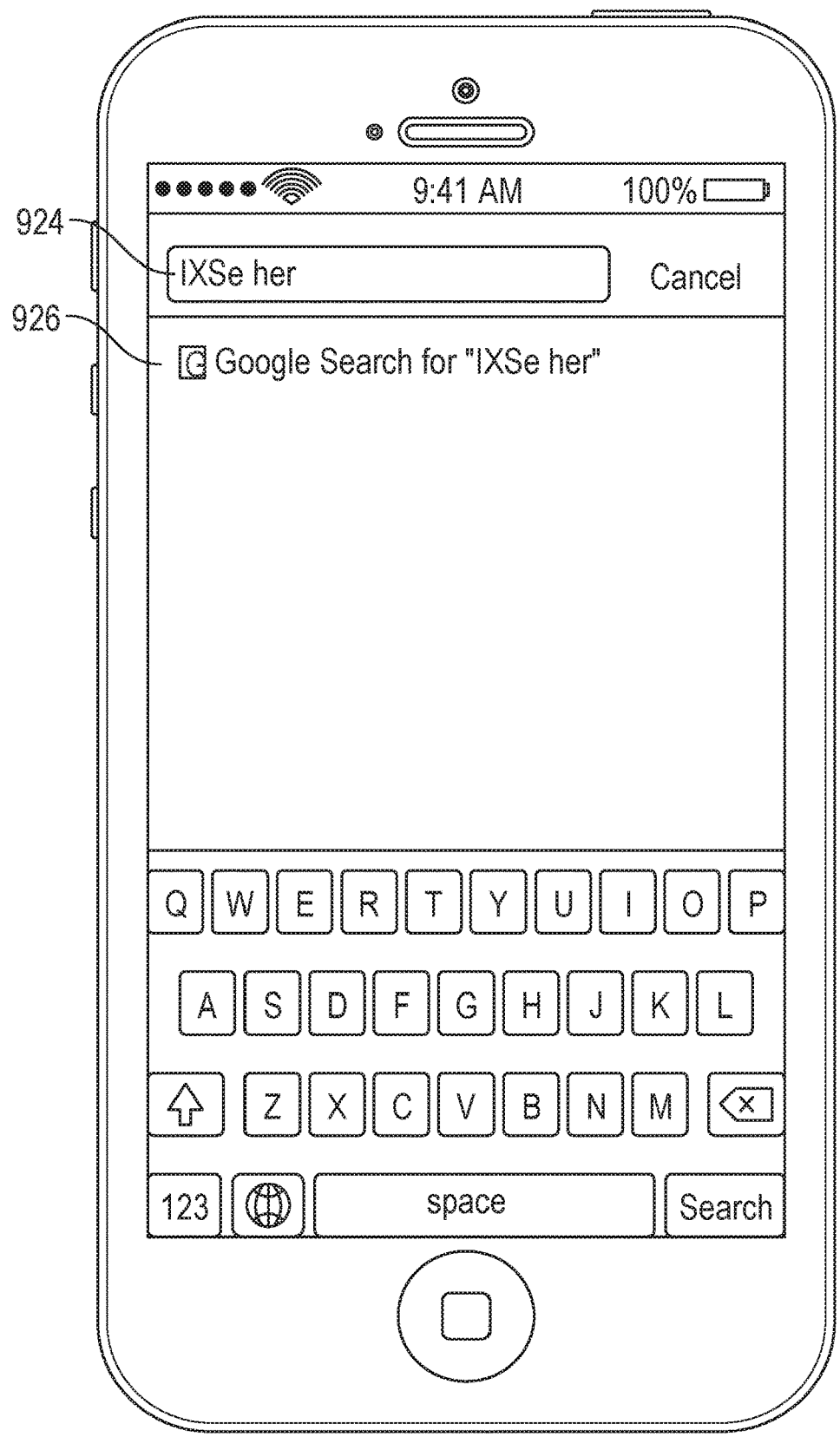
Figure 9E:
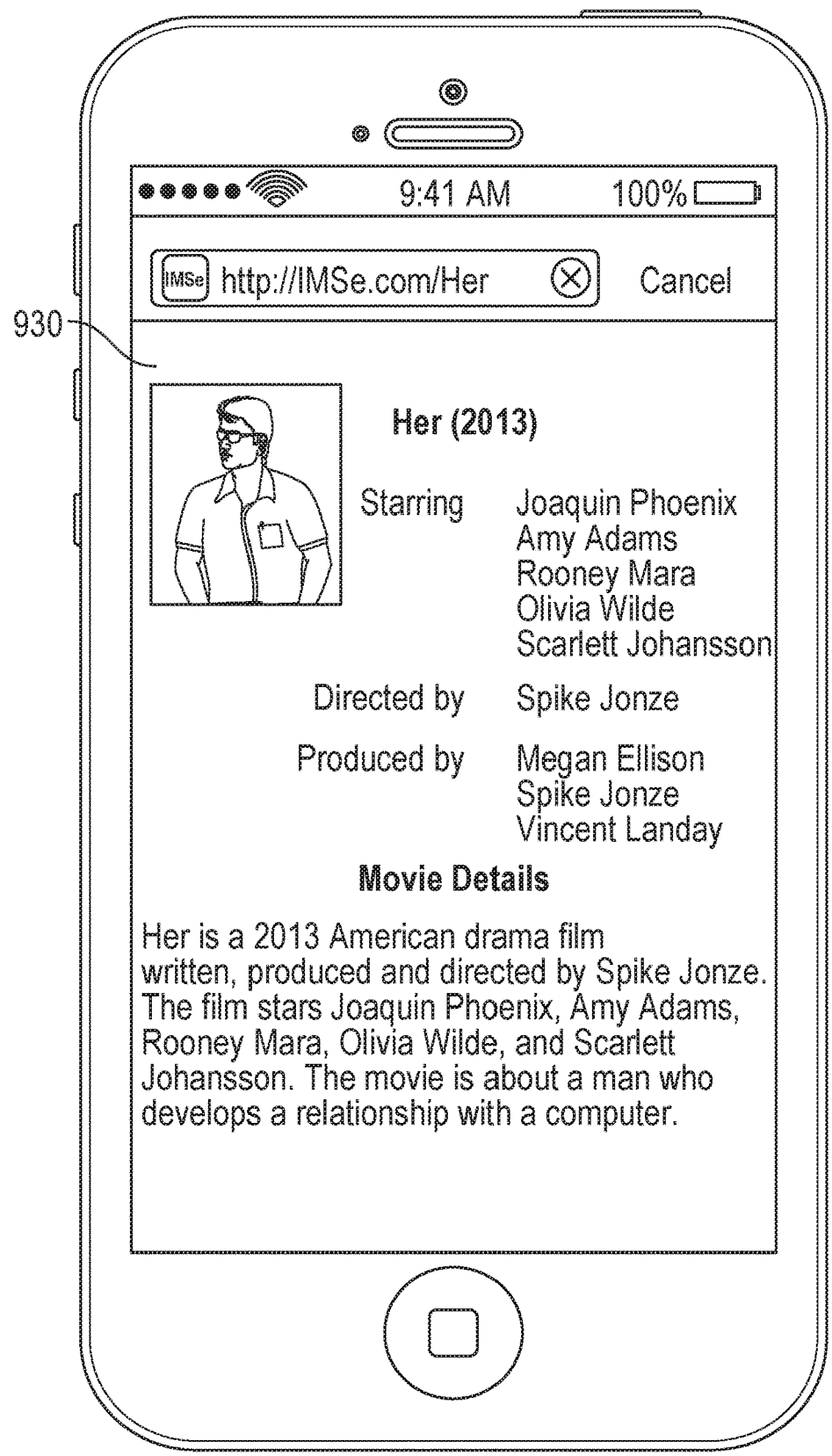
Figure 9F:
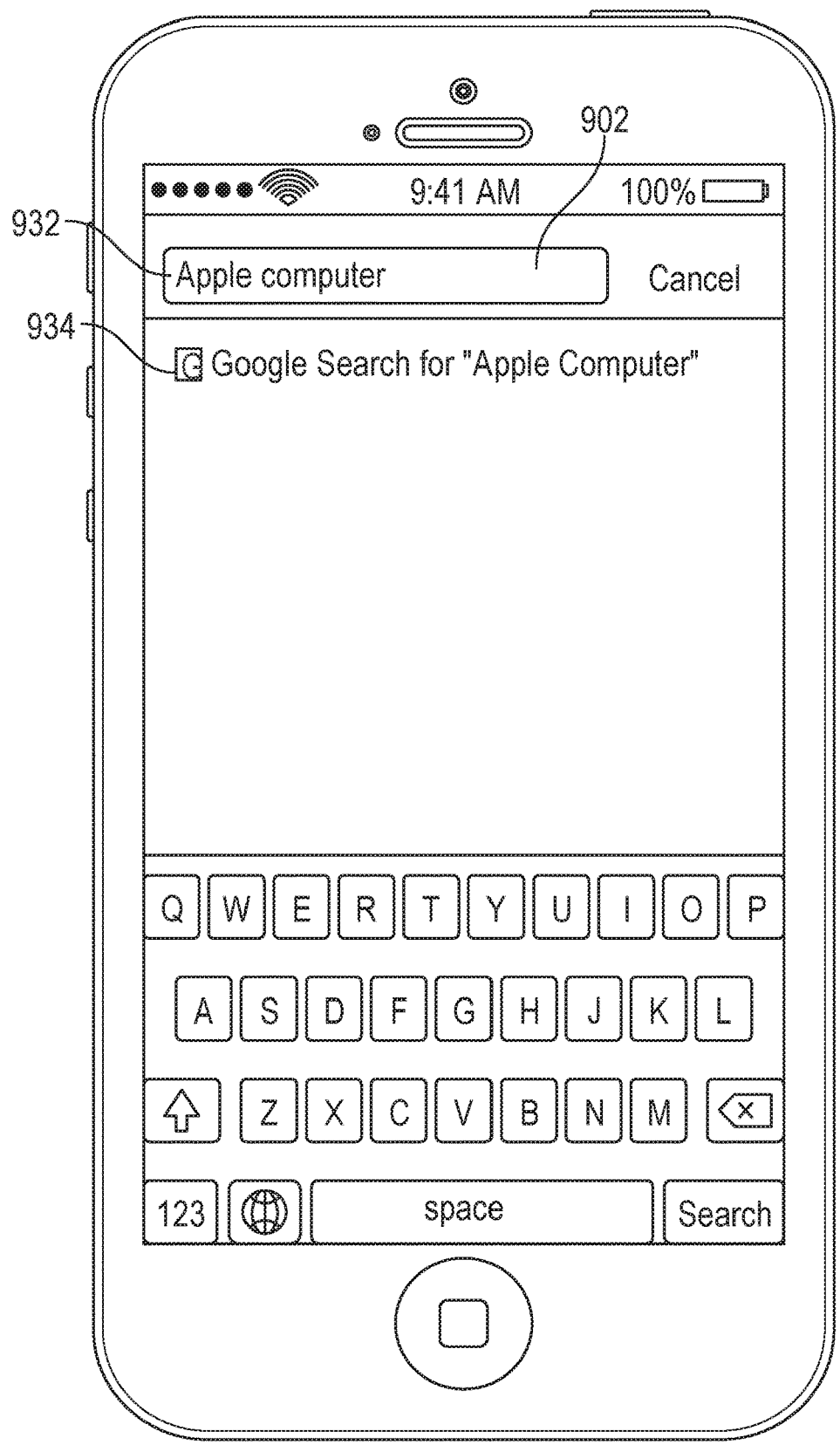

FIGS. 9B and 9E illustrate exemplary user interfaces for providing an option to directly access a result of a search. In some embodiments, in accordance with the determination that the search input includes a search-engine-specifier term (e.g., "IMSe") that corresponds to the respective search engine, the device concurrently displays one or more selectable options (e.g., 910, 912 of FIG. 9B) for accessing a result of searching at least the first portion of the search input using the respective search engine (e.g., a drop down menu or search result listing has a direct link to the top result(s) for search of "Her" using the IMSe search engine, such as "Her (2013)" and "Hercules (2014)"). For example, the user is provided with the option to directly access a website result of the searching (e.g., "http://IMSe.com/Her"), rather than accessing a listing of the search results. In some examples, the top search result is provided as an option for direct access. In some embodiments, the device receives user selection of a second selectable option (e.g., finger tap on 910 of FIG. 9B) of the one or more selectable options for accessing the result of searching at least the first portion of the search input using the respective search engine. As illustrated in FIG. 9E, in response to receiving user selection of the second selectable option (e.g., 910 of FIG. 9B), the device displays a result of the search (e.g., website 930 of FIG. 9E) associated with the second selectable option (e.g., display the top website that a search of the IMSe search engine returns). For example, FIG. 9E illustrates display of the IMSe webpage for the movie "Her", which is at the URL "http://IMSe.com/Her". By being provided with an option for accessing a result of searching, the user does not need to first access a list of search results at the website of the respective search engine. Instead, the user can directly access the result.

FIG. 9D illustrates an exemplary user interface for providing a search option for a default search engine in accordance with some embodiments. In some embodiments, in accordance with a determination that the search input (e.g., "IXSe her" 924 of FIG. 9D) does not include a search-engine-specifier term, the device displays one or more selectable options (e.g., 926 of FIG. 9D) for initiating a search of at least a second portion of the search input using the default search engine (e.g., search for "IXSe her" using google without displaying any affordances or options for performing a search of a non-default search engine using the search input). If a user activates the selectable option 926, the device performs a search based on the search input "IXSE her" using the default search engine (e.g., Google).

FIGS. 9F-9I illustrate exemplary user interfaces for detecting a new search engine and associating a new search-engine-identifier with the new search engine. At FIG. 9F, a user has entered a search input of "Apple computer" (e.g., 932 of FIG. 9F) into search field 902 of FIG. 9F. The device receives the search input and provides a selectable option (e.g., 934 of FIG. 9F) to initiate a search based on the search input (e.g., 932 of FIG. 9F) using the default search engine (e.g., Google). At this point, the search engine of Apple.com is not associated with any search-engine-identifier at the device.

Figure 9G:
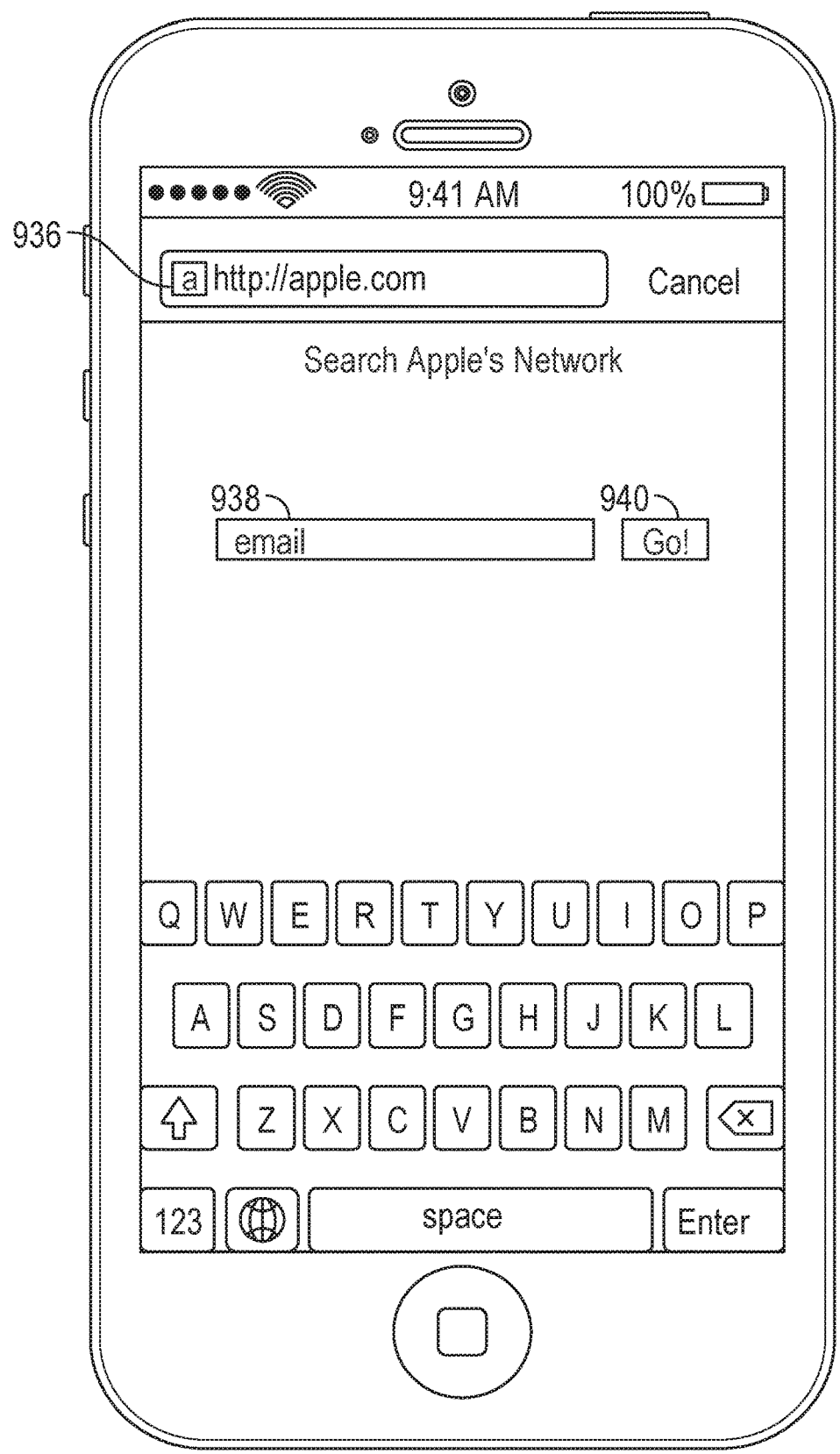
Figure 9H:
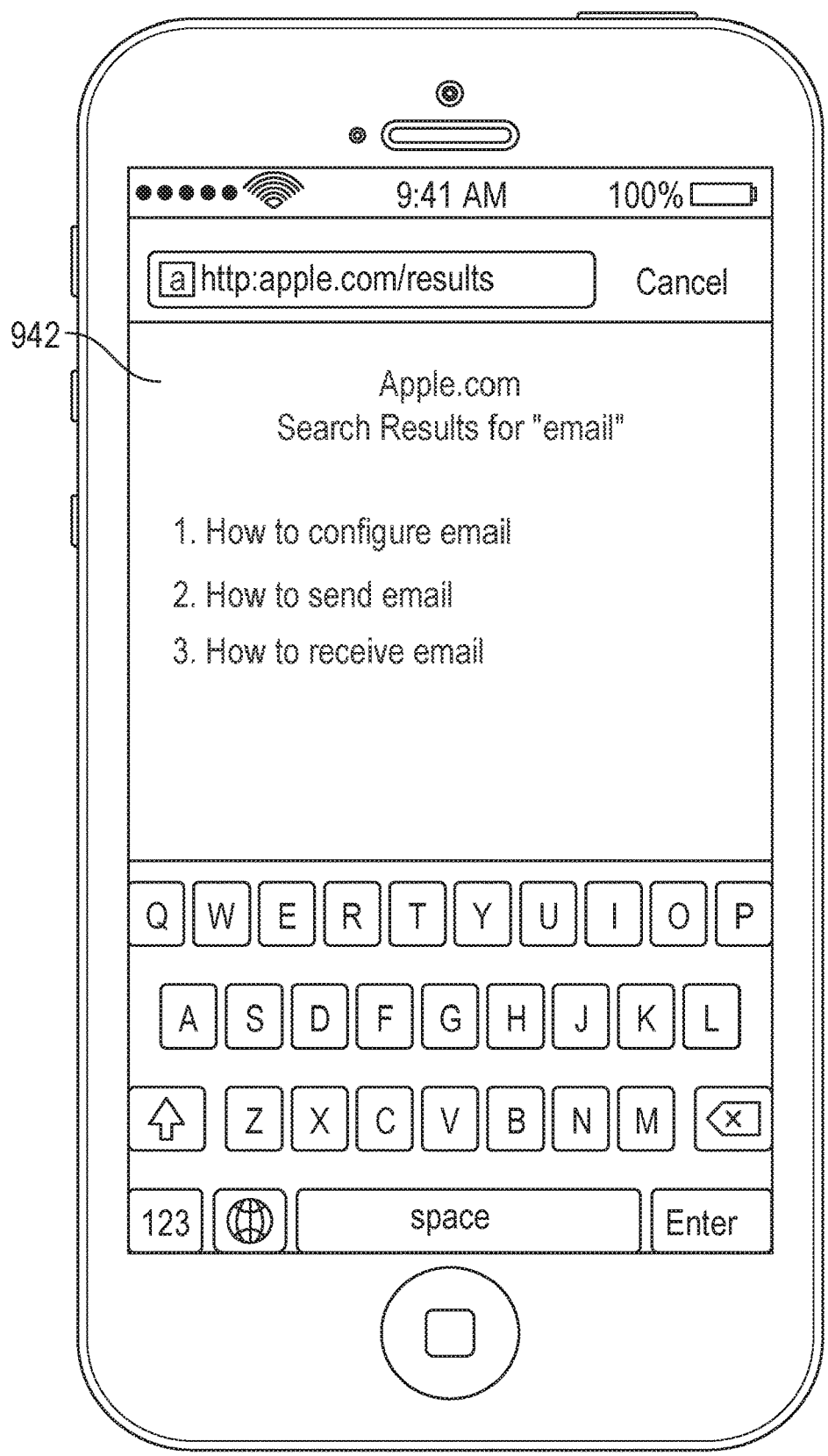

At FIG. 9G, the user accesses Apple's search engine by using a web browser on the device to navigate to the search engine (e.g., navigate to "apple.com", 936 of FIG. 9G). The user has entered a search query (e.g., "email") into a text search location (e.g., 938 of FIG. 9G) of Apple.com's search engine. The user activates the "go" affordance to initiate the search (e.g., the user taps on affordance 940 of FIG. 9G). At FIG. 9H, Apple's search engine returns a webpage (e.g., 942 of FIG. 9E) that includes search results provided by Apple's search engine, as a result of the user activating the "go" affordance. The device detects that a search was conducted using a new search engine (e.g., Apple's search engine), and associates the new search engine with a search-engine-identifier (e.g., "apple"). This allows the user to search using the new search engine in the future by, for example, using the search engine identifier. In some embodiments, the device detects a search conducted using a second search engine (e.g., Apple's search engine), wherein the second search engine does not correspond to any search-engine-specifier term. The device associates (e.g., by automatically selecting or after receiving from the user) a new search-engine-specifier term (e.g., "apple") with the second search engine. In some embodiments, when the steps described above with reference to FIGS. 9G-9H are performed before the search-engine-specifier term (e.g., "apple") for the second search engine (e.g., Apple's search engine) is established, even if the search string starts with the term that is used as the new search-engine-specifier term (e.g., "apple iphone"), no affordances or options for initiating a search using the second search engine (e.g., Apple's search engine) are displayed. Once the new search-engine-specifier term (e.g., "apple") for the second search engine is established, search strings (e.g., "apple computer") that start with the new search-engine-specifier term cause the device to display affordances and/or options for initiating a search using the second search engine (e.g., Apple's search engine). In some embodiments, the device automatically, without user intervention, assigns a search-engine-specifier term for the second search engine (e.g., the device assigns the second search engine a search-engine-specifier term of the truncated URL of the second search engine).

Figure 9I:
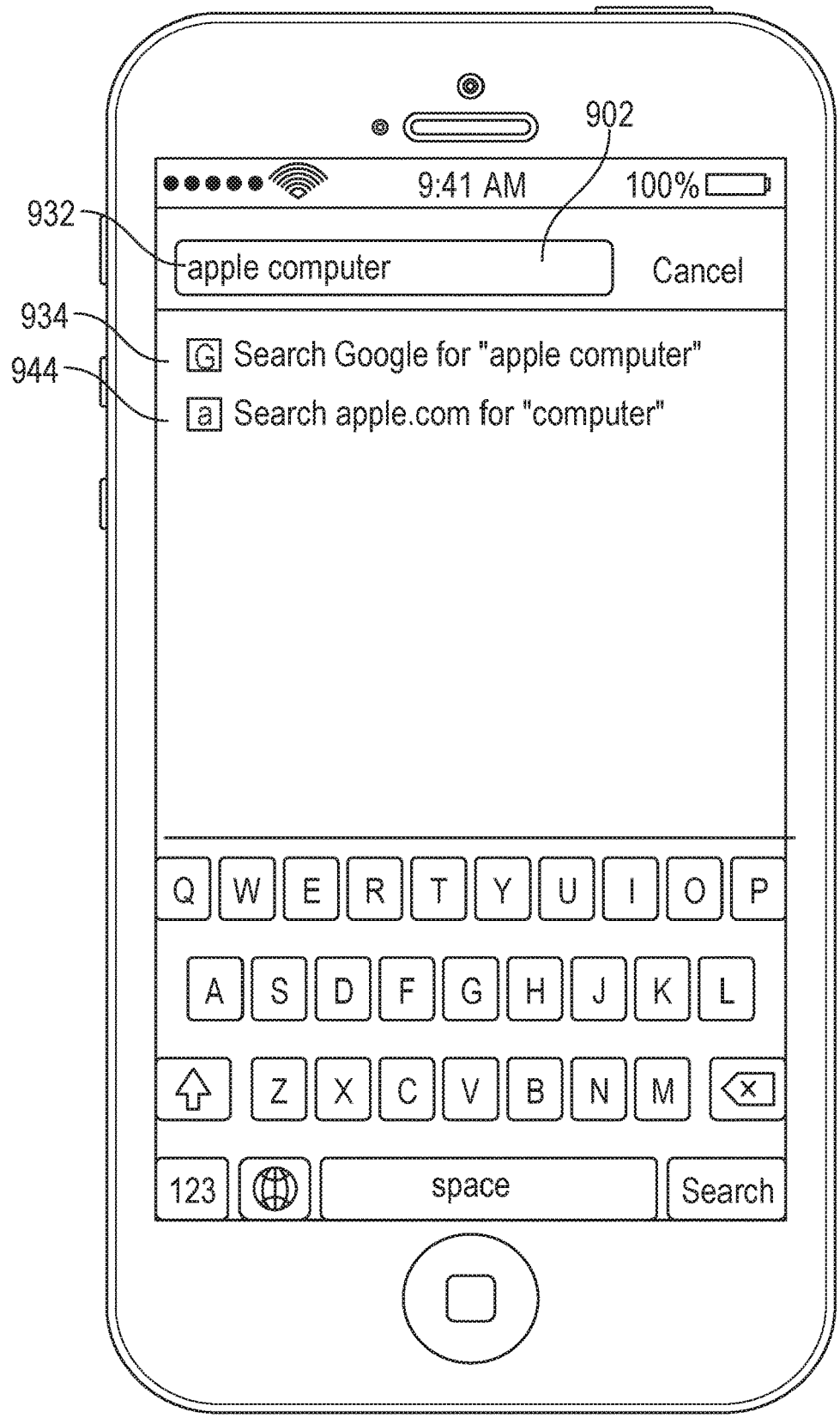

FIG. 9I illustrates an exemplary user interface for conducting a search using a new search engine. After the process described with regard to FIGS. 9G-9H have been performed and a search-engine-specifier term (e.g., "apple") has been associated with the new search engine (e.g., Apple's search engine), the user may be presented with the option to search using the new search engine. For example, when the user conducts a new search by entering a new search input (e.g., "apple computer" 932 of FIG. 9I) that includes the search-engine-specifier term (e.g., "apple"), the device provides an option (e.g., 944 of FIG. 9I) to initiate search using the new search engine. In some embodiments, the device also provides an option to initiate a search using the default search engine (e.g., 934 of FIG. 9I). In some embodiments, the device receives a second search input (e.g., "apple computer" 932 of FIG. 9I). The device determines whether the second search input (e.g., 932 of FIG. 9I) includes a search-engine-specifier term (e.g. when the first word of the search input is "apple"). In accordance with a determination that the second search input (e.g., 932 of FIG. 9I) includes the first term as a search-engine-specifier term that corresponds to the second search engine, the device concurrently displays one or more selectable options (e.g., 944 of FIG. 9I) for initiating a search based on at least a third portion of the second search input using the second search engine (e.g., search for "computer" using Apple's search engine) and one or more selectable options (e.g., 934 of FIG. 9I) for initiating a search based on at least a second portion of the second search input using the default search engine (e.g., search for "apple computer" using Google).

In some embodiments, the device receives a user request to associate a second term with a third search engine, the user request for assigning the second term as a search-engine-specifier term corresponding to the third search engine, and the device associates the second term with the third search engine (e.g., the user can request that a specific term be as the search-engine-specifier term for a particular search engine). Thus, the user can select what types of search inputs will trigger options for which search engines. For example, the user can change the search-engine-specifier term for Apple's search engine from "apple" to "appl". In some embodiments, the user can also request to change the search-engine-specifier term that is associated with the first search engine.

In some embodiments, the device displays a search engine selection affordance adjacent to a search input area (e.g., search field 902). The device detects activation of the search engine selection affordance, and, in response to activation of the search engine selection affordance, displays a plurality of options for a default search engine. For example, the search input area is where the search input is typed in by the user. By displaying options for a default search engine, the user is able to see the list of search engines available for selection as the default search engine.

In some embodiments, the device detects selection of a first search engine option of the plurality of options for a default search engine, the first search engine option associated with a first search engine, and, in response to detecting the selection of the first search engine option of the plurality of options for a default search engine, the device changes the default search engine to the first search engine. In some embodiments, the user selects, from among various options, a search engine to be used as the default search engine. Thus, the user is able to specify which search engine should be used as the default search engine.

Figure 9J:
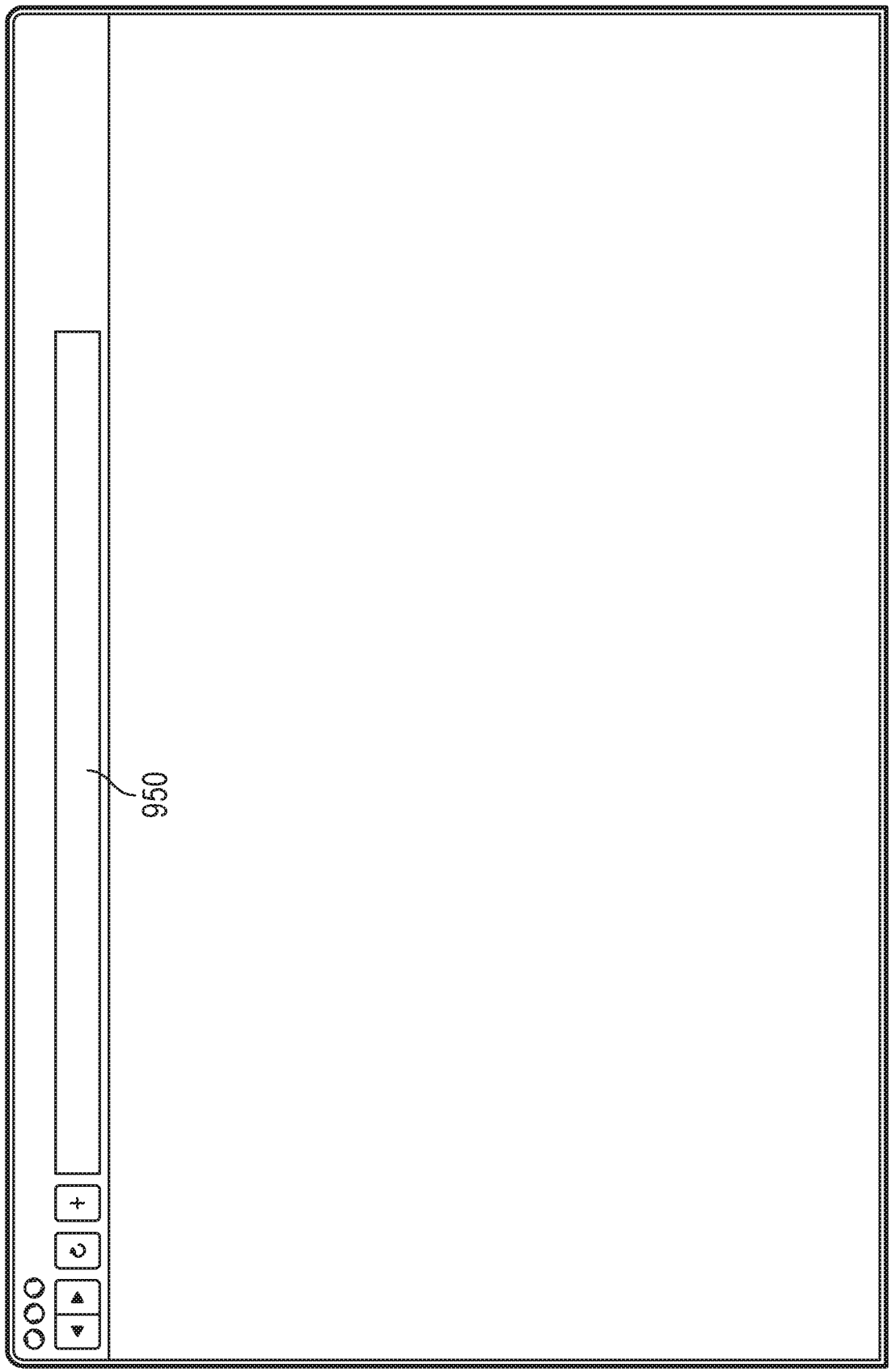
Figure 9K:
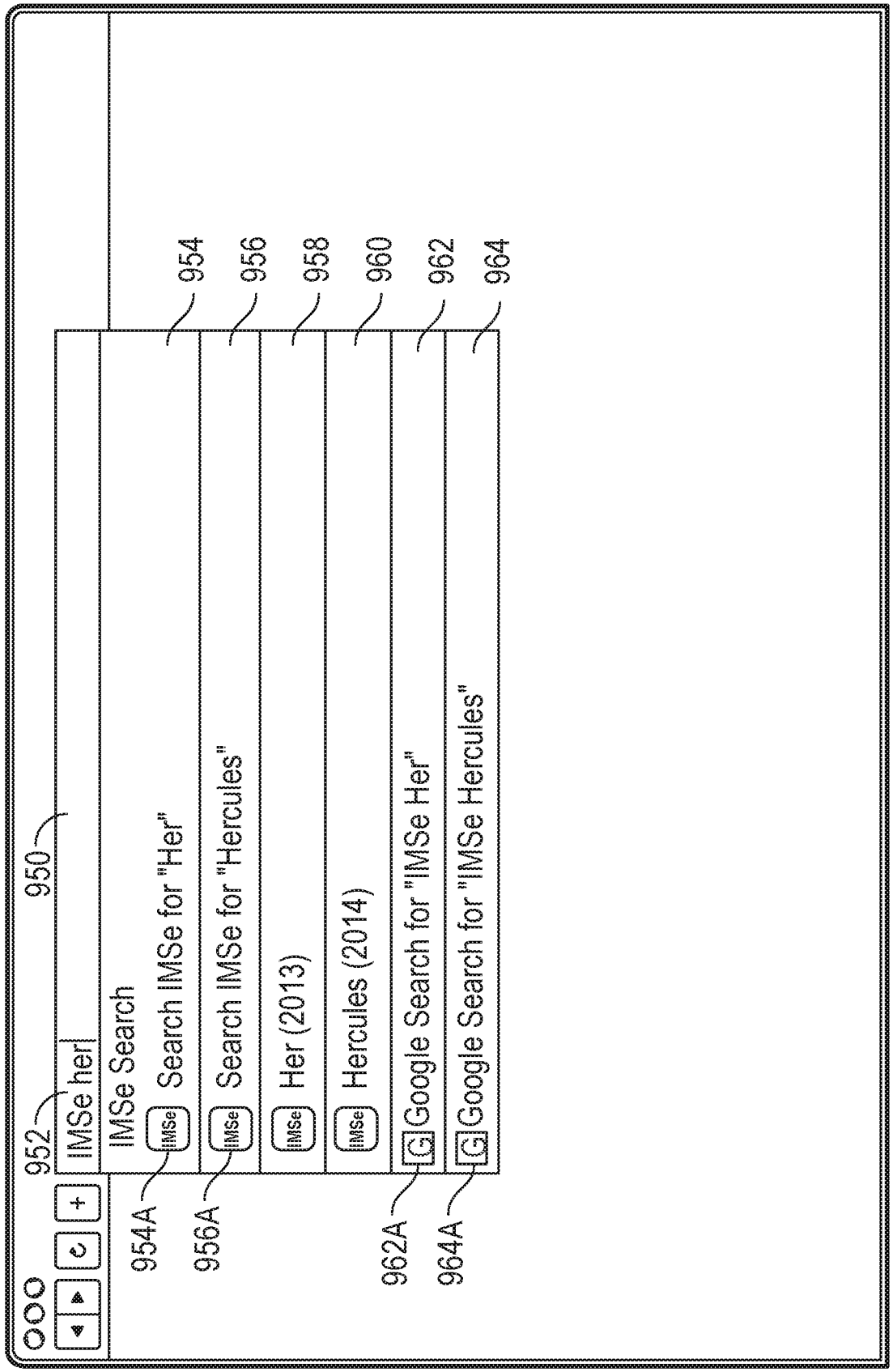

FIGS. 9J-9M illustrate exemplary user interfaces for providing various search options in accordance with some embodiments. FIG. 9J illustrates an exemplary user interface of an electronic device 100, including search field 950. Search field 950 also displays (and accepts) website URLs for access to websites. For example, search field 950 may be displayed as part of a web browser application or may be displayed as part of the operating system. At FIG. 9K, a user has entered a search input 952 (e.g., "IMSe Her") into the search field 950. For example, IMSe may be the short name for "Internet Movie Search evaluator," a website that provides descriptions and reviews about movies. The IMSe website has its own search engine, which may be accessible directly through the website (e.g., at "IMSe.com/search-.html") or accessible through APIs (e.g., making an API call for a search and receiving an API response with search results and details). The device receives the search input (e.g., 952 of FIG. 9K) and determines whether the search input (e.g., 952 of FIG. 9K) includes a search-engine-specifier term. In the example of FIG. 9K, "IMSe" of search input 952 is a search-engine-specifier term. In some embodiments, the determination is case-sensitive. Thus, "imse" and "IMSe" are treated differently. In some embodiments, the determination is case-insensitive, and "imse" and "IMSe" are treated the same. In some embodiments, the device maintains a database that maps search-specifier-terms to corresponding search engines.

In accordance with a determination that the search input includes a search-engine-specifier term that corresponds to a respective search engine (e.g., the term "IMSe" corresponds to the search engine of the Internet Movie Search evaluator server), the device concurrently displays one or more selectable options (e.g., options 954, 956 of FIG. 9K) for initiating a search of at least a first portion of the search input using the respective search engine (e.g., search for "Her" or "Hercules" using the IMSe search engine) and one or more selectable options (e.g., options 962, 964 of FIG. 9K) for initiating a search of at least a second portion of the search input using a default search engine (e.g., search for "IMSe Her" or "IMSe Hercules" using a default search engine, such as Google). For example, initiating a search using the respective search engine initiates a search that uses the IMSe search engine, rather than simply searching the IMSe website using the default search engine. In some embodiments, the one or more selectable options are presented as a drop-down menu from the search field 950. In some embodiments, the at least the first portion of the search input does not include the search-engine-specifier term. In some embodiments, the at least the second portion of the search input includes the search-engine-specifier term.

In some embodiments, the device displays a first identifier icon (e.g., 954A, 956A of FIG. 9K) adjacent to each of the one or more selectable options (e.g., options 954, 956 of FIG. 9K) for initiating search of at least the first portion of the search input using the respective search engine. The device displays a second identifier icon (e.g., 962A, 964A of FIG. 9K) adjacent to each of the one or more selectable options (e.g., options 962, 964 of FIG. 9B) for initiating search of at least the second portion of the search input using the default search engine. The first identifier icon is different from the second identifier icon. Thus, a user can easily determine that the different search options are related to different search engines.

In some embodiments, the one or more selectable options (e.g., options 954, 956 of FIG. 9K) for initiating the search of at least the first portion of the search input using the respective search engine includes one or more search completion suggestions (e.g., 956 of FIG. 9K) received from the respective search engine. (e.g., the respective search engine selected based on the search-engine-specifier term provides suggested search terms). For example, although the term "Hercules" was not in the search input, the search results presented to the user include the suggestion of searching for "Hercules" using the respective search engine.

In some embodiments, the one or more selectable options (e.g., options 962, 964 of FIG. 9K) for initiating the search of at least the second portion of the search input using the default search engine includes one or more search completion suggestions (e.g., 964 of FIG. 9K) received from the default search engine (e.g., the default search engine provides suggested search terms). For example, although the term "Hercules" was not in the search input, the search results presented to the user include the suggestion of searching for "Hercules" using the default search engine.

In some embodiments, the search input comprises two or more character strings separated by a separation character (e.g., a space) and the search-engine-specifier term is a leading character string of the search input. In the example of FIG. 9K, the string "IMSe" is separated from the string "Her" by a space. The search-engine-specifier term is "IMSe" (e.g., the leading character string).

In some embodiments, determining whether the search input includes a search-engine-specifier term comprises determining whether a leading word of the search input has a character count that exceeds a threshold character count (e.g., determining whether the leading word is longer than 2 letters). In accordance with a determination that that the leading word does not have a character count that exceeds the threshold character count (e.g., the leading word is 2 letters or less), the device reaches a determination that the search input does not include a search-engine-specifier term.

In some embodiments, the search-engine-specifier term of the search input is a second-level domain name of the respective search engine (e.g., the search-engine-specifier term for a search engine of www.icloud.com is "icloud").

In some embodiments, the search-engine-specifier term of the search input is a third-level domain name of the respective search engine (e.g., the search-engine-specifier term for a search engine of www.icloud.co.uk is "icloud").

Figure 9L:
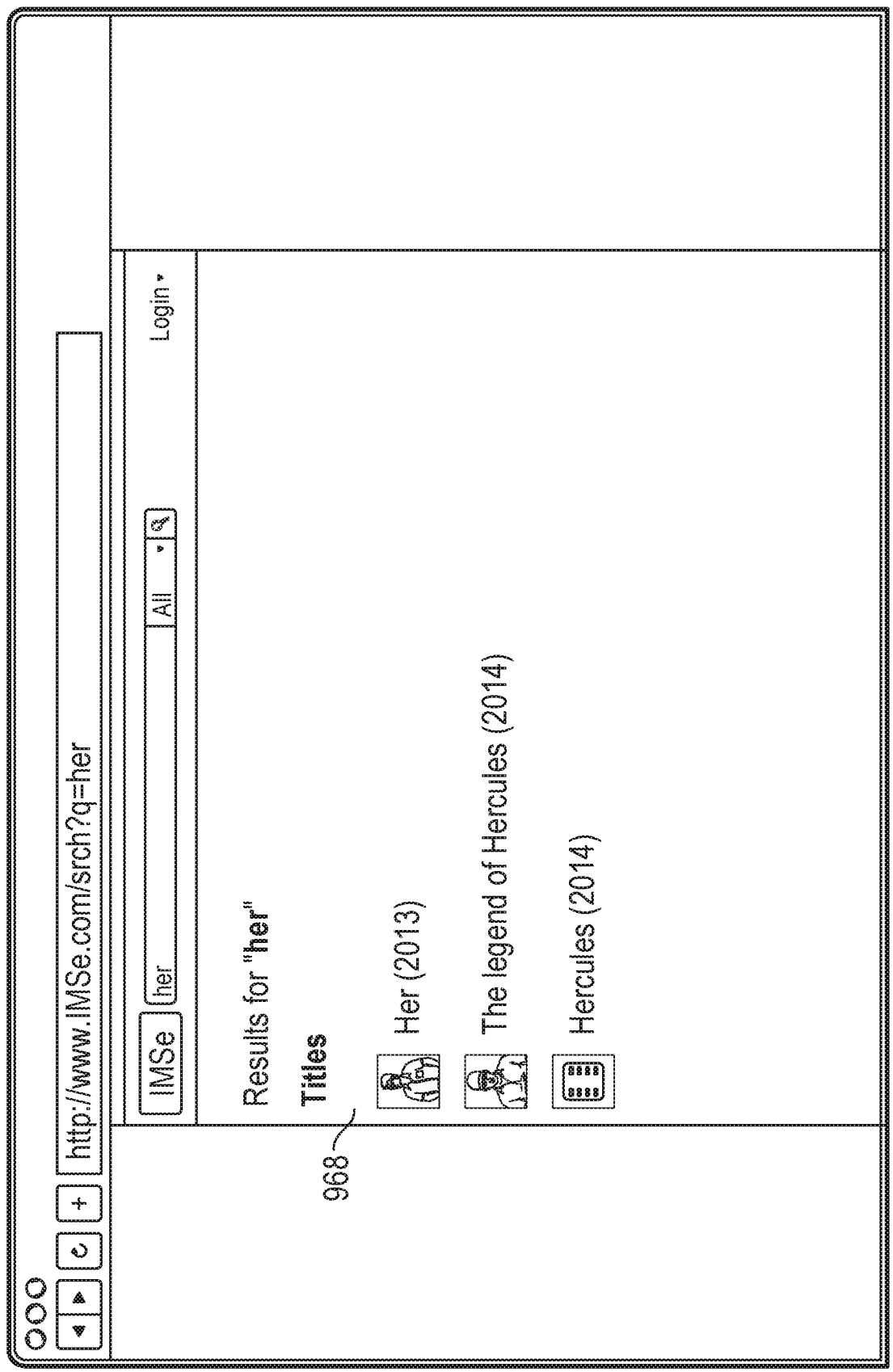

FIGS. 9K and 9L illustrate exemplary user interfaces for displaying search results in accordance with some embodiments. In some embodiments, the device receives user selection of a first selectable option (e.g., option 954 of FIG. K) of the one or more selectable options for initiating search of at least the first portion of the search input using the respective search engine (e.g., the IMSe search engine). In response to receiving user selection of the first selectable option, the device initiates search of at least the first portion of the search input using the respective search engine (e.g., go to a URL or call an API to search for the results; the search is requested with the IMSe search engine for using a search query of "Her"). The device receives search result information from the respective search engine (e.g., the IMSe search engine returns the top hit and/or a list of search results). As illustrated in FIG. 9L, the device displays a search result (e.g., a list of search results; 968 of FIG. 9L) based on the search result information. In some examples, the search result information includes the URLs and/or the titles of the results. For example, the display of a search result may be done by directing the user to a search result webpage (e.g., http://IMSe.com) of the respective search engine.

Figure 9M:

FIGS. 9K and 9M illustrate exemplary user interfaces for providing an option to directly access a result of a search. In some embodiments, in accordance with the determination that the search input includes a search-engine-specifier term (e.g., "IMSe") that corresponds to the respective search engine, the device concurrently displays one or more selectable options (e.g., 958, 960 of FIG. 9K) for accessing a result of searching at least the first portion of the search input using the respective search engine (e.g., a drop down menu or search result listing has a direct link to the top result(s) for search of "Her" using the IMSe search engine, such as "Her (2013)" and "Hercules (2014)"). For example, the user is provided with the option to directly access a website result of the searching (e.g., "http://IMSe.com/Her"), rather than accessing a listing of the search results. In some examples, the top search result is provided as an option for direct access. In some embodiments, the device receives user selection of a second selectable option (e.g., 958 of FIG. 9K) of the one or more selectable options for accessing the result of searching at least the first portion of the search input using the respective search engine. As illustrated in FIG. 9M, in response to receiving user selection of the second selectable option (e.g., 958 of FIG. 9K), the device displays a search result (e.g., website 970 of FIG. 9M) associated with the second selectable option (e.g., display the top website that a search of the IMSe search engine returns). For example, FIG. 9M illustrates display of the IMSe webpage for the movie "Her", which is at the URL "http://IMSe.com/Her". By providing an option to the user for accessing a result of searching, the user does not need to first access a list of search results at the website of the respective search engine. Instead, the user can directly access the result of the search (such as the top result of the search).

In some embodiments, in accordance with a determination that the search input does not include a search-engine-specifier term, the device displays one or more selectable options for initiating a search of at least a second portion of the search input using the default search engine (e.g., search for "IXSe her" using google without displaying any affordances or options for performing a search of a non-default search engine using the search input). If a user activates the selectable option, the device performs a search based on the search input "IXSE her" using the default search engine (e.g., Google).

In some embodiments, the device detects a search conducted using a second search engine (e.g., Apple's search engine), wherein the second search engine does not correspond to any search-engine-specifier term. The device associates (e.g., by automatically selecting or after receiving from the user) a new search-engine-specifier term (e.g., "apple") with the second search engine. In some embodiments, the device automatically, without user intervention, assigns a search-engine-specifier term for the second search engine (e.g., the device assigns the second search engine a search-engine-specifier term of the truncated URL of the second search engine).

In some embodiments, the device receives a second search input. The device determines whether the second search input includes a search-engine-specifier term (e.g. when the first word of the search input is "apple"). In accordance with a determination that the second search input includes the first term as a search-engine-specifier term that corresponds to the second search engine, the device concurrently displays one or more selectable options for initiating a search based on at least a third portion of the second search input using the second search engine (e.g., search for "computer" using Apple's search engine) and one or more selectable options for initiating a search based on at least a second portion of the second search input using the default search engine (e.g., search for "apple computer" using Google).

In some embodiments, the device receives a user request to associate a second term with a third search engine, the user request for assigning the second term as a search-engine-specifier term corresponding to the third search engine, and the device associates the second term with the third search engine (e.g., the user can request that a specific term be as the search-engine-specifier term for a particular search engine). Thus, the user can select what types of search inputs will trigger options for which search engines. For example, the user can change the search-engine-specifier term for Apple's search engine from "apple" to "appl". In some embodiments, the user can also request to change the search-engine-specifier term that is associated with the first search engine.

In some embodiments, the device displays a search engine selection affordance adjacent to a search input area (e.g., search field 950). The device detects activation of the search engine selection affordance, and, in response to activation of the search engine selection affordance, displays a plurality of options for a default search engine. For example, the search input area is where the search input is typed in by the user. By displaying options for a default search engine, the user is able to see the list of search engines available for selection as the default search engine.

In some embodiments, the device detects selection of a first search engine option of the plurality of options for a default search engine, the first search engine option associated with a first search engine, and, in response to detecting the selection of the first search engine option of the plurality of options for a default search engine, the device changes the default search engine to the first search engine. In some embodiments, the user selects, from among various options, a search engine to be used as the default search engine. Thus, the user is able to specify which search engine should be used as the default search engine.

Figure 10A:
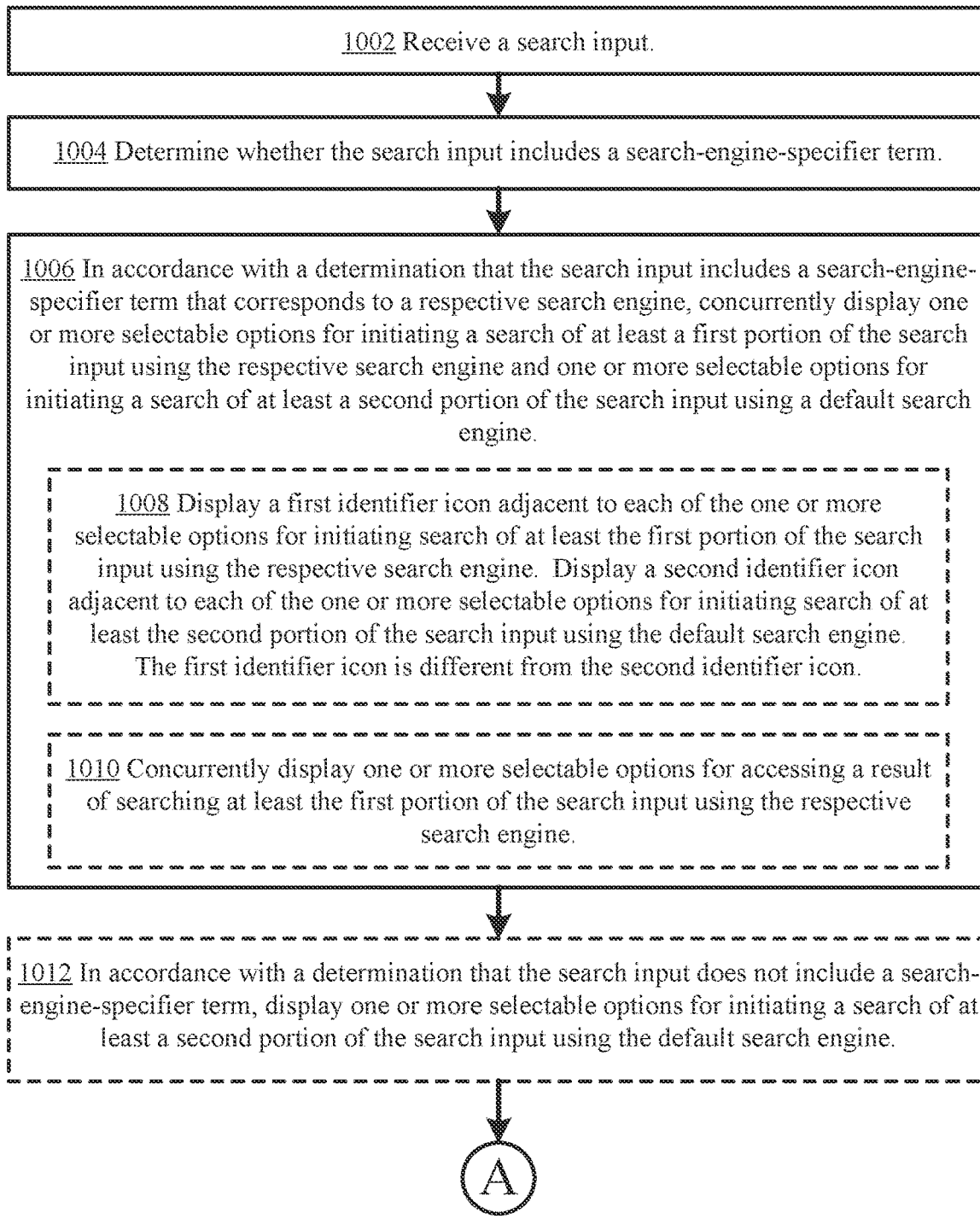
FIGS. 10A-10B are flow diagrams illustrating a method for providing options to initiate a search using a search engine in accordance with some embodiments.
Figure 10B:
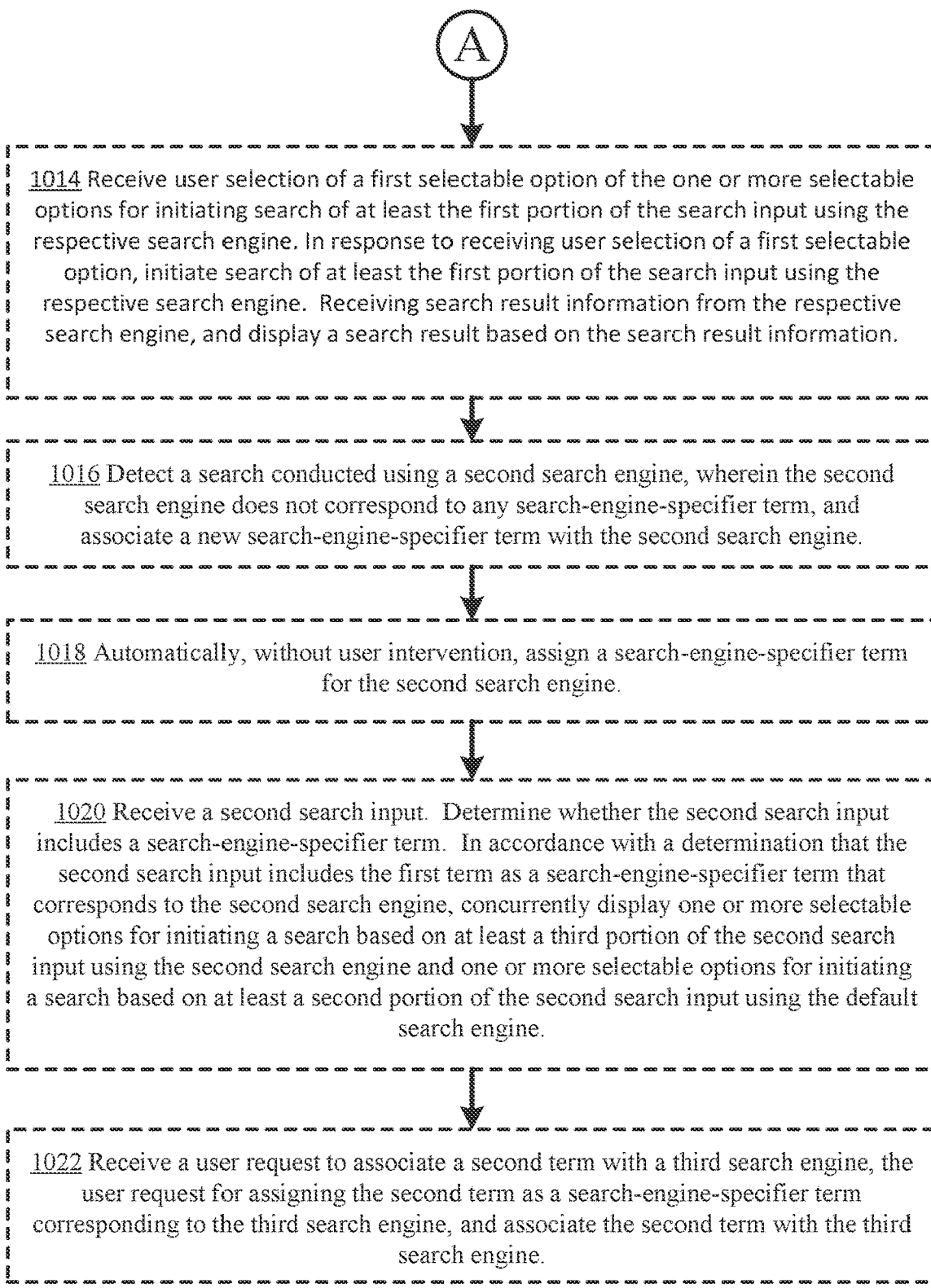

FIGS. 10A-10B are flow diagrams illustrating method 1000 for providing options to initiate a search using a search engine in accordance with some embodiments. Method 1000 is performed at a device (e.g., device 300, FIG. 3, or portable multifunction device 100, FIG. 1) with a display. Some operations in method 1000 may be combined, the order of some operations may be changed, and some operations may be omitted.

As described below, method 1000 provides an intuitive way to display options to initiate a search in accordance with some embodiments. The method reduces the cognitive burden on a user when searching, thereby creating a more efficient human-machine interface. For battery-operated computing devices, enabling a user to conduct a search faster and more efficiently conserves power and increases the time between battery charges.

At block 1002, the device receives a search input (e.g., 904 of FIG. 9B, 952 of FIG. 9K). At block 1004, the device determines whether the search input (e.g., 904 of FIG. 9B, 952 of FIG. 9K) includes a search-engine-specifier term. In some embodiments, the determination is case-sensitive. In some embodiments, the determination is case-insensitive. In some embodiments, the device maintains a database that maps search-specifier-terms to corresponding search engines.

At block 1006, in accordance with a determination that the search input includes a search-engine-specifier term that corresponds to a respective search engine (e.g., the term "IMSe" corresponds to the search engine of the Internet Movie Search evaluator server), the device concurrently displays one or more selectable options (e.g., options 906, 908 of FIG. 9B, options 954, 956 of FIG. 9K) for initiating a search of at least a first portion of the search input using the respective search engine (e.g., search for "Her" or "Hercules" using the IMSe search engine) and one or more selectable options (e.g., options 914, 916 of FIG. 9B, options 962, 964 of FIG. 9K) for initiating a search of at least a second portion of the search input using a default search engine (e.g., search for "IMSe Her" or "IMSe Hercules" using a default search engine, such as Google). For example, initiating a search using the respective search engine initiates a search that uses the IMSe search engine, rather than simply searching the IMSe website using the default search engine.

In some embodiments, the at least the first portion of the search input does not include the search-engine-specifier term. In some embodiments, the at least the second portion of the search input includes the search-engine-specifier term.

At block 1008, in some embodiments, the device displays a first identifier icon (e.g., 906A, 908A of FIG. 9B, 954A, 956A of FIG. 9K) adjacent to each of the one or more selectable options (e.g., options 906, 908 of FIG. 9B, 954, 956 of FIG. 9K) for initiating search of at least the first portion of the search input using the respective search engine. The device displays a second identifier icon (e.g., 914A, 916A of FIG. 9B, 962A, 964A of FIG. 9K) adjacent to each of the one or more selectable options (e.g., options 914, 916 of FIG. 9B, 962, 964 of FIG. 9K) for initiating search of at least the second portion of the search input using the default search engine. The first identifier icon is different from the second identifier icon. Thus, a user can easily determine that the different search options are related to different search engines.

In some embodiments, the one or more selectable options (e.g., 906, 908 of FIG. 9B, 954, 956 of FIG. 9K) for initiating the search of at least the first portion of the search input using the respective search engine includes one or more search completion suggestions (e.g., 908 of FIG. 9B, 956 of FIG. 9K) received from the respective search engine. (e.g., the respective search engine selected based on the search-engine-specifier term provides suggested search terms). For example, although the term "Hercules" was not in the search input, the search results presented to the user include the suggestion of searching for "Hercules" using the respective search engine.

In some embodiments, the one or more selectable options (e.g., options 914, 916 of FIG. 9B, 962, 964 of FIG. 9K) for initiating the search of at least the second portion of the search input using the default search engine includes one or more search completion suggestions (e.g., 916 of FIG. 9B, 964 of FIG. 9K) received from the default search engine (e.g., the default search engine provides suggested search terms). For example, although the term "Hercules" was not in the search input, the search results presented to the user include the suggestion of searching for "Hercules" using the default search engine.

In some embodiments, the search input comprises two or more character strings separated by a separation character (e.g., a space) and the search-engine-specifier term is a leading character string of the search input. In the example of FIG. 9B, the string "IMSe" is separated from the string "Her" by a space. The search-engine-specifier term is "IMSe".

In some embodiments, determining whether the search input includes a search-engine-specifier term comprises determining whether a leading word of the search input has a character count that exceeds a threshold character count (e.g., determining whether the leading word is longer than 2 letters). In accordance with a determination that that the leading word does not have a character count that exceeds the threshold character count (e.g., the leading word is 2 letters or less), the device reaches a determination that the search input does not include a search-engine-specifier term.

In some embodiments, the search-engine-specifier term of the search input is a second-level domain name of the respective search engine (e.g., the search-engine-specifier term for a search engine of www.icloud.com is "icloud"). In some embodiments, the search-engine-specifier term of the search input is a third-level domain name of the respective search engine (e.g., the search-engine-specifier term for a search engine of www.icloud.co.uk is "icloud").

At block 1010, in some embodiments, in accordance with the determination that the search input includes a search-engine-specifier term (e.g., "IMSe") that corresponds to the respective search engine, the device concurrently displays one or more selectable options (e.g., 910, 912 of FIG. 9B, 958, 960 of FIG. 9K) for accessing a result of searching at least the first portion of the search input using the respective search engine (e.g., a drop down menu or search result listing has a direct link to the top result(s) for search of "Her" using the IMSe search engine, such as "Her (2013)" and "Hercules (2014)"). For example, the user is provided with the option to directly access a website result of the searching (e.g., "http://IMSe.com/Her"), rather than accessing a listing of the search results. In some examples, the top search result is provided as an option for direct access.

In some embodiments, the device receives user selection of a second selectable option (e.g., 910 of FIG. 9B) of the one or more selectable options for accessing the result of searching at least the first portion of the search input using the respective search engine. In response to receiving user selection of the second selectable option (e.g., 910 of FIG. 9B), the device displays a search result (e.g., 930 of FIG. 9E) associated with the second selectable option (e.g., display the top website that a search of the IMSe search engine returns). By providing an option to the user for accessing a result of searching, the user does not need to first access a list of search results at the website of the respective search engine. Instead, the user can directly access the result.

At block 1012, in some embodiments, in accordance with a determination that the search input (e.g., 924 of FIG. 9D) does not include a search-engine-specifier term, the device displays one or more selectable options (e.g., 926 of FIG. 9D) for initiating a search of at least a second portion of the search input using the default search engine (e.g., search for "IXSe her" using google without displaying any affordances or options for performing a search of a non-default search engine using the search input). For example, if a user activates the selectable option, the device performs a search based on the search input "IXSE her" using the default search engine (e.g., Google).

At block 1014, in some embodiments, the device receives user selection of a first selectable option (e.g., 906 of FIG. 9B, 954 of FIG. 9K) of the one or more selectable options for initiating search of at least the first portion of the search input using the respective search engine (e.g., the IMSe search engine). In response to receiving user selection of the first selectable option, the device initiates search of at least the first portion of the search input using the respective search engine (e.g., go to a URL or call an API to search for the results; the search is requested with the IMSe search engine for using a search query of "Her"). The device receives search result information from the respective search engine (e.g., the IMSe search engine returns the top hit and/or a list of search results). The device displays a search result (e.g., 922 of FIG. 9C, 968 of FIG. 9L) based on the search result information. In some examples, the search result information includes the URLs and/or the titles of the results. For example, the display of a search result may be done by directing the user to a search result webpage (e.g., http://IMSe.com) of the respective search engine.

At block 1016, in some embodiments, the device detects a search conducted using a second search engine (e.g., Apple's search engine of FIG. 9G), wherein the second search engine does not correspond to any search-engine-specifier term. The device associates (e.g., by automatically selecting or after receiving from the user) a new search-engine-specifier term (e.g., "apple") with the second search engine.

At block 1018, in some embodiments, the device automatically, without user intervention, assigns a search-engine-specifier term for the second search engine (e.g., the device assigns the second search engine a search-engine-specifier term of the truncated URL of the second search engine).

At block 1020, in some embodiments, the device receives a second search input (e.g., 932 of FIG. 9I). The device determines whether the second search input (e.g., 932 of FIG. 9I) includes a search-engine-specifier term (e.g. when the first word of the search input is "apple"). In accordance with a determination that the second search input (e.g., 932 of FIG. 9I) includes the first term as a search-engine-specifier term that corresponds to the second search engine, the device concurrently displays one or more selectable options (e.g., 944 of FIG. 9I) for initiating a search based on at least a third portion of the second search input using the second search engine (e.g., search for "computer" using Apple's search engine) and one or more selectable options (e.g., 934 of FIG. 9I) for initiating a search based on at least a second portion of the second search input using the default search engine (e.g., search for "apple computer" using Google).

At block 1022, in some embodiments, the device receives a user request to associate a second term with a third search engine, the user request for assigning the second term as a search-engine-specifier term corresponding to the third search engine, and the device associates the second term with the third search engine (e.g., the user can request that a specific term be as the search-engine-specifier term for a particular search engine). Thus, the user can select what types of search inputs will trigger options for which search engines. For example, the user can change the search-engine-specifier term for Apple's search engine from "apple" to "appl". In some embodiments, the user can also request to change the search-engine-specifier term that is associated with the first search engine.

In some embodiments, the device displays a search engine selection affordance adjacent to a search input area (e.g., search field 902). The device detects activation of the search engine selection affordance, and, in response to activation of the search engine selection affordance, displays a plurality of options for a default search engine. For example, the search input area is where the search input is typed in by the user. By displaying options for a default search engine, the user is able to see the list of search engines available for selection as the default search engine.

In some embodiments, the device detects selection of a first search engine option of the plurality of options for a default search engine, the first search engine option associated with a first search engine, and, in response to detecting the selection of the first search engine option of the plurality of options for a default search engine, the device changes the default search engine to the first search engine. In some embodiments, the user selects, from among various options, a search engine to be used as the default search engine. Thus, the user is able to specify which search engine should be used as the default search engine.

Note that details of the processes described above with respect to method 1000 (e.g., FIGS. 10 and 9A-9M) are also applicable in an analogous manner to the methods described above. For example, methods 600 and 800 may include one or more of the characteristics of the various methods described above with reference to method 1000. For brevity, these details are not repeated below. The various methods and techniques described above with reference to method 1000 may be optionally implemented as one or more units, such as those described with regard to FIG. 11.

Figure 11:
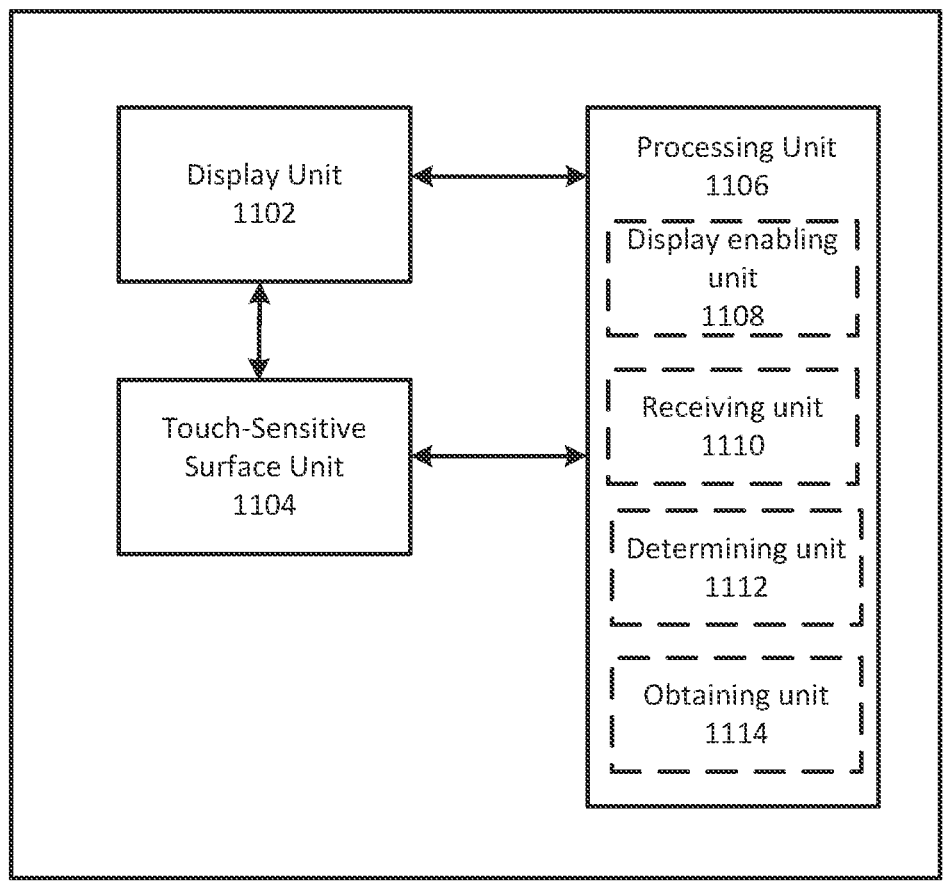
FIG. 11 illustrates a functional block diagram of an electronic device in accordance with some embodiments.

As shown in FIG. 11, an electronic device 1100 includes a display unit 1102 configured to display a user interface, a touch-sensitive surface unit 1104 configured to receive user contacts; and a processing unit 1106 coupled to the display unit 1102 and the touch-sensitive surface unit 1104. In some embodiments, the processing unit 1106 includes a display enabling unit 1108, a receiving unit 1110, a determining unit 1112, and an obtaining unit 1114. The units of FIG. 11 may be used to implement the various techniques and methods described above with respect to FIGS. 5-10.

In some embodiments, the display enabling unit 1108 is configured to cause a display of a user interface (or portions of a user interface) in conjunction with the display unit 1102. For example, the display enabling unit 1108 may be used for: in accordance with a determination that the search input does not meet the remote-search criteria, displaying, on the display, local search result information that corresponds to the one or more local search results; concurrently displaying, on the display, remote search result information that corresponds to the one or more remote search results and local search result information that corresponds to the one or more local search results; displaying one or more search results obtained based on the received search input; in response to receiving the request to preview the respective search result, displaying a preview of content of the respective search result, wherein the preview of content of the respective search result includes one or more actionable user interface objects that, when activated, cause the device to perform an operation associated with the respective search result; and in accordance with a determination that the search input includes a search-engine-specifier term that corresponds to a respective search engine, concurrently displaying one or more selectable options for initiating a search of at least a first portion of the search input using the respective search engine and one or more selectable options for initiating a search of at least a second portion of the search input using a default search engine.

In some embodiments, the receiving unit 1110 is configured to receive input. The input may be received, for example, through the use of the touch-sensitive surface unit 1104. For example, the receiving unit 1110 may be used for: receiving a search input; and receiving a request to preview a respective search result of the one or more search results.

In some embodiments, the determining unit 1112 is configured to make determinations. For example, the determining unit 1112 may be used for: determining whether the search input meets remote-search criteria; and determining whether the search input includes a search-engine-specifier term.

In some embodiments, the obtaining unit 1114 is configured to obtain information. For example, the obtaining unit 1114 may be configured to obtain search results, such as local search results and remote search results. In some embodiments, one or more obtaining units 1114 are included in processing unit 1106. For example, a first obtaining unit may obtain local search results and a second obtaining unit may obtain remote search results. For example, the obtaining unit may be used for: obtaining one or more local search results based on the search input; and obtaining one or more remote search results based on the search input.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B, and 3) are all included within the scope of protection of the invention.

The operations described above with reference to the figures may be implemented by components depicted in FIGS. 1A-1B. For example, display operations and determination operations may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
   a display;
   one or more processors; and
   memory storing one or more programs configured to be executed by the one or more processors, the one or more programs including instructions for:
   detecting a search conducted using a first search engine while displaying a user interface of the first search engine, wherein the first search engine is not associated with a stored search-engine-specifier term at the electronic device;
   in response to detecting the search conducted using the first search engine while displaying the user interface of the first search engine, automatically, without user intervention, assigning a new search-engine-specifier term with the first search engine, wherein the new search-engine-specifier term is based on a URL of the first search engine;
   receiving a search input;

determining whether the search input includes the new search-engine-specifier term; and in accordance with a determination that the search input includes the new search-engine-specifier term that corresponds to the first search engine, concurrently displaying, on the display, one or more selectable options for initiating a search of at least a first portion of the search input using the first search engine and one or more selectable options for initiating a search of at least a second portion of the search input using a default search engine.

2. The electronic device of claim 1, wherein the at least the first portion of the search input does not include the new search-engine-specifier term.

3. The electronic device of claim 1, wherein the at least the second portion of the search input includes the new search-engine-specifier term.

4. The electronic device of claim 1, the one or more programs further including instructions for:

displaying, on the display, a first identifier icon adjacent to each of the one or more selectable options for initiating search of at least the first portion of the search input using the first search engine;

displaying, on the display, a second identifier icon adjacent to each of the one or more selectable options for initiating search of at least the second portion of the search input using the default search engine; and wherein the first identifier icon is different from the second identifier icon.

5. The electronic device of claim 1, the one or more programs further including instructions for:

receiving user selection of a first selectable option of the one or more selectable options for initiating search of at least the first portion of the search input using the respective search engine;

in response to receiving user selection of the first selectable option, initiating search of at least the first portion of the search input using the first search engine;

receiving search result information from the first search engine; and displaying, on the display, a search result based on the search result information.

6. The electronic device of claim 1, wherein the one or more selectable options for initiating the search of at least the first portion of the search input using the first search engine includes one or more search completion suggestions received from the first search engine.

7. The electronic device of claim 1, wherein the one or more selectable options for initiating the search of at least the second portion of the search input using the default search engine includes one or more search completion suggestions received from the default search engine.

8. The electronic device of claim 1, wherein the search input comprises two or more character strings separated by a separation character and the new search-engine-specifier term is a leading character string of the search input.

9. The electronic device of claim 1, wherein determining whether the search input includes the new search-engine-specifier term comprises determining whether a leading word of the search input has a character count that exceeds a threshold character count, and the one or more programs further including instructions for:

in accordance with a determination that that the leading word does not have a character count that exceeds the threshold character count, reaching a determination that the search input does not include the new search-engine-specifier term.

10. The electronic device of claim 1, wherein the new search-engine-specifier term of the search input is a second-level domain name of the first search engine.

11. The electronic device of claim 1, wherein the new search-engine-specifier term of the search input is a third-level domain name of the first search engine.

12. The electronic device of claim 1, the one or more programs further including instructions for:

in accordance with the determination that the search input includes the new search-engine-specifier term that corresponds to the first search engine, concurrently displaying, on the display, one or more selectable options for accessing a result of searching at least the first portion of the search input using the first search engine.

13. The electronic device of claim 12, the one or more programs further including instructions for:

receiving user selection of a second selectable option of the one or more selectable options for accessing the result of searching at least the first portion of the search input using the first search engine; and in response to receiving user selection of the second selectable option, displaying, on the display, a search result associated with the second selectable option.

14. The electronic device of claim 1, the one or more programs further including instructions for:

receiving a second search input;

determining whether the second search input includes a second search-engine-specifier term; and in accordance with a determination that the second search input includes a first term as a second search-engine-specifier term that corresponds to a second search engine, concurrently displaying, on the display, one or more selectable options for initiating a search based on at least a third portion of the second search input using the second search engine and one or more selectable options for initiating a search based on at least a second portion of the second search input using the default search engine.

15. The electronic device of claim 1, the one or more programs further including instructions for:

receiving a user request to associate a second term with a third search engine, the user request for assigning the second term as a search-engine-specifier term corresponding to the third search engine; and associating the second term with the third search engine.

16. The electronic device of claim 1, the one or more programs further including instructions for:

in accordance with a determination that the search input does not include the new search-engine-specifier term, displaying, on the display, one or more selectable options for initiating a search of at least a second portion of the search input using the default search engine.

17. The electronic device of claim 1, the one or more programs further including instructions for:

displaying, on the display, a search engine selection affordance adjacent to a search input area;

detecting activation of the search engine selection affordance; and in response to activation of the search engine selection affordance, displaying, on the display, a plurality of options for a default search engine.

18. The electronic device of claim 17, the one or more programs further including instructions for:

detecting selection of a first search engine option of the plurality of options for a default search engine, the first search engine option associated with a first search engine; and in response to detecting the selection of the first search engine option of the plurality of options for a default search engine, changing the default search engine to the first search engine.

19. A method, comprising:

at an electronic device with a display:
- detecting a search conducted using a first search engine while displaying a user interface of the first search engine, wherein the first search engine is not associated with a stored search-engine-specifier term at the electronic device;
- in response to detecting the search conducted using the first search engine while displaying the user interface of the first search engine, automatically, without user intervention, assigning a new search-engine-specifier term with the first search engine, wherein the new search-engine-specifier term is based on a URL of the first search engine;
- receiving a search input;
- determining whether the search input includes the new search-engine-specifier term; and
- in accordance with a determination that the search input includes the new search-engine-specifier term that corresponds to the first search engine, concurrently displaying, on the display, one or more selectable options for initiating a search of at least a first portion of the search input using the first search engine and one or more selectable options for initiating a search of at least a second portion of the search input using a default search engine.

20. A non-transitory computer-readable storage medium storing one or more programs configured to be executed by one or more processors of an electronic device with a display, the one or more programs including instructions for:
- detecting a search conducted using a first search engine while displaying a user interface of the first search engine, wherein the first search engine is not associated with a stored search-engine-specifier term at the electronic device;
- in response to detecting the search conducted using the first search engine while displaying the user interface of the first search engine, automatically, without user intervention, assigning a new search-engine-specifier term with the first search engine, wherein the new search-engine-specifier term is based on a URL of the first search engine;
- receiving a search input;
- determining whether the search input includes the new search-engine-specifier term; and
- in accordance with a determination that the search input includes the new search-engine-specifier term that corresponds to the first search engine, concurrently displaying, on the display, one or more selectable options for initiating a search of at least a first portion of the search input using the first search engine and one or more selectable options for initiating a search of at least a second portion of the search input using a default search engine.

21. The method of claim 19, wherein the at least the first portion of the search input does not include the new search-engine-specifier term.

22. The method of claim 19, wherein the at least the second portion of the search input includes the new search-engine-specifier term.

23. The method of claim 19, further comprising:
- displaying, on the display, a first identifier icon adjacent to each of the one or more selectable options for initiating search of at least the first portion of the search input using the first search engine;
- displaying, on the display, a second identifier icon adjacent to each of the one or more selectable options for initiating search of at least the second portion of the search input using the default search engine; and
- wherein the first identifier icon is different from the second identifier icon.

24. The method of claim 19, further comprising:
- receiving user selection of a first selectable option of the one or more selectable options for initiating search of at least the first portion of the search input using the respective search engine;
- in response to receiving user selection of the first selectable option, initiating search of at least the first portion of the search input using the first search engine;
- receiving search result information from the first search engine; and
- displaying, on the display, a search result based on the search result information.

25. The method of claim 19, wherein the one or more selectable options for initiating the search of at least the first portion of the search input using the first search engine includes one or more search completion suggestions received from the first search engine.

26. The method of claim 19, wherein the one or more selectable options for initiating the search of at least the second portion of the search input using the default search engine includes one or more search completion suggestions received from the default search engine.

27. The method of claim 19, wherein the search input comprises two or more character strings separated by a separation character and the new search-engine-specifier term is a leading character string of the search input.

28. The method of claim 19, wherein determining whether the search input includes the new search-engine-specifier term comprises determining whether a leading word of the search input has a character count that exceeds a threshold character count, the method further comprising:
- in accordance with a determination that that the leading word does not have a character count that exceeds the threshold character count, reaching a determination that the search input does not include the new search-engine-specifier term.

29. The method of claim 19, wherein the new search-engine-specifier term of the search input is a second-level domain name of the first search engine.

30. The method of claim 19, wherein the new search-engine-specifier term of the search input is a third-level domain name of the first search engine.

31. The method of claim 19, further comprising:
- in accordance with the determination that the search input includes the new search-engine-specifier term that corresponds to the first search engine, concurrently displaying, on the display, one or more selectable options for accessing a result of searching at least the first portion of the search input using the first search engine.

32. The method of claim 31, further comprising:
- receiving user selection of a second selectable option of the one or more selectable options for accessing the result of searching at least the first portion of the search input using the first search engine; and in response to receiving user selection of the second selectable option, displaying, on the display, a search result associated with the second selectable option.

33. The method of claim 19, further comprising:
receiving a second search input;
determining whether the second search input includes a second search-engine-specifier term; and
in accordance with a determination that the second search input includes a first term as a second search-engine-specifier term that corresponds to a second search engine, concurrently displaying, on the display, one or more selectable options for initiating a search based on at least a third portion of the second search input using the second search engine and one or more selectable options for initiating a search based on at least a second portion of the second search input using the default search engine.

34. The method of claim 19, further comprising:
receiving a user request to associate a second term with a third search engine, the user request for assigning the second term as a search-engine-specifier term corresponding to the third search engine; and
associating the second term with the third search engine.

35. The method of claim 19, further comprising:
in accordance with a determination that the search input does not include the new search-engine-specifier term, displaying, on the display, one or more selectable options for initiating a search of at least a second portion of the search input using the default search engine.

36. The method of claim 19, further comprising:
displaying, on the display, a search engine selection affordance adjacent to a search input area;
detecting activation of the search engine selection affordance; and
in response to activation of the search engine selection affordance, displaying, on the display, a plurality of options for a default search engine.

37. The method of claim 36, further comprising:
detecting selection of a first search engine option of the plurality of options for a default search engine, the first search engine option associated with a first search engine; and
in response to detecting the selection of the first search engine option of the plurality of options for a default search engine, changing the default search engine to the first search engine.

38. The non-transitory computer-readable storage medium of claim 20, wherein the at least the first portion of the search input does not include the new search-engine-specifier term.

39. The non-transitory computer-readable storage medium of claim 20, wherein the at least the second portion of the search input includes the new search-engine-specifier term.

40. The non-transitory computer-readable storage medium of claim 20, the one or more programs further including instructions for:
displaying, on the display, a first identifier icon adjacent to each of the one or more selectable options for initiating search of at least the first portion of the search input using the first search engine;
displaying, on the display, a second identifier icon adjacent to each of the one or more selectable options for initiating search of at least the second portion of the search input using the default search engine; and
wherein the first identifier icon is different from the second identifier icon.

41. The non-transitory computer-readable storage medium of claim 20, the one or more programs further including instructions for:
receiving user selection of a first selectable option of the one or more selectable options for initiating search of at least the first portion of the search input using the respective search engine;
in response to receiving user selection of the first selectable option, initiating search of at least the first portion of the search input using the first search engine;
receiving search result information from the first search engine; and
displaying, on the display, a search result based on the search result information.

42. The non-transitory computer-readable storage medium of claim 20, wherein the one or more selectable options for initiating the search of at least the first portion of the search input using the first search engine includes one or more search completion suggestions received from the first search engine.

43. The non-transitory computer-readable storage medium of claim 20, wherein the one or more selectable options for initiating the search of at least the second portion of the search input using the default search engine includes one or more search completion suggestions received from the default search engine.

44. The non-transitory computer-readable storage medium of claim 20, wherein the search input comprises two or more character strings separated by a separation character and the new search-engine-specifier term is a leading character string of the search input.

45. The non-transitory computer-readable storage medium of claim 20, wherein determining whether the search input includes the new search-engine-specifier term comprises determining whether a leading word of the search input has a character count that exceeds a threshold character count, the one or more programs further including instructions for:
in accordance with a determination that that the leading word does not have a character count that exceeds the threshold character count, reaching a determination that the search input does not include the new search-engine-specifier term.

46. The non-transitory computer-readable storage medium of claim 20, wherein the new search-engine-specifier term of the search input is a second-level domain name of the first search engine.

47. The non-transitory computer-readable storage medium of claim 20, wherein the new search-engine-specifier term of the search input is a third-level domain name of the first search engine.

48. The non-transitory computer-readable storage medium of claim 20, the one or more programs further including instructions for:
in accordance with the determination that the search input includes the new search-engine-specifier term that corresponds to the first search engine, concurrently displaying, on the display, one or more selectable options for accessing a result of searching at least the first portion of the search input using the first search engine.

49. The non-transitory computer-readable storage medium of claim 48, the one or more programs further including instructions for:

receiving user selection of a second selectable option of the one or more selectable options for accessing the result of searching at least the first portion of the search input using the first search engine; and in response to receiving user selection of the second selectable option, displaying, on the display, a search result associated with the second selectable option.

50. The non-transitory computer-readable storage medium of claim 20, the one or more programs further including instructions for:

receiving a second search input;

determining whether the second search input includes a second search-engine-specifier term; and in accordance with a determination that the second search input includes a first term as a second search-engine-specifier term that corresponds to a second search engine, concurrently displaying, on the display, one or more selectable options for initiating a search based on at least a third portion of the second search input using the second search engine and one or more selectable options for initiating a search based on at least a second portion of the second search input using the default search engine.

51. The non-transitory computer-readable storage medium of claim 20, the one or more programs further including instructions for:

receiving a user request to associate a second term with a third search engine, the user request for assigning the second term as a search-engine-specifier term corresponding to the third search engine; and associating the second term with the third search engine.

52. The non-transitory computer-readable storage medium of claim 20, the one or more programs further including instructions for:

in accordance with a determination that the search input does not include the new search-engine-specifier term, displaying, on the display, one or more selectable options for initiating a search of at least a second portion of the search input using the default search engine.

53. The non-transitory computer-readable storage medium of claim 20, the one or more programs further including instructions for:

displaying, on the display, a search engine selection affordance adjacent to a search input area;

detecting activation of the search engine selection affordance; and in response to activation of the search engine selection affordance, displaying, on the display, a plurality of options for a default search engine.

54. The non-transitory computer-readable storage medium of claim 53, the one or more programs further including instructions for:

detecting selection of a first search engine option of the plurality of options for a default search engine, the first search engine option associated with a first search engine; and in response to detecting the selection of the first search engine option of the plurality of options for a default search engine, changing the default search engine to the first search engine.

* * * * *

UNITED STATES PATENT AND TRADEMARK OFFICE
CERTIFICATE OF CORRECTION

| | |
|---|---|
| PATENT NO. | : 12,026,170 B2 |
| APPLICATION NO. | : 17/129543 |
| DATED | : July 2, 2024 |
| INVENTOR(S) | : Jeremiah Daniel Shaw et al. |

It is certified that error appears in the above-identified patent and that said Letters Patent is hereby corrected as shown below:

In the Claims

Column 63, Line 66: In Claim 9, delete "that that" and insert -- that --.

Column 66, Line 47: In Claim 28, delete "that that" and insert -- that --.

Column 68, Line 43: In Claim 45, delete "that that" and insert -- that --.

Signed and Sealed this
Fifth Day of November, 2024

Katherine Kelly Vidal
*Director of the United States Patent and Trademark Office*